US008886592B2

(12) United States Patent
Huff

(10) Patent No.: US 8,886,592 B2
(45) Date of Patent: Nov. 11, 2014

(54) EFFICIENT GENEALOGY REGISTRY SYSTEM

(76) Inventor: Kent W. Huff, Spanish Fork, UT (US)

( * ) Notice: Subject to any disclaimer, the term of this patent is extended or adjusted under 35 U.S.C. 154(b) by 148 days.

(21) Appl. No.: 13/355,069

(22) Filed: Jan. 20, 2012

(65) Prior Publication Data

US 2012/0191703 A1 Jul. 26, 2012

Related U.S. Application Data

(60) Provisional application No. 61/434,738, filed on Jan. 20, 2011.

(51) Int. Cl.
*G06F 17/30* (2006.01)
*G09B 19/00* (2006.01)
*G06Q 10/06* (2012.01)
*A63F 3/04* (2006.01)

(52) U.S. Cl.
CPC ....... *G06Q 10/063* (2013.01); *A63F 2003/0452* (2013.01); *G06F 17/30171* (2013.01)
USPC .......................................... 707/608; 434/154

(58) Field of Classification Search
CPC ................... A63F 2003/0452; G06F 17/30171
USPC .................... 707/608, 785; 434/154
See application file for complete search history.

(56) References Cited

U.S. PATENT DOCUMENTS 5,467,471 A    11/1995 Bader
6,421,656 B1    7/2002 Cheng et al.
6,427,123 B1    7/2002 Sedlar
6,760,731 B2 *  7/2004 Huff .................. 707/999.101
7,249,129 B2 *  7/2007 Cookson et al. .......... 707/737
2006/0149567 A1 *  7/2006 Muller et al. .................. 705/1

OTHER PUBLICATIONS

"Serious Genealogists of the world are invited to join in creating The Genealogy Indexing Project for the new Millennium", webpage available at http://www.genreg.com, crawled by the Internet Archive Wayback Machine on Jul. 27, 2004, 7 pages.*
Kent Huff, "LDS Technology Forums" discussion forum, "SuperPAF/HyperPAF Idea" topic thread, postings from Jan. 21, 2007, to Feb. 16, 2007, 29 pages.*

* cited by examiner

*Primary Examiner* — Rehana Perveen
*Assistant Examiner* — Scott A Waldron
(74) *Attorney, Agent, or Firm* — Clayton, Howarth & Cannon, P.C.

(57) ABSTRACT

A genealogy registry system includes a central server database and a central server. The central server database includes surname workspaces for storing genealogical data in lineage-linked form, a submission link space for making and storing links between data in the data spaces, and a third-party link space for making and storing links between the data spaces. The central server includes a surname cooperation manager to manage cooperation between researchers researching genealogy for the same surname, a unique ID generator to generate a unique ID for any individual being researched, a visible data selector to allow access to a subgroup of data on the central server database, and a workstation manager to manage transmission of data to the central server database from workstations where data are assembled relating to a particular surname. The workstations may assemble data by extracting, indexing, sorting and linking information from source documents for the surname.

22 Claims, 25 Drawing Sheets

EFFICIENT GENEALOGY REGISTRY SYSTEM

CROSS-REFERENCE TO RELATED APPLICATIONS

This application claims the benefit of U.S. Provisional Application No. 61/434,738 filed Jan. 20, 2011, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not applicable.

BACKGROUND

This invention relates to processing of genealogical data. More particularly, this invention relates to a genealogy registry system for collecting, summarizing, indexing, lineage-linking, and displaying genealogical information. Furthermore, this invention also relates to electronic publishing applications using electronic networks.

Today's worldwide genealogy data records environment can be summarized in general terms as comprising thousands of relatively large public record sets in non-lineage-linked format, mostly on paper or microfilm, plus millions of small collections of lineage-linked names, mostly held by individual persons. Most of these small collections are in paper form, but increasingly are in personal computer (PC) form. These family collections of relatives' names may be made up of family non-public records, plus extracts from any number of larger public record sets. There are huge national collections of records, such as the U.S. censuses, that may contain hundreds of millions of names. Other national records include military and immigration records. At the state level, there are the usual birth, marriage, death, and perhaps tax records. At the local or county level, one might find land, burial, and court records.

The genealogy industry today can be viewed as a $66 billion per year industry, with about $6 billion being spent on computer equipment, Internet connections, subscriptions to online data services, books and conferences, research travel, payments for professional research, etc. The remaining $60 billion is mostly unpaid hobby or volunteer activity. For the serious genealogy hobbyist or professional, going beyond family records usually means learning to use and access many new sets of records, perhaps finding few, if any, relatives' names in any one record set. This means there is a huge individual learning curve and much raw record scanning for the small amount of actual data found and used. The learning curve becomes enormous when the researcher must learn a language to trace ancestors' lives in another country with records in another language. Because of the huge size of this industry and the level of confusion and frustration associated with today's individual research work, it is ripe for a major improvement.

If the overall goal were to complete all the clerical records processing and name linking for a whole nation or for the entire world, the current process is extremely inefficient. The usual technique for solving this kind of problem is to use specialization to make the workers' efforts more efficient. In the case of genealogy and the related records complexities, the efficiency improvement rates could be in the hundreds or even thousands of times.

Perhaps $1 billion has been spent on genealogy software and databases in recent years by major organizations, such as churches and commercial genealogy websites, while trying to solve the most prominent problems of genealogy research—massive duplication of research effort and data, lack of ability to cooperate effectively, lack of fairness to participants, lack of integration and uniqueness for individual names, and lack of high quality data being produced. But in spite of spending huge sums of money, and the massive application of volunteer labor (about 300 million hours alone by one church), while at the same time applying some of the best available technicians to the problem, the results have been very disappointing. Apparently, genealogists have not raised their sights to a full-scale re-engineering of the industry, and therefore their efforts have been only minimally effective as far as improving overall efficiency. Unfortunately, today's complex and expensive genealogy computer systems are only a little bit more efficient overall than the manual paper systems of a few decades ago.

As the most prominent example of an industry problem, and a failure to solve it, the very large and crippling duplication levels in genealogy research are recognized by nearly everyone involved these days, but no effective solution has been found by others, although several have been tried, at great cost. Unfortunately, these efforts have all been attacks on the symptoms, not on the underlying problems, so they have clearly failed and have been abandoned. It is now clear that any gradual approach to improving the industry is bound to fail, where incremental improvements are made merely to portions of the industry. The only method of re-engineering that can succeed on a grand scale requires looking at the entire industry and all of its problems, and simultaneously proposing at least 30 major improvements to be done essentially in a single step. Only then that can the full power of mass production and industrialization concepts be employed to improve efficiencies up to 2000 times beyond the traditional "cottage industry" practices. Extensive specialization and cooperation is always the key to industrial efficiency. As an example of today's genealogy industry inefficiencies, if every person in United States did the research to establish 12 full generations of their progenitors, using current methods, and put this all in one database, the expected average duplication rate for each name in the database would be 37,000 times. The difficulty of the process and the astronomical waste involved means that genealogists cannot ever finish their own 12 generations of genealogy by themselves. Only through coordination and cooperation of work can this massive task be completed in an efficient manner.

One advanced system in the category of a potentially worldwide, lineage-linked system is the Ancestral File (AF) operated by The Church of Jesus Christ of Latter-day Saints ("LDS church"). AF stores about 30 million names, most of them linked into families and pedigrees, but only minimal data about each person are held there. Error rates have been estimated to be as high as 30% on names and linking relationships. AF has been available for a decade or more on CD-ROM at family history centers and a few other locations sponsored by the LDS church. Since April 1999, a limited version has been available on the Internet. Although theoretically it could contain data on anyone in the world, AF mostly pertains to the families of the some five million members of the church in the United States. Since it was designed and is intended to support LDS church doctrine and programs, people outside the church are less likely to want to participate, even if it had many more features. A more neutral and sophisticated system is needed.

Ancestral File accepts additions and corrections in paper or diskette form, but cannot be updated directly. A small group of people is responsible for updating the AF database. Due at least in part to these factors, the process is such that there is at least a two-year wait between submitting new data and being able to see the updated version on CD-ROM. Most computer users have come to expect immediate responses to their entries. Waiting two years to find out whether submitted information was accepted correctly by a genealogy system calls for more patience than most people are willing to give. The actual update process is done automatically, with no critical human review. Further, only one version of the data is kept. This means that donors can submit data, wait two years, and then find out that the data were entered incorrectly, were not entered at all, or somebody else's data were used instead. In the two-year waiting period, the data might have been entered, but later might have been replaced by other data before either version became accessible. This means that the highest quality data can be replaced by inferior data. Obviously, this is not a satisfactory system. It is almost impossible to have significant cooperation or synchronized specialization with such a system.

Two major impediments to doing pedigree-sequence research are exponential in nature, meaning that the further one goes back in time the more difficult it is to complete a pedigree. One impediment is the fairly obvious fact that the number of one's direct ancestors doubles at each generation going backward, so that at generation ten there are 1024 people, each with different surnames. The cumulative number of direct ancestors to be researched to complete 10 generations is 2048.

A second impediment, which also increases exponentially, but probably more slowly than the rate of increase of the first impediment, is the difficulty of using older records, generally getting worse as the records go further back in time. For most people, going back the first three or four generations is not too difficult, since the chances are that they will know all or most of the people in that category, or are only one generation removed from them, so it is fairly easy to learn who these people are, and to find and record information about them, using mostly living sources. When going to public sources to confirm the data we collect about these nearby generations, the records are usually in the researcher's native language, and are reasonably modern in their format—one can actually read them; they might even be printed instead of handwritten.

Going back more than three or four generations, however, may introduce many new factors to increase the difficulty of searches. Since many populations, such as North Americans, are to such a large extent immigrant in makeup, many researchers will find that after three or four generations going backward, a search leads to records in foreign countries. That may require a researcher to learn a new language to read the records, and, in any event, the older records tend to be less structured and harder to read because of legibility and handwriting issues, some of those difficulties caused simply by the fact that we are looking at microfilmed images that may be of low quality. Even when research is focused on a single country and language system, as records become older they tend to be less detailed and harder to read because of various legibility issues.

For purposes of this disclosure, the genealogy industry can be treated as being a giant information processing computer, divided into three steps: (1) The data gathering and preparation step, 2) The data storage and integration step, and (3) The data output step. The data input process consists of filming and digitizing original records, identifying individuals and linking them into families and family structures, finding source records and associating those records with individuals, etc. The data output process comprises of preparing such things as genealogy wall charts and publishing books using finished data. These two ends of the genealogy industry work reasonably well today, so most of the efforts for this patent application relate to the middle piece, the storage and integration step.

In today's genealogy industry world, the biggest and most troublesome problems happen in the middle step, indicating that is the place which needs the most innovation. There is currently no effective and efficient way to take the scattered and fragmented pieces of genealogy research data created by millions of genealogists, and assemble them at a central site so that genealogists can collaborate and cooperate and save enormous amounts of unnecessary duplication of research work and avoid the confusing piles of resulting data. It is not unusual to find up to 10,000 copies of the same individual scattered throughout one of these central collections of data. That level of chaos and confusion is an enormous hindrance to further progress in the genealogy industry.

Many of the shortcomings described above are addressed by U.S. Pat. No. 6,760,731, issued to Kent W. Huff on Jul. 6, 2004, which is hereby incorporated by reference in its entirety. The systems and methods described in that patent represent a dramatic improvement over previously known systems and methods for genealogical research. The process of genealogical research, however, remains an extremely labor-intensive pursuit, and additional systems and methods for further enhancing researcher efficiency are therefore desirable. This new genealogy system, which is a complete re-engineering of the current genealogy industry, makes it possible to easily eliminate almost all duplication, and, with extra efficiency-improving mechanisms, to finish the task of compiling all the basic genealogy data for the United States very quickly, theoretically with only two weeks work by each participant. This is several thousand times faster than the current methods, which require essentially infinite amounts of time, since no one can ever complete this much work on their own, in one lifetime, using current methods.

The prior art is thus characterized by several disadvantages that are addressed by the present disclosure. The present disclosure minimizes, and in some aspects eliminates, the above-mentioned failures, and other problems, by utilizing the methods and structural features described herein. The features and advantages of the present disclosure will be set forth in the description that follows, and in part will be apparent from the description, or may be learned by the practice of the present disclosure without undue experimentation. The features and advantages of the present disclosure may be realized and obtained by means of the instruments and combinations particularly pointed out in the appended claims.

In view of the foregoing, it will be appreciated that providing a genealogy registry system that meets these and many other deficiencies of current systems would be a significant advancement in the art.

SUMMARY OF INVENTION

Figure 1:
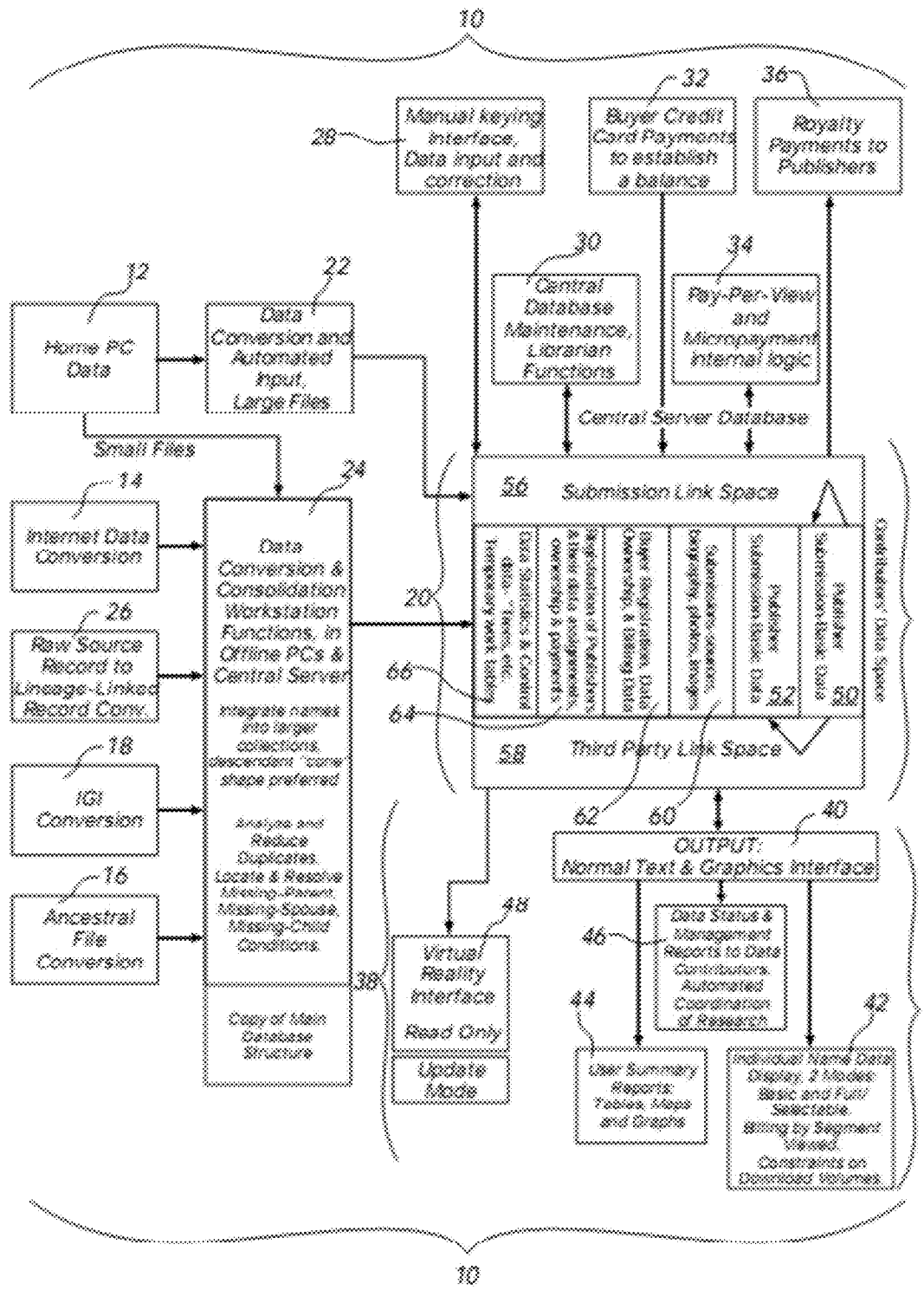
FIG. 1 shows a block diagram of an embodiment of a genealogy registry system, including data sources, the main server database, and output options.

In an embodiment of the present disclosure, there are four important features of new technology that are needed to accomplish a complete re-engineering of the genealogy industry so that productivity improvements of many hundreds of times over current methods can be realized. These four important features are identified below:

1. Unique number. In an embodiment, a process for establishing a unique number for every past, present, and future inhabitant of the planet. This makes it possible to completely end the duplication of names in genealogy research, and to gather all relevant data about an individual into one logical location. It also makes it possible to turn the entire Internet into a single integrated (virtual) genealogy database, so that the bulkiest data can be distributed over thousands or millions of separate websites. (Numerous attempts have been made over the past several decades to create a useful numbering system, but any successful ones have all been focused on a local view of a small amount of data. Attempts at a global numbering system have been completely unworkable, requiring, for example, a large central bureaucracy to administer such a manual system. None have proposed using a computer in the way used here.)

2. Descendent structure database. In an embodiment, a database procedure, structure, and format that inherently eliminates nearly all duplication and makes collaboration and cooperation efficient and effective, which, by itself, without reference to any other features of the overall system, makes efficiency gains of up to 1000-to-1 a common and expected result. That 1000-to-1 efficiency gain occurs when a participant can put in one unit of data and receive back 1000 units of data that directly relate to the participant's research objectives, that extra 1000 units of data having been prepared by other participants.

3. Quality. In an embodiment, a computerized mechanism for defining the quality levels of individual names and collections of names so that only the highest quality data are used for most operations, and the lower quality data can be isolated and hidden from public view to avoid confusion, at least until it has been improved to an acceptable level of professional quality. (Nearly all public genealogy data prepared and presented by individuals are of such low quality as to be only of marginal value to other researchers. It may comprise of nothing more than a name and a relationship, and even the name may be merely "Mrs. Jones." This ubiquitous low-quality means that nearly all research must be redone by the next researcher, who typically also leaves a nearly unusable product behind. The difficulty of today's procedures and the enormous time demands it makes seems to mean that almost no one takes the extra trouble to carefully document the data they assemble. They see it as only for their use anyway, so why bother?)

4. Fairness and financial incentives. In an embodiment, a computerized financial system and online marketplace that allows sale of data on a network about individual historical names, with royalties from those on-line sales going back to the data owners who entered and improved the data. Since any person using the system might be both a seller and a purchaser of data, the computerized financial system needs to be able to net out the balances and make periodic payments (or charges) where appropriate. This feature is a major contributor to fairness of the system so that those who do the most work and the best work receive the largest amount in royalties. That should encourage people to quickly complete large blocks of genealogy, as for complete nations. In today's world, some of the people with the best data and the largest amount of data have every reason to hide and horde that data, based on past practices. Otherwise they strongly tend to be exploited by others who are less diligent. Many of the less skilled and less diligent are happy to take the completed work done by others, and offer nothing in return, either in the way of useful data or of money. And then, to add insult to injury, some of these lazier and less skilled data collectors put the data into new databases and may damage them or diminish them in the process. That can be a source of great irritation to the people who did the original work and were the suppliers of the data. The new computerized system as disclosed herein will give them many incentives to put their best data online where others can see them and purchase them. This also removes the need for the data owners to continually answer email requests from other researchers. Since their best data are online, there is no need for them to constantly reselect and repackage data for other researchers.

DETAILED DESCRIPTION

Before the present genealogy registry system is disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

The publications and other reference materials referred to herein to describe the background of the invention and to provide additional detail regarding its practice are hereby incorporated by reference. The references discussed herein are provided solely for their disclosure prior to the filing date of the present application. Nothing herein is to be construed as an admission that the inventors are not entitled to antedate such disclosure by virtue of prior invention. It must be noted that, as used in this specification and the appended claims, the singular forms "a," "an," and "the" include plural referents unless the context clearly dictates otherwise. Thus, for example, reference to a genealogy registry system containing "a program" includes reference to two or more of such programs, reference to "a data structure" includes reference to one or more of such data structures, and reference to "a central server database" includes reference to two or more of such central server databases. In describing and claiming the present invention, the following terminology will be used in accordance with the definitions set out below. As used herein, "comprising," "including," "containing," "characterized by," and grammatical equivalents thereof are inclusive or open-ended terms that do not exclude additional, unrecited elements or method steps. "Comprising" is to be interpreted as including the more restrictive terms "consisting of" and "consisting essentially of." As used herein, "consisting of" and grammatical equivalents thereof exclude any element, step, or ingredient not specified in the claim. As used herein, "consisting essentially of" and grammatical equivalents thereof limit the scope of a claim to the specified materials or steps and those that do not materially affect the basic and novel characteristic or characteristics of the claimed invention. As used herein, a "publisher" or "contributor" is a person who submits genealogical data for inclusion in the genealogy registry system. As used herein, a "user" or "searcher" is a person who obtains genealogical data from the genealogy registry system. In its simplest, overview form, in one embodiment the system includes a large Internet site connected intermittently to many thousands or even millions of PCs, located anywhere in the world, plus local and remote connections to a smaller number of powerful PCs, which are referred to here as data consolidation workstations.

FIG. 1 shows a block diagram illustrating the major components of one embodiment of a genealogy registry system 10. The block diagram illustrates how the system 10 interacts with the world. It shows numerous data input sources and processes, the central database structure, some internal processing categories, and numerous output categories. Different sets of transactions are used by publishers and users. Some user transactions are free, while some involve billing for data viewed.

Input.

FIG. 1 shows four illustrative examples of sources for lineage-linked data: Home PC Data 12, Internet Data 14, Ancestral File (AF) 16, and International Genealogical Index 18 (IGI; a large database operated by The Church of Jesus Christ of Latter-day Saints containing some 300 million names and including limited linking data, such as parent-child and husband-wife). Where the home PC data set is large and is owned and maintained by a serious genealogist, the data may be uploaded to the central server database 20 using a computer program, represented by the data conversion box 22. Smaller files from less serious genealogists may be collected by file transfer or diskette to a consolidation workstation 24, where such smaller files undergo various processes and are included in a much larger name collection to be sent on to the central server database 20.

Another category of input data is described as Raw Source Records 26. These data may come from many different sources including direct transfer from other computers, or manual and automated record conversion from paper and microfilm. Such data may require more extensive processing than data that are already lineage-linked.

The Data Conversion and Consolidation Workstation.

The Data Conversion and Consolidation Workstation 24, in one embodiment, contains three kinds of programs: (1) for accepting many small lineage-linked data collections from individuals or from locations on the Internet and processing them into much larger consolidated collections; (2) for accepting large sets of raw data, such as a series of U.S. decennial censuses, and turning them into a set of lineage-linked families; and (3) for accepting large, specialized, machine-readable collections such as the International Genealogical Index (IGI) and Ancestral File (AF) and processing them into a lineage-linked format suitable for adding to the central server database 20. All of these functions can go on in the central Internet site, but central site performance will be improved by executing these specialized and computer-intensive operations on separate computers where possible.

Internal and Maintenance Programs and Processes.

Embodiments of some of the programs, called the manual keying interface 28, allow manual updates to the data and links after they have been added to the main database. Programs referred to as central database maintenance and librarian functions 30 handle general administrative functions such as updating fee schedules and devising formats for entering new types of source reference data.

Another program 32 is configured for accepting money transfers from users, through credit cards or other electronic means. Other programs 34 may handle the internal user payper-view and micro-payment processes. Another set 36 issues periodic royalty payments to publishers.

Output.

Still referring to FIG. 1, the area 38 below the main database shows the main outputs of the system 10. The normal text and graphics interface 40 uses different programs 42 to display name data in one of two modes, an "express" view that shows the minimum identifying data about a person and his or her links to all family members, or a selectable mode that can show anything from the minimum data up to the full data stored for that person. User billing is executed by an integrated set of programs that charge by data segment viewed, based on user preference, from the minimum segment up to the full set of segments available for that name. Another set of programs meters the outflow of data, and may limit the flow of data or change billing rates based on flow rates.

Beside the basic data display mechanism, there may also be programs 44 to allow users to see summaries of data presented in table, graph, or map form.

Metadata program functions 46 may be available to show database status and various database management reports so users can all participate in database improvement. Through these programs users can learn what is in the database and what is not, allowing them to better manage their time and efforts. Programs may also produce reports for automated coordination of research.

Another set of programs 48 may produce a virtual reality world view of the database contents using user-supplied parameters to determine the size of the virtual world. It can portray the entire database as a large building containing a network of spheres interconnected with rods, representing individuals and their family relationships. One can swing or slide through the spheres, going along relationship "rods" in any direction to find the relevant contents and limits of the current database. Touching any sphere will cause it to reveal information in addition to the name, birth date, and birth place. A menu of items available will appear.

Main Database.

Figure 2:
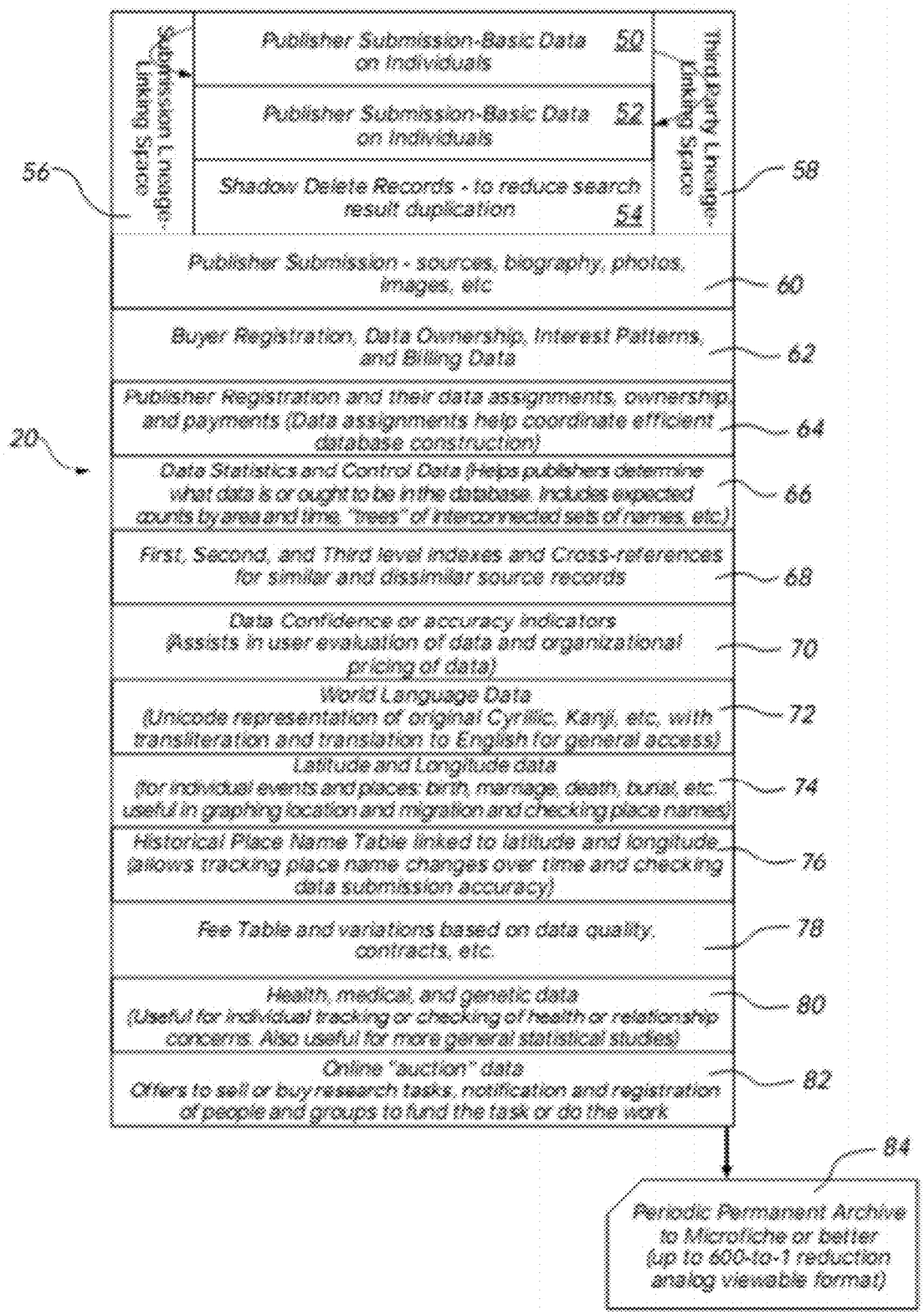
FIG. 2 shows a block diagram for describing types of data stored in an embodiment of a central server database.

An embodiment of the central server database 20 is also represented in a simplified form in FIG. 1 and in greater detail in FIG. 2. Two or more sections 50, 52 (labeled "Publisher Submission—Basic Data on Individuals") may provide space to store the main tables of information about individuals. Shadow Delete Records 54 (shown in FIG. 2) provide a way to remove duplicate names from the normal search and viewing process to minimize the efforts users must expend to find the desired data. Submission Lineage-Linking Space 56 represents storage of the submission internal name-linking records. These records include a person-identifying number, a code showing his or her relationship to another person, and the number of that other person. There is one record for each relationship between one person and another.

In some embodiments, a Third-Party Lineage-Linking Space 58 represents programs that allow an interested party to add links between database names without making any changes to the submission data. The link records may contain the same data as the internal link records, but also contain the identifying number of the person who submits the link record.

Main Database Data Types.

There are many other kinds of data that may be stored in the database. The data types listed below generally do not correspond to actual database tables in the database. Each category may represent several physical tables or only a part of one or more tables. Publisher Submission—Basic Data on Individuals 50, 52 store lineage-linked or "finished" names in large numbers—an estimated 500 million names for the United States, 500 million for Europe, and, later, data from all parts of the globe, up to a total of about 10 billion linked names. The Submission Lineage-Linking Space 56, as described above, stores the submission internal name-linking records. The Third-Party Lineage-Linking Space 58, also described above, allows any interested party to add links between database names without making any changes to the submission data. Publisher Submissions 60 is for storing a variety of information on names stored in the central server database, such as source references, biography, photos, source record images, audio and video clips, and the like. Buyer Registration, Data Ownership, Interest patterns, and Billing Data 62 is for keeping track of buyers of genealogical data, owners of data stored in the database, interest patterns of buyers, and billing data with respect to buyers of data. Publisher Registration 64 is for recording the data assignments of publishers, ownership of data by the publishers, and royalty payments to the publishers. Data assignments help coordinate efficient database construction. Data Statistics and Control data 66 helps publishers determine what data are or ought to be in the database. This information includes expected counts by area and time, "trees" of interconnected sets of names, and the like. First, Second, and Third level indexes and Cross-references 68 are for indexing and cross-referencing similar and dissimilar source records of data. Data Confidence or accuracy indicators 70 assists in user evaluation of data and in central site pricing of data. World Language Data 72 is a unicode representation of original Cyrillic, Kanji, and other characters with transliteration and translation to English for general access. Latitude and Longitude data 74 is for geographical location of individual events and places: birth, marriage, death, burial, and so forth. These latitude and longitude data are useful in graphing locations, migrations, and checking place names. Historical Place Name Table linked to latitude and longitude 76 allows tracking place name changes over time and checking data submission accuracy. Fee Table 78 is for assigning fees for data and variations based on data quality, contracts, and the like. Health, medical, and genetic data 80 are useful for individual tracking or checking of health or relationship concerns. These data are also useful for more general statistical studies. The Online Auction Data 82 may automate much of the notification and negotiation process for matching one or more users (i.e., buyers) and one or more publishers (i.e., sellers) for specific genealogy research tasks.

The system 10 may include a routine and/or hardware for periodic permanent archiving 84 of the database contents to microfiche or some more compact and equally durable medium.

Another embodiment of the system 10 includes a separate version of the database established with different cost and quality constraints, suitable for use by beginning publishers and users for training and data preparation. It will also be used for other low volume, less disciplined, more freeform uses, such as leaving an "I was here" or "We were here" message to the world or a time-capsule family message to future generations.

The database may store data about the people who interact with the system, such as the publishers and users. This information may include contact data and billing or royalty payment data, and pricing rates and rules.

Individuals using the site will be able to prepare genealogical data to be transferred to the Internet site to be "published," as that term is used herein. A much larger number of people called "users" or "searchers" herein, will search through the central site for data that relate to their family, paying small amounts as they view new material.

The searchers are mostly people with a hobbyist's interest in genealogy. The publishers include some of that amateur group, but will also include professional and semi-professional workers who make their first or second incomes in this activity.

The people working at their home, office, or library may convert the many private and public record sets that make up the world's genealogical data into lineage-linked format to add to the genealogy registry database of the present invention. There will also be some special situations where the central site is connected to devices that are involved in the direct conversion of paper or microfilm records to a computer usable format, including scanners of various kinds.

There are many web sites that store large amounts of raw unlinked genealogy data in machine-readable form. In most cases it would not be necessary to duplicate those resources, but data from these sites can be reorganized on the genealogy registry site of the present invention. There will be cases where it is convenient to collect and store unlinked data that do not appear on other sites. The main web site and workstation facilities of the present invention can help turn this new raw material into finished lineage-linked form.

Operation of the Genealogy Registry System

Functions of embodiments of the system 10 include (1) collect from publishers sets of names linked into families, preferably in descendant form, (2) allow updates and further linking with other collections of names submitted by other publishers, (3) charge small fees to buyers for names, links, and other individual and family data viewed, and (4) remit these fees as royalties to the publishers, after deducting the cost of site operation. Data interfaces may include the normal text and images in a Graphic User Interface, plus a Virtual Reality version as well.

Most large collections of genealogy data are simply huge lists of raw or unconnected names. Changing the paradigm so that each name stored and each sub-component of data about the name are separately displayed and billed, represents a huge increase in the level of computing detail that must be handled. This is one of the contributions of this system.

Collecting Data—Sources.

One source of quality data is from skilled genealogists who are willing to publish their data in return for royalties. Data from publishers possessing significant quantities of genealogy data can be sent in directly from a home PC after automated conversion from a GEDCOM file. It can also be entered directly into the central database by keying data into the "express" or short-form screens or by keying it into the full data screens. It can also be mailed or sent by file transfer to a central processing site.

The descendant form of data organization is preferred because it simplifies describing boundaries between publishers' work, and it also minimizes the labor needed to further interlink the many publishers' submissions. This descendant form is sometimes referred to herein as a "cone" because the earliest ancestor in the pedigree forms the point of the cone with each succeeding generation broadening the base of the cone.

Collecting Data—Other Options.

Smaller linked GEDCOM files can be collected into one central location where a special data consolidation workstation can help to match and join these names into much larger collections. These data might be chosen from among the data collections already on the Internet.

Large sets of records, such as census, land, birth, death, and the like can be prepared. Special computer assistance would then be used to create linked files out of these mostly unlinked files.

Large existing files that contain some name linking, such as the Ancestral File (AF) and International Genealogical Index (IGI), can be converted into a suitable lineage-linked form with adequate quality controls.

Improving Quality and Linking.

An important function, that still remains to be done after the large descendant "cones" of linked data have been collected, is to further link names together among those cones. Typically, a descendant cone of data will comprise about one-half of the names all having the same surname, the other half being the wives and husbands who married into the "clan." Many of these imported spouses will at first not yet be connected to their parents in another surname descendant collection. When these family connections are discovered in the database, a separate set of links can be created to complete those ties between all descendant collections. The workstation and Add Link programs illustrate the algorithms used in this important process.

Sales of Pay-Per-View Data.

Those seeking to find family data using embodiments of the system 10 may register, pay a small startup fee, and then begin the search process. In some embodiments, before paying any fees, they can search far enough into the database to discover if it contains any data on their family line. After they have found the first name that is a close family member such as a father or grandfather, they can move around in the database, along links that exist. As each new name is chosen, along with the types of data to be revealed about that name, the buyer is charged a small fee and is shown the data.

In some embodiments, after a person has selected and paid for a name and accompanying data, a record will be made so that he will not be charged again if he views that name and data again. If he elects to see more data about the person, he will be charged only for the new data.

There will be a temptation for some people or companies to try to take large numbers of names off the database to be displayed in private or commercial databases, on or off the Internet. To avoid such abuses of the system, there may be a limit on the number of names per day allowed to be downloaded. At each session logon, the number of names already viewed for that day may be computed. The new name allowance will be the maximum daily limit minus those names already viewed. This limitation will allow users to satisfy their interests within a few days, while keeping the rate low enough to discourage drawing off large numbers of names for other purposes.

Optional Display of Data Through Virtual Reality Interface.

The Virtual Reality interface 48 allows a user to view large amounts of family data in 3-D network form, without the constraints of having to make constant keyboard entries to control the navigation and viewing in two dimensions of a 3-D network of names. This convenience and enhanced experience may require the users to pay an operating premium for the names seen, plus it may require that they have access to a faster Internet link, and a powerful PC with a large monitor. Even more sophisticated virtual reality equipment could be used with the same data to give the impression of a room-sized or movie-sized screen, with direct participant involvement.

Function and Module Lists.

In the next section the function menus as they appear in one embodiment of the system 10 are described, with an explanation of what each operation does.

Publishing.

Embodiments of a publishing system create an alternative place for publishing genealogy data. When data are published in a book, many people will never even realize that the book might have some data of interest to them, since only the title is likely to be listed, and the title usually only includes a single person's name or a single surname. The book sales may be quite low because people usually only want a small segment of the book. When all the names are published and indexed on the Internet, then there should be more sales, because people can find, select, and pay for just the data they want. There will likely be sales of fewer data to any particular person, but there will be sales to many more people. Publishing routines can be added to the system for facilitating publishing of do-it-yourself books. The user can specify the data, to be in ascending or descending form, and let the system collect and print it all. Editorial support can also be available.

Overcoming Duplication and Loss. Past genealogy procedures the world has used comprise paper systems or relatively small accumulations of names in linked electronic form on a home PC. Online internet sources are mostly limited to copies of the PC format data or large lists of raw data such as births, deaths, and the like.

Today there is massive duplication of effort by earnest people lacking the best tools. Previous systems use the needle-in-the-haystack approach to genealogy. Nearly every new name or family sought can require going to a new set of records, and each new set of records may require a whole new set of skills and perhaps even a new language. It is believed that enough energy is expended in one year to complete the entire system and database described herein.

Social Benefits. The system may help hobbyists and roots searchers to quickly learn of their past kindred. This can have the effect of strengthening the family and the nation as other genealogists have commented. But it can also have many other benefits. It may help make the study of genetic diseases many times easier than today. As a companion to the Human Genome project sponsored by the National Institutes of Health, which recently published a first draft of the sequence of the human genome, the present invention could provide the data needed to quickly trace genetic histories so that sophisticated theories of genetic transmission could be examined.

Efficiencies. One efficiency improvement of the system is the ability if provides for tens of thousands of people to share, evaluate, correct, update, and link data in near-real-time. This gets more people involved. Moreover, "macro-genealogy," the process of studying and joining separate units of genealogical data as might typically be in GEDCOM units, can reduce the linking workload factor.

Operation—PC Data. Large amounts of high quality data in GEDCOM format found on home PCs or elsewhere can be converted to HTML by downloaded Microsoft Visual FoxPro programs or other programs, and then uploaded to the main database automatically or semi-automatically, without re-keying. Alternatively, for smaller collections of names or those of lower data quality, the GEDCOM or similar data can be sent to a workstation where it is matched and merged with other small GEDCOM data sets before being moved to the main database in bulk, perhaps in groups of one million names.

Data Sources—Manual Entry. The system, in some embodiments, supports the direct entry and correction of all data to the full set of data fields that will be supported. For smaller collections of data, or for corrections, this manual entry may be the preferred way to enter the data. A set of "Express" screens may also allow publishers to enter efficiently just the minimum identifying data about each person and his or her relationships.

Data Improvement and Database Maintenance Operations. In addition to other methods of entering of new data, there may be thousands of participants locating and linking names together, as where a link can be found to a person's parents in another publisher's area. In operation, the system may have a few skilled operators using specialized transactions to monitor operations and occasionally correct and move data within the main database, as when a set of names is transferred to a new person for maintenance, or some error of registration or billing occurs.

Data Consolidation Workstation. In embodiments of the system, this set of functions can run on a specially equipped PC or on the central server. In the separate PC version, the programs accept and analyze a large number of small files, converting them to a common database format, almost identical to the main database. A series of operations then joins them together where possible, eliminating duplicates, resulting in large completed collections of perhaps one million names each, suitable for loading into the main database. More specifically the programs may: (1) gather statistics on incoming data concerning such things as surname distribution (see discussion of "cones"), time and place of data, and the like; (2) analyze newly received data to determine its level of duplication with the existing database; (3) analyze incoming data to determine the number of separate "trees" or linked sets of names that are contained in the data collection, and provide a way to separate out those linked segments for treatment; (4) compute levels of possible extension to the existing database by comparing the number of missing-parent and missing-spouse names in incoming data with the data that could provide the parents (or vice versa) and thus extend the connections; and (5) for incoming missing-parent and missing-spouse names, actually make the various levels of exact or near comparisons with the new and existing database and show the candidate links to an operator for verification or probability judgement. At that point a code may be entered to indicate the level of proof or level of confidence for data and links.

Input Data to Data Consolidation Workstation Function. Many types of genealogical data exist in the world, and the system may include facilities to place all such types into a common format. Some of the major categories of such data include: (1) Lineage-linked names found on home PCs. Small collections of names in various formats including GEDCOM formats, could be sent to a workstation where it would be matched and merged with other small data files before being moved the main database in bulk, perhaps in groups of one million names. (2) Lineage-linked data found on the Internet. Such data are downloaded from the Internet and converted to a form acceptable to the workstation, usually GEDCOM, if not in that form already. (3) Source record to lineage-linked records. A major conversion process is involved here before sending the data to the workstation function. The most well-documented way to create lineage linked records is to start with the source records, and, in a top-down, oldest to youngest fashion, construct the pedigree, usually in a descendant form. When a segment is completed it can be added to the main database after being consolidated. (4) International Genealogical Index (IGI) data. This huge file can be placed on a specialized large workstation and converted into lineage linked format, with removal of massive duplicates. It may still be short of the level of quality needed to enter into the main database. A comparison with paper records may be necessary. It might be done in segments and then added to the workstation for cleanup and linking. Even in its converted form, it may only be useful as a model or guide for linking of other versions of the same name, date and place data. (5) Ancestral File (AF) data. Convert this file into a suitable addition to the main database, or like the IGI, just use it as a guide while putting together other sources of the same name coverage. This could also be done in segments, and placed in the workstation for consolidation. (6) There are many other data sources and formats, but solving the above problems should take care of most situations with small variations.

Central Server Main Relational Database Structure and Use

The design for the central database may allow for all the needed functions to go on simultaneously. In some embodiments, the publishers, i.e., the people who prepare the names for entry into the system, will each be assigned a block of numbers as the place to enter their data. The number is made up of a sequential publisher identification number, plus an extension of up to six digits for up to one million names or larger depending on the expected contribution of the publisher. That set of numbers can be viewed by others but cannot be modified. Publishers will enter in the various kinds of data records associated with each person, and will specify the relationship links between them. In some embodiments, the identification number may contain multiple elements. One embodiment of a multiple element identification number is described below in relation to FIG. 13.

There may be an area set aside for third parties to specify links between people. These third party entries can include a new name, plus a series of links to connect that name with people in other areas of the database or they might just add links between existing people.

The main table in the database may have a reference name, for example, "Person_T." The table may contain the identifying number assigned to that person, which number is a combination of the publisher's number (nine digits at this point), plus a five or six digit sequential number, allowing up to 999,999 names in a particular submission by that publisher. The table also contains the name, the basic identifying data such as birth date, christening date, death date, or burial date, plus any comments about those basic identifying items.

Other tables containing data about the person may be "Text_T" to hold textual biographical data, "Photo_T" which holds references to photo images stored about that person, and "Image_T" to hold references to images of source records stored about that person. Other similar tables can be added as other data types are added, such as audio or video clips.

The Links_T table may link together name records in family or any other relationships. It may contain just the number of the focus person, the number of the person to whom he or she is related, and the nature of the relationship. So, for example, a man with number 1 might have a wife with number 2, and the link record would have his number, her number and an indicator that the relationship is spouse-wife.

This Links_T table can be used separately from the Person_T name data record to do such things as trace one's pedigree up, down, or sideways. When the basic linking data have been gathered, the Person_T table can be used to supply the actual names for a report. The TR* (trace) temporary table is used in the search process to store the results before the report is sent to the user's screen.

The Links_T table can similarly be used to compute which names of a bulk submission are actually linked together in some way, so that the submission can be divided into "trees" for processing. In that case the WST1* and WST2*(workstation temporary 1 and 2) tables are used as temporary work tables and the Tree_T table is used to store the final results.

The Marriage_T table holds the basic data about the marriage event and any modifying comments about the marriage. The table contains the identifying numbers of both of the people, so that the record can be found using either number.

The Links_T2 table is available for publishers to record links between people in any of the submission spaces, as they find new connections. This link record is the same as the Links_T record except that it also includes the publisher number of the person creating the link record.

The publishers may be required to register before they can enter data, and they may receive an identifying number at that time. They record their contact information, and their password. The table Publisher_t contains this information. It also keeps track of the next sequential number to be used when new person data are to be added to the data space for that publisher. It also contains their royalty status, that is, the amount earned and due to them.

The buyers of data may also be required to register before they can enter data, and they may receive an identifying number at that time. They record their contact information, and their password. The table Buyer_t contains this information. It also contains their billing information such as their credit card number, and their current balance and total usage.

Another table, "Buylog_T." may record all of a buyer's activity, including the names he has viewed and the data items he has selected. This can allow statistical review of buyer activity.

A related table, Paid_t," may include a summary of the Buylog_t information. It is used to determine whether a buyer has ever paid for a particular name and related data sub-elements before, so that he or she will not be charged again for the same information.

The "Fee_Set_T" table may contain the fees currently being charged for the different elements of data stored about a person. It is used both to charge the users and to assign royalties to the publishers.

The "MT1*" (matching temporary table 1) may provide workspace for the workstation matching program, as it examines missing parent, missing spouse, and missing child conditions.

The "Register_cones" table may allow a publisher to indicate his interest and intent as to data to be added to the database. It can then serve as a place to coordinate work and avoid unintended duplication.

The "Gedcom_t" table may be used to register and control GEDCOM projects and page inputs by publishers through the client-side HTML interface.

Shadow Deletes to Reduce Duplication. This topic is more complex than others related to data updates, so a separate discussion is provided here. The competing design goals of retaining all submissions intact while also providing maximum links between them and minimum duplication among them requires some creative database work. The shadow update method is one technique for accomplishing this objective. This shadow method means there are two or more layers of data that may be required to be read by any search transaction, and the result interpreted and displayed to the user.

One of the important design goals of this system is to allow any qualified person to make a data submission and to keep that submission intact. However, this almost ensures that there will be overlapping submissions and the resulting duplicate entries. With multiple occurrences of the same name, the normal consequence is that the various search screens used to gain access to the data will list all those occurrences. A user would thus have to guess which version to try, or be faced with the need to check them all out. There are anecdotal reports of one case where a request was submitted to a genealogy search engine and 20,000 hits were obtained. It would be very inefficient to check all 20,000 of these hits.

In prior genealogical databases, each name on the search list allows entry into a different pedigree structure that can be navigated and examined. For each of those names one could request an ancestor summary report and thus know which one might contain the most data and so be most interesting to examine. But that could lead to huge amounts of confusion and endless duplication of effort by all users interested in any particular set of people. It would be better to consolidate the data and minimize the number of names one needs to examine. In effect, the computer and professional participants would do most of this work before the users even looked at the data.

The solution implemented in one embodiment herein is to allow all the submitted data to remain in place, but to allow for any interested person to put in a transaction to remove any particular name from the search list, a special form of a delete.

When there is more than one submission that contains relationship data for any one person, it would be ideal if the best of all that data were retained for use, but the redundant data were hidden from view, but remain available for review, if needed. The redundant data might later be completely deleted, but that step is not important except for internal database tidiness.

When submissions overlap, duplicate names should have the benefit of connections to data in both submissions. So, when someone "deletes" a duplicate name, that person would also have the responsibility to see that all the right connections from the remaining name were made into the other submission that he was partially deleting.

It should be noted that the process being discussed is the third-party ADD LINK process that connects related submissions together, plus another step that removes the excess, duplicate names from any search lists to avoid confusion and wasted effort, and then checks the reasonableness of that "delete" before allowing it. In the ADD LINK scenario there are no deletes. When there are overlapping submissions, the shorter pedigree is "deleted" but links from the shorter pedigree are added to the longer pedigree. In this way, anyone who entered his pedigree structure through the search list would have the benefit of all that is known about that name.

This is a good technical solution, because it maximizes the number of links between names, although it still leaves too many routes into the data for some names. It also, unfortunately, minimizes the economic incentives for people to make these connections, since they normally get no extra income from having made those connections.

Both or all submitting parties could make all these same kinds of connections, and thus have all the paths available into the data, which paths may be nearly equivalent. But the troublesome duplication still remains to confuse the users.

As a means of increasing the economic incentive to minimize duplication, publishers could make the links needed and then through "deletes" make their names the only ones that show up in the search lists for that area of the database.

The process is cumulative. First the submitters make the connections from the shorter pedigree to the longer pedigree. Then they enter delete transactions to make the duplicate names disappear from search lists.

The computer support that can be given to this splicing/hiding process in one embodiment is as follows. The delete transaction contains the number of the name to be deleted, the number of the replacement name, and the user number of the person submitting the transaction. To make sure that the deleting person has done his homework (and keeps it current in the future), the delete record will have an indicator that must be set on to put and keep the transaction in effect. Before the record is stored in the database and the indicator is set on, the computer first counts the connections of the old name to be deleted. It then counts the connections of the name to replace it. The new name must have at least as many links backward (plus spouse and children—sideways and forward) as does the old name. This check is not conclusive, but it ensures that the person making the deletion has done his homework. To limit search time, the search on the new name need only go back far enough to show that it is equal to or greater then the old name. Otherwise no switch is set on, and the apparent duplication continues to appear.

It is believed that the care and thoughtfulness of a hand link done by a professional will always be preferred to any automatic process. Such an automatic process has been used in the Ancestral File and has not proved very accurate. Mistakes that would be obvious to a human examiner are allowed by the computer algorithms. It is believed there is time available to do it all manually, this careful knitting together of the submission data. Once thousands of people can work together at one time, most of the barriers to completing the process are removed.

Having once taken care of the first-line names, i.e., the first point of intersection of submissions meaning those farthest back in time in one submission, the question then moves to all the other names further forward in the pedigree, the rest of the overlap area. In one embodiment, the process is just the same, except that in the check-search, the search can stop one line of its search once it hits a "deleted" record in one of its branches. This should cut down the machine time needed to validate a proposed delete transaction.

Setting up these delete transactions to lower duplication could be a lot of work, but it will bring a good result. In most cases, the data will be quite stable. However, there is one case where the arrangement may not be too stable. This is where the data of both submissions cover exactly the same data to exactly the same depth. In that case it is not obvious who should act to delete the other's data. If one participant deletes all the other participant's data in this way, and then if the person whose data were deleted adds one generation back to his data, and the other submission administrator does not immediately add the appropriate extra links to his version of the data, suddenly the original delete transaction would not be valid on a periodic re-compute. In fact, the hiding of a whole surname line might be undone, the series of deletes might "collapse" as the most ancient delete was invalidated and then other more recent deletes further down in the submission overlay area were also invalidated.

This is good and bad—it makes the data seem unstable in some rare cases, but it also puts the onus on the party making the deletion to keep extending the data so that his data are not deleted by another. There is a financial incentive to avoid having one's data deleted in that income is lost to another person if one's data are deleted and the other person's data are used.

Indexing and Cross-Reference. One valuable service provided in one embodiment of the central genealogy system is the indexing and cross indexing of the mass of data that exists on genealogy topics. As names are entered into the Genealogy Registry system and their source references are added, the participants will be constructing an index, whether or not the original record set had its own index. As multiple source references are added for each person, suddenly new record-set interrelationships become possible, for automatic or manual construction and use. This concentration of data around historical individuals also makes possible studies that would not be feasible otherwise.

A social history methodology known as "records stripping" has been used to index and analyze all available historical records from an area to obtain a picture of life at a certain place and time, a technique used to good effect in early American history in Virginia, Maryland, Massachusetts, and so forth. If many researchers put many source references into the Genealogy Registry system for each person, from many different record types, a kind of "records stripping" social history database on a national scale would be produced. The researchers could be anywhere in the world where they might have access to the records, instead of having to have a group of students or data entry people organized just for that purpose for a specific area. With all those kinds of records pivoted on or indexed to one person, you would also then automatically have cross-references among all the kinds of records so indexed. That might include cross-references between records of the same type but with different cataloguing because at a different archive location, or between records of different types. Having found one person with a link into the records you might be interested in, you could use that link to help find other related persons mentioned in those records, such as children, wives, parents, neighbors, and the like.

Similarly, working from the opposite direction, there might be indexed records that have the same source reference notation, such as two census records entries, or two land record entries, perhaps put in by different people, where both references point to the same person or to related people (on a common page). These matching references could then be checked to see what people they point to. If they point to the same person, you might not have any new information, but just a confirmation. Or if they point to two different numbered people with the same name, a duplicate situation that needs attention may have been found. It is simple to reverse cross-references, and it is quite remarkable what they can do to point out errors, duplicates, and omissions.

If the people pointed to are different but related, their names should be added to the database if they are not already there, and the new references could be added or linked, as appropriate, to the individuals involved, thus more nearly completing the "records stripping" process for a few more people.

All the above processes provide incremental "puzzle solution" methods of going from the known to the unknown as steps in completing all links and all possible source documentation for each and every person. When the process reaches its logical conclusion, there will be a "records stripping" result for the entire nation or world—integrated indexes from and to all people and records. This completed database would provide a window into the lives and times of all these people.

Researchers who wish to integrate the information from all the indexed sources might have to go to each of those referenced record sources to get the data they need. However, in the perfect case, all the records would be available online in image or text form so that a researcher could quickly compile all the data on any particular person or group.

There will often be some more esoteric benefits from having all these records indexed to one person. Higher level cross-references can be constructed from these data, either automatically or manually, depending on record counts and structure. At a minimum, having seen the constellation of record references that relate to one person, there might be some logical leaps to other useful related data.

One notable and practical study of this type focused on the differing tobacco raising and marketing techniques of Virginia versus Maryland over a two hundred year period. It comprised mostly commercial data that were historically recorded and survived for use in the study. If data of other types survived, there could be many other more personal possibilities. The key, of course, would be to begin by asking useful questions that the combined data can answer. Could court records for a particular area be used to show what landowners were more contentious than others? Did this indicate a feud of some sort? Could the travels of a relative who was a census taker or tax collector be reconstructed from land records and the census and tax data that were recorded? Could the building of a family dynasty be traced through marriage and land acquisition? Land and marriage records might tell this story. Health and mortality records could indicate that an area of the county was more or less healthy than some other area, perhaps because of mosquitoes, cholera, snakes, and the like.

The regular features of embodiments of the database would make possible what has been mentioned above. The basic first and second level indexes are already part of the system. How might the more esoteric indexes or cross-references, once created, be stored for general use? Presumably they would each be fairly small, since they would typically cover only a small geographic area.

Theoretically, dozens of cross-reference indexes could be built using the "records stripping" data all indexed on single names. Twelve record sets taken two at a time would comprise 66 cross-references. But all might not be useful combinations. It would be possible to create temporary subsets of these derivative cross-references as needed by selecting on an area, time, or the like. The underlying data would be changing all the time, so a permanent index could cause problems by not staying current.

Although the exact process is not described in minute detail, it is assumed that the "records stripping" process used by others was done by someone entering all the names they could find in various source documents, then copying all the records on paper or microfilm to transport to an office for detailed study. The indexes could then be used to examine all the data. In many cases the source records were entered completely in machine-readable format so that the data could be quickly consolidated for any particular person or family. Also, family structures could be assembled.

Some cross-references would be of fairly general use. For example, a census-name-to-land-ownership-record cross-reference could be constructed mostly automatically, as a spin-off from the "records-stripping" activity described above. It could be very large and might be entitled to have a permanent place of its own.

Other created cross-references could be stored using techniques found in the old CICS Mantis/VSAM mainframe methods. Two generic cross-reference fields would be provided and indexed. A cross-reference type identifying number would be assigned to each record. A title file would record what kinds of indexes/data were available and the number of the index to be used to access it.

Returning now to the index facilities provided by the basic Genealogy Registry system, the cross-reference record has just two fields—the person number and the source record reference. Sorting it by the person number shows what source records were entered for one person. Sorting it by the source record reference shows what people may be covered by one reference, such as many people on a single census page. If all the people on the page do not show up, then someone has not entered them all or has not added the source references to their entries.

Record Counts. The data processing consequences of such record stripping processes will now be briefly discussed. If it is assumed there are 12,000 people to be studied and 20 available entries for each person in a lifetime, then there are 240,000 index entries to be made. That might include 200,000 document pages, assuming there are multiple names per document page in some cases. At 300 pages per inch, that is 700 inches, or about 60 feet of shelf space, or about 10 filing cabinets full. Those 20 entries per individual might be about 20 pages of data for each person. For example, there might be 5 census entries in 50 years, 1 cemetery entry, 1 birth entry, 1 death entry, 1 marriage entry, 1 jail entry, 1 probate entry, 2 land entries, and so forth.

These rather large record counts could make the data entry process rather expensive. However, if the work can be widely distributed among participants, it becomes more feasible, especially if there are many descendants of the studied group who might be willing to contribute some time and effort through a central mechanism.

The programs that are detailed above are sufficient to run the basic version of the system and do what is necessary to be successful. However, there are several important enhancements that may be added to increase the versatility and power of the system.

Source Records to Linked Records Processing. This is a feature that could be the source of huge amounts of quality data for the site. For example, all of the decennial census records for 1790 through 1960 for an entire state, or a smaller area if a full state proves impractical, can be taken. It may even be better if done regionally, using portions of the state or even portions of cites. That would allow the data workers to get to know the whole city or area and be able to make the right connections.

Many people could enter the raw data, or assemble it from existing sources. A smaller number of people could then put it together. It would be important to provide the maximum computer support to encourage work in this area.

The data would be viewed as layers of data to be combined about the same people. Having so much data all at once should allow nearly all ambiguities and possible solutions to be matched at once—e.g. all the local John Smith's would be together, so one could sort them all out, or at least identify all the questionable ones.

It would be similar to the problem of linking the family fragments found in the IGI, but the census records may actually contain more data useful for linking generations. The best possible accuracy should be obtained since the data comes directly from source records.

As with the IGI and other data, the workstation programs may be used, which provide "missing parent," "missing spouse," and missing child" logic for linking.

Maps Showing Locations of Ancestors' Births, Marriages, Deaths, Burials, or Other Data. Methods for showing locations for genealogical data in some embodiments include the following. A set of maps, with the latitude/longitude ranges pertaining to them, and a full X/Y overlay to plot points, put all together as an HTML/GIF set, and handed to the server to return to the user is one way of handing this. The map may be a standard HTML/GIF page of the US, Europe, and so forth, and then a transparent GIF overlay may be created with the plotted point data. This was the method used to create the sample screen print shown in FIG. 3.

Another way to handle this question is to pass data and parameters to Microsoft Excel and have it send back a map in HTML/GIF format and then make that page available to the user. The data would be collected and summarized using SQL from the main database and then passed in tabular form to the map subroutines (classes).

A more sophisticated mapping service could be constructed using such resources as the U.S. Geological Survey maps and aerial photos available at http://mapping.usgs.gov.

Conversion of International Genealogical Index (IGI) to Genealogy Registry Database. The IGI is a huge database of about 300 million names. It mostly contains family fragments, such as two people being married, and two people having a child. This mass of data would be sorted into potential family form, using the three person parent-child records to construct the family with the full set of children, and then use the marriage records to confirm the couple's marriage.

In some embodiments using IGI data, the IGI data would first be reduced to a tentative family form and then made available to seasoned genealogists to compare to other records, such as the family group sheets that were often the basis for the events recorded in the IGI.

The routines developed and tested for the data consolidation workstation function, which measure interconnectedness and duplication, may be modified to start with the consolidated fragments of families and apply the same link-seeking logic used for GEDCOM input. The next processing steps could be carried out using the standard system features.

Conversion of Ancestral File (AF) to Genealogy Registry Database. Some embodiments may include data from this 30 million name lineage-linked database added to the main system. However, the quality problems are formidable and it may be that this database will not in fact be useful. Most of the data were submitted long ago by people who were just beginning genealogy hobbyists performing a church assignment, and there are likely to be many errors. There are likely to be few, if any, source record references. It may be that the only way to use this database is to have more careful genealogists take the data, check it, add source record references and submit it piecemeal.

In some embodiments of the system, the existing GEDCOM routines may be used without modification. The data would be added to the Genealogy Registry database, and the normal correction and linking processes could be used until it reached a satisfactory quality level.

Automatic Coordination of Research Report—Compute High Interest Areas of Database Based on User Data Requests. People who use the system will, in essence, be voting with their user fees for the areas of the database they want to see extended. After many users have examined and used the database, areas of high interest will be computed based on their cumulative choices. The process will involve scanning all names that are at the end of a surname line, where the next set of parents is missing, and determining whether those last names in the surname line have been purchased by one or more buyers. Such purchases will indicate a likely interest in knowing the next generation back. The report will especially focus on those names which have large numbers of buyers, indicating many interested descendants. These names and database areas should be of special interest to researchers. The report will be available online to researchers to help them plan their work. The system will also allow for a name reservation system for researchers to use to prevent duplication of research in these new areas.

Figures 3, 4:
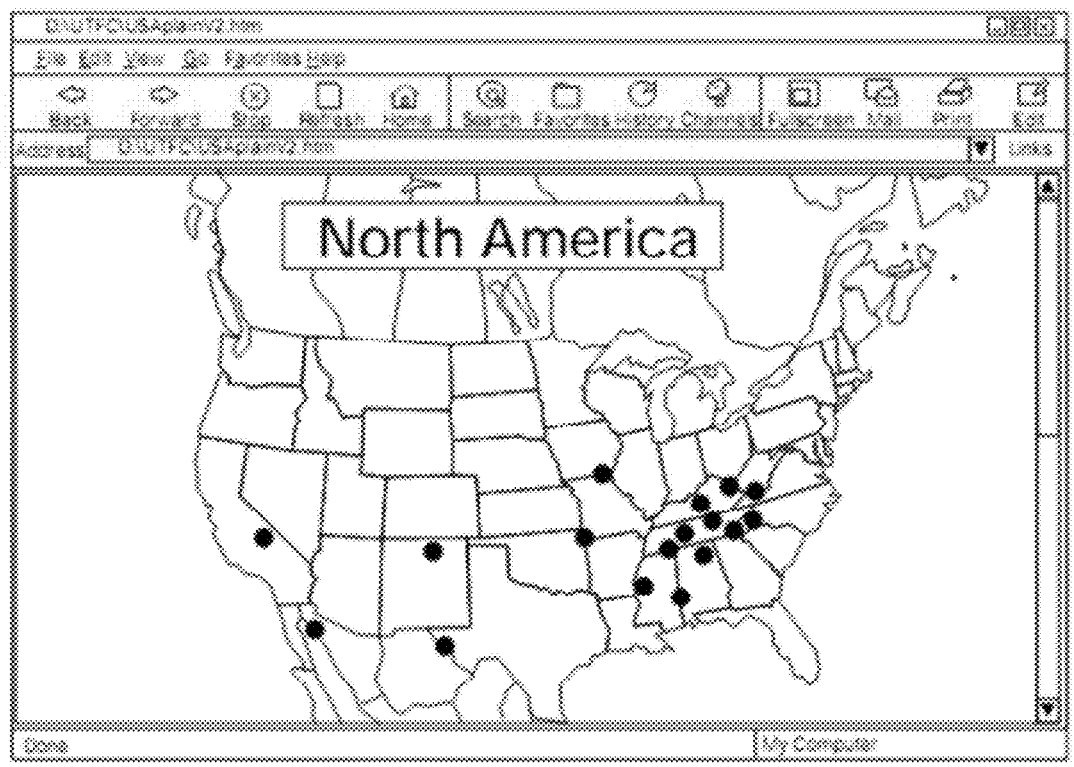
FIG. 3 shows one embodiment of an illustrative screen view of locations on a map of North America.
FIG. 4 shows one embodiment of an illustrative automatic research coordination report.

An embodiment of an automatic research coordination report is shown in FIG. 4. This illustrative report shows a list of surnames for which no parents are linked to the earliest person in pedigree. The birth year and identification number of such person are also provided in the report. In addition, the number of database users likely to be interested in data that would extend the database to an earlier time in a pedigree is also provided. Such a report shows high interest areas, which should spur and focus research plans. As a separate but related feature, the system may allow publishers to express their intent to do a particular research task, which will help in avoiding duplication of efforts. Other publishers or researchers may propose cooperation, if appropriate. Publishers can also use this feature for finding a user or group of users that may want to fund the project. Similarly, users can also describe a task to be done and then seek both assistance in funding it from other users and estimates and proposals from interested publishers or researchers. These task definitions and reservations are intended to be at a much smaller and more detailed level than the broader ones the publishers use to define their general domain of responsibility. These task definitions and reservations may be limited to just one or a few names on a particular surname line. Embodiments of the present system automate much of the advertising and negotiation process to find and match buyer groups and seller groups for specific tasks.

In some embodiments, one enhancement is an auction system which would enable either database users or researchers to propose specific research projects and agree to contract terms among themselves. Finally, the feature set could be broadened to prepare similar statistics on possible lists of expected, but missing, spouses and children.

Virtual Reality Interface. This feature has been briefly described above, and the basic software to construct such an interface exists and has been used to create and display a valid and working prototype. For example, the Virtual Reality Interface may use a Virtual Reality Modeling Language (VRML) world model of a family tree using VRML code generated at the server for each data request, and a Cosmo Player browser plug-in is used at the user PC level to display and manipulate it. The virtual reality feature may use essentially the same data as the normal interface. In the virtual reality presentation, the data may be presented in a different way, making much larger amounts of data visible at one time, or at least seem to, with quick zooming and panning as the user follows his interests in the database. It will require a faster-than-normal internet connection, and either a larger-than-normal monitor or special virtual reality hardware. The faster speed connections are becoming more common, so use of this feature may soon merely depend on having the correct equipment at the user's location. Either a virtual reality headset or a large or specialized monitor may be needed to get the intended experience, but it may be possible to use a normal monitor and have a more restricted experience.

Online "Auction" or "Bulletin Board" Facility. In embodiments of the system, this facility automates much of the notification and negotiation process to find and match a buyer or groups of buyers with a seller or groups of sellers to accomplish specific genealogy research tasks.

The Automatic Research and Coordination Report (e.g., FIG. 4) reveals high interest areas of the database to spur and focus research plans. As a separate but related and more general feature, the system may allow publishers to express their intent to do a particular research task so that others will know to avoid duplicating it. Alternatively, others may propose cooperation in accomplishing the research task, if that is appropriate. Publishers could use this feature to try to find a user or group of users to individually or collectively fund the project. Similarly, users could also describe a task to be done and then seek both assistance in funding it from other users and estimates and proposals from interested publishers.

These task definitions and reservations are at a much smaller or more detailed level than the broader ones the publishers use to define their general domain of responsibility. They may be limited to just one or a few names on a particular surname line.

Publisher and User Processing

Figure 5:
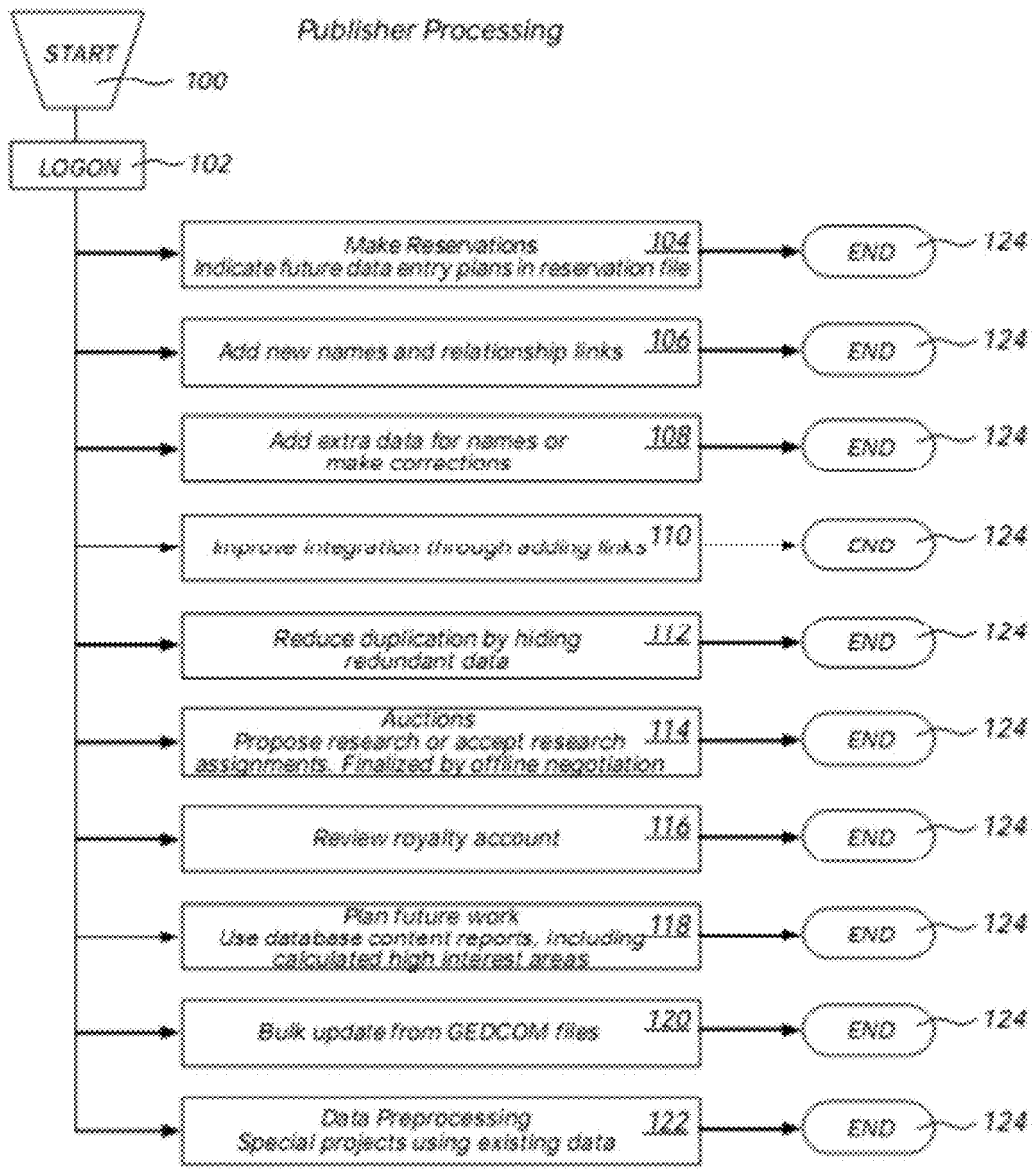
FIG. 5 shows a flow chart that illustrates one embodiment of a method for transactions that can be made by a publisher using the genealogy registry system.

FIG. 5 summarizes the transactions that a publisher can make with one embodiment of a genealogy registry system. The publisher starts 100 any transactions with the system by logging on to the system 102. After successful logon, the publisher can transact any of the following: make reservations 104 by indicating future data entry plans in the reservation file, add new names and relationship links 106, add extra data 108 for names already in the database and/or make corrections to data, improve integration through adding links 110, reduce duplication by hiding redundant data 112, participate in an auction 114 by proposing research or accepting a research assignment, review the publisher's royalty account 116, plan future work 118 through use of database content reports including calculated high interest areas, make bulk updates from GEDCOM files 120, and preprocess data 122 such as special projects using existing public data. The publisher can end 124 the session at any time.

Figure 6:
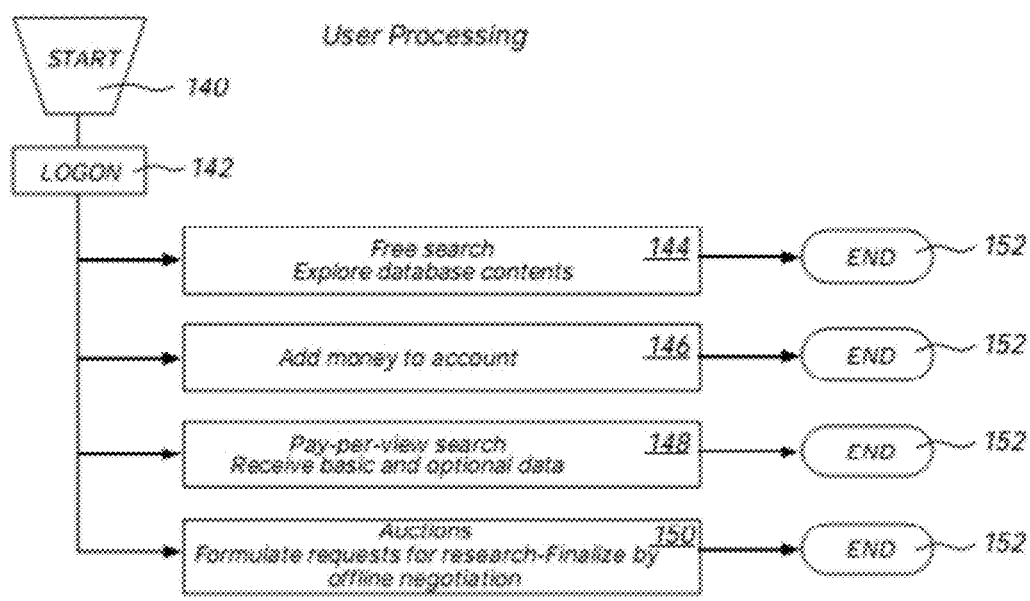
FIG. 6 shows a flow chart that illustrates one embodiment of a method for transactions that can be made by a user of the genealogy registry system of the present invention.

FIG. 6 summarizes the transactions that a user can make using one embodiment of a genealogy registry system. The user starts 140 any transactions with the system by logging on to the system 142. After successful logon, the publisher can transact any of the following: conduct a free search 144 such as exploring the general contents of the database, add money to the user's account 146, conduct a pay-per-view search 148 including receive and optional data, and participate in an auction 150 such as formulating requests for future research. The user can end 152 the session at any time.

Figure 7:
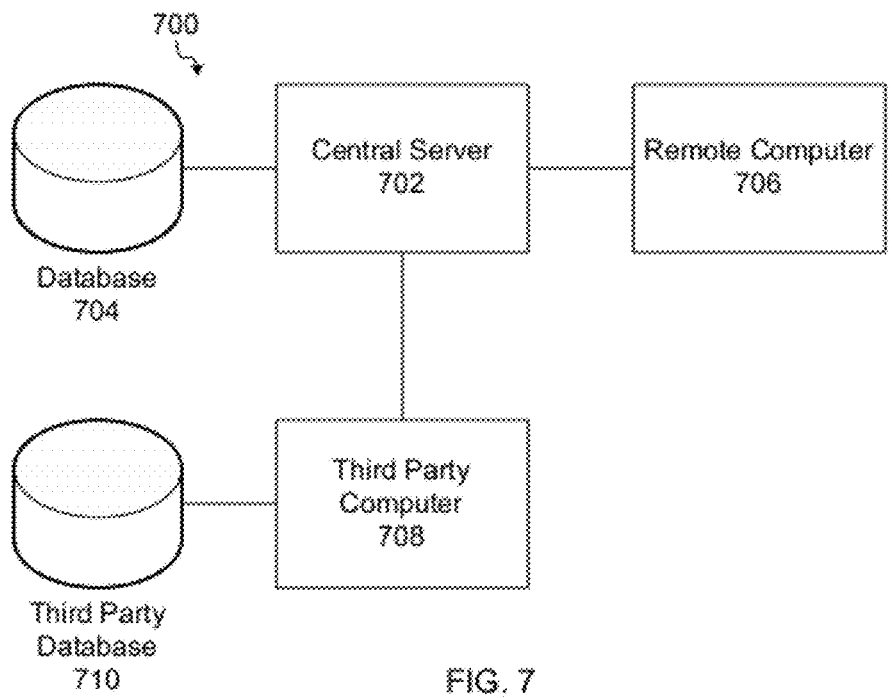
FIG. 7 shows a block diagram of one embodiment of a system for genealogy research.

FIG. 7 shows a block diagram of one embodiment of a system 700 for genealogy research. The system 700 includes a central server 702, a remote computer 706, and a third party computer 708. The system 700 provides resources and methods for improving the efficiency of genealogical research.

The central server 702, in one embodiment, is a computer system programmed to perform functions relating to genealogical research as described herein. Embodiments of the central server 702 include one or more processors, computer memory, persistent data storage (e.g. a hard drive, flash memory, storage medium or another type of persistent data storage), and a network connection interface.

The central server 702 may be connected to a database 704. The database 704, in some embodiments, includes data relating to genealogy. For example, the database 704 may include information about individuals, their parents, and their children. The database 704 may be connected to the central server 702 using any known method of communicating data. For example, the database 704 and the central server 702 may be connected using a network connection.

In the illustrated embodiment, the database 704 is distinct from the central server 702. In an alternate embodiment, the database 704 is integrated with the central server 702. For example, the database 704 may be stored within a hard drive in the central server 702.

The remote computer 706, in some embodiments, is a computer system programmed to provide a user interface to access the central server 702. The remote computer may include one or more processors, computer memory, persistent data storage (e.g. a hard drive, flash memory, or another type of persistent data storage), a display, and a network connection interface.

The remote computer 706 is connected to the central server 702 in one embodiment. The remote computer 706 may be connected to the central server 702 using any known method of communicating data. For example, the remote computer 706 and the central server 702 may be connected using a network connection, such as an Internet connection.

In certain embodiments, the remote computer 706 may include a user interface displayed on a display. For example, the remote computer 706 may include a web browser. The central server 702 may host a website having webpages that are accessible at the remote computer 706 as is known to one having ordinary skill in the art. A user may access the central server 702 and the database 704 using the remote computer 706. The remote computer 706 may provide tools for viewing, submitting and/or modifying data in the database 704.

The third party computer 708, in one embodiment, is a computer system programmed to provide access to third party data. The third party computer 708 may include one or more processors, computer memory, persistent data storage (e.g. a hard drive, flash memory, or another type of persistent data storage), and a network connection interface.

In some embodiments, the third party computer 708 is connected to the central server 702 by a data connection, such as a network link. The third party computer 708 may provide access to third party data through the data connection to the central server 702.

The third party computer 708 may be connected to a third party database 710. The third party database 710, in some embodiments, includes third party data relating to genealogy. For example, the third party database 710 may include information about individuals, their parents, and their children. The third party database 710 may be connected to the third party computer 708 using any known method of communicating data. For example, the third party database 710 and the third party computer 708 may be connected using a network connection.

In the illustrated embodiment, the third party database 710 is distinct from the third party computer 708. In an alternate embodiment, the third party database 710 is integrated with the third party computer 708. For example, the third party database 710 may be stored within a hard drive in the third party computer 708.

Figure 8:
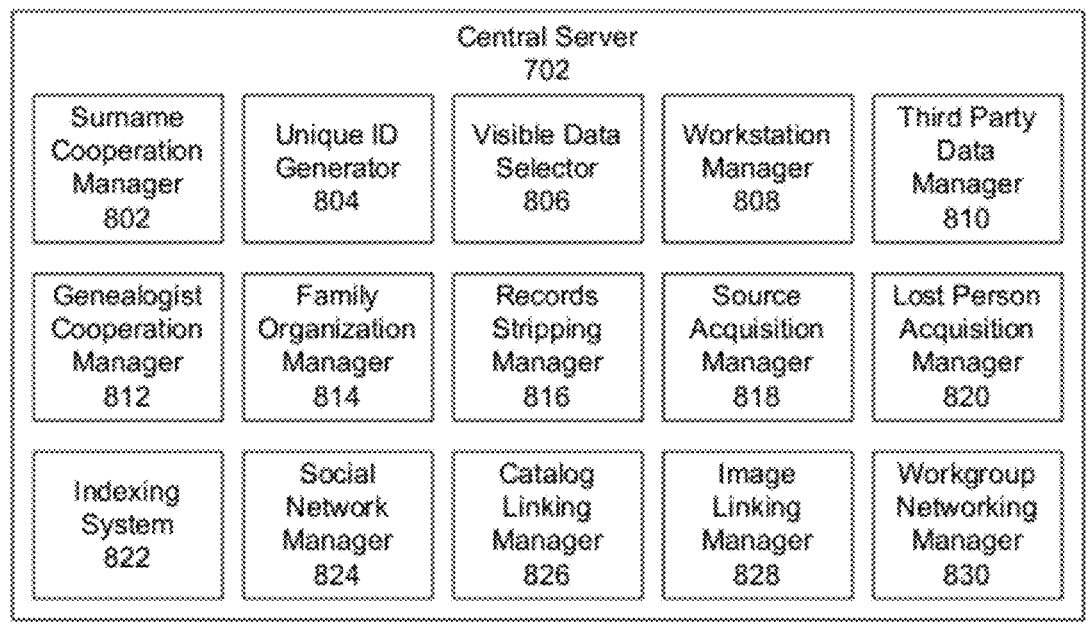
FIG. 8 shows a block diagram of one embodiment of the central server of FIG. 7.

FIG. 8 shows a block diagram of one embodiment of the central server 702 of FIG. 7. The central server 702 is programmed to perform functions relating to genealogical research. The programmed functions may include computer code, hardware, or both adapted to cause the computer to perform genealogical research functions. The computer code may be stored in a storage medium, such as a computer disk, flash memory, or another persistent storage medium. The functions on the central server 702 may include subroutines, programs, or algorithms that perform the functions. The functions may include a surname cooperation manager 802, a unique ID generator 804, a visible data selector 806, a workstation manager 808, a third party data manager 810, a genealogist cooperation manager 812, a family organization manager 814, a records stripping manager 816, a source acquisition manager 818, a lost person acquisition manager 820, an indexing system 822, a social network manager 824, a catalog linking manager 826, an image linking manager 828, and a workgroup networking manager 830.

The surname cooperation manager 802, in one embodiment, manages cooperation between researchers among surnames. Conceptually, the database may be organized so that names appear in single-surname descendent structures which are logically adjacent to each other. See FIG. 11 which looks like a pizza pie with each slice being a descendent structure. These slices may be connected together with links between where the women appear as daughters and where they appear as wives. Given this organization, the surname cooperation manager 802 allows any number of cooperating genealogists to put in their descendent-sequence data, and then link it to all other relevant descendent structures through the women. When participants have finished, they may receive a 10-generation pedigree covering 1024 surnames, for themselves and for their cousins of different or the same surname. In other words, a participant puts in one unit of data—his single-surname descendent structure—and receives back the 1000+ units of data for other surnames which he needs to complete his 10-generation pedigree. This 1000-to-1 payoff provides a significant incentive for serious genealogists to participate in this project.

In one embodiment, the unique ID generator 804 assigns a unique ID to individuals. This provides another means of widespread cooperation where researchers can compile significant amounts of data which then can be linked into a central index where they are attached to specific unique individuals. Existing methods do not allow the freedom to act in this cooperative fashion because there is no reliable way to coordinate their efforts.

The unique ID generator 804 may have the capacity to assign each living and historical person on the planet a unique ID. As a result, it becomes possible to provide a key that can be used on any number of websites to link data to a unique person. There is a natural desire to link all data about a single person with that person. But even with our great advances in computer technology, it is still impractical to attempt to store every conceivable item of data about one person in a single location. Those items might include home movies, journals, photographs, audio clips, obituaries, court records, census records, birth records, land records, etc., etc. However, the database 704 may contain a brief summary of all the identifying data about people, a unique ID for each person, and indexes and links to any number of other web sites containing voluminous data.

In some embodiments, the visible data selector 806 indicates which data should be visible in public searches. The database 704 may contain many types of data, and the ability to segregate that data by quality level. Newly entered data of poor quality may need to be segregated from that which is considered of publishable quality. In some cases, poor quality or duplicate data may be hidden from public search routines by the visible data selector 806. High quality data may lead to improved efficiency; by improving the quality of visible data, the efficiency of the searcher is improved.

The database 704 may simultaneously contain data of many different quality levels, with the ability, for example, to choose the highest quality level for "pay-per-view" purposes, or choose a lower quality level (with more extensive data) while trying to resolve some research question. The highest quality data may be a much smaller portion of the entire database, compared with bigger areas of lower quality. Much of this lower quality data may be in the process of improvement, and may change its status to a higher quality level later on. Managing this constant change of data quality status requires a simple and flexible system that can allow both automated and operator-controlled changes to what data is visible or invisible to public searches.

This ability to have multiple levels of data size and quality (when quality goes up, quantity of accessed data goes down, and vice versa) allows this single database 704 to serve the needs of many different kinds of researchers, and the varying needs of each particular researcher.

The workstation manager 808, in one embodiment, manages a workstation for assembling descendent structures. A researcher may extract individual-identifying data from record sources and transmit it to the appropriate part of the database 704 using several mechanisms. The data can be keyed in directly or can be keyed into a PC genealogy program which can then create a bulk transfer file called a GEDCOM (GEnealogy Data COMmunications) to be uploaded to the system 700.

Where the volume of data warrants it, a completely different procedure may be used. It is possible today to request all entries in all public records to be downloaded to a PC for a particular surname. For example, for the surname HUFF (including alternate spellings), which has a medium-large set of entries in the public records, the transcribed census record entries for the 15 censuses from 1792 to 1930 total about 180,000, varying from a few hundred entries in the earliest census to about 30,000 in the latest one. Altogether, there are probably about 30,000 Huff individuals described in the census records. The images of the original documents can also be downloaded as part of this single, very large request. One might expect to find another 30,000 birth records, 30,000 death records, etc., which could similarly be gathered to one machine for integration. Also, one can often find other materials in analog or digital form, such as published books, often in descendent sequence, which can be used together with the public records. These other materials may serve as a guide and as research to be verified.

The workstation manager 808 may manage a workstation to present available research materials almost instantaneously to the researcher so that the entire operation is working at the "brain bandwidth" of the researcher, not the relatively slow and often unpredictable Internet bandwidth, requiring constant re-specifying of searches, etc. Personal computers may operate significantly faster internally than the Internet, and the workstation, when loaded with the available records about a surname, may more fully harness that extra bandwidth to benefit the operator. Downloading this material might take many hours, but it can be done overnight or on the weekend, so that the operator need not oversee these tens of thousands of separate operations. With the data stored locally, the operator might have multiple different document pages open at any particular moment and is able to quickly switch among them.

In some embodiments, the third party data manager 810 manages indexing and marketing of widely scattered data found on third-party websites. This might also be called "pay-per-view micro-payment services."

This is one of the natural consequences of providing a worldwide unique number for each person. Data found anywhere on the web might be linked into one "virtual folder" through the use of this unique number. Data which had not yet been tied to an individual's unique number might still be placed on the web so that others might find or establish the correct number for people whose data appears on this isolated website.

Extending third party data management services to other websites offers yet another way for genealogists to cooperate and thus improve their overall efficiency. Small collections of data which might not otherwise merit their own data marketing systems can join this centralized system to be administered, with royalties flowing to the owners of those small islands of information. As an example, a genealogist might decide to put newspaper obituaries on the web for a particular city. That could be a very valuable service, but the administrative overhead of making that available nationally in an effective way might be excessive. If there were tens of thousands of genealogists providing localized data in this manner, it would clearly be beneficial to everyone to consolidate these many separate offerings. Having a reliable moneymaking outlet for the work of thousands of part-time genealogy entrepreneurs would provide a feasible way for even higher levels of cooperation among the nation's genealogists, as they each do their specialized part of the puzzle.

Those participating in this "integrated genealogy database" feature may choose to offer their materials for free, or they may request that the system 700 charge a fee and return that fee to the data supplier.

The genealogist cooperation manager 812, in one embodiment, manages cooperation between genealogists. The efficiencies of this system 700 may be very large for groups of a few thousand cooperating people, and become even larger and more certain with more participants covering more possible surnames. These efficiencies may be too vast for many genealogists to ignore, and many serious genealogists of the world may want to gain those advantages for themselves, while helping many others in the process.

The system 700 specifically provides for and encourages worldwide participation in several ways, including allowing for multiple bulk submissions of data from any person now living on the planet, plus the ability to revise and extend that data, plus having the option to submit any number of individually-held documents of genealogical significance.

The hypothesized increase in efficiency by managing cooperation through the genealogist cooperation manager 812 envisions starting with the largest single group of cooperating genealogists, the approximately 100,000 genealogists working within the various LDS Church genealogy projects. The hypothetical case is that if the LDS Church, with its very extensive investment in genealogy data and processes, were to offer the world an appropriate platform which everyone could use, that would magnify the efforts of that group of 100,000 genealogists by a significant factor. In addition, there are many more other genealogists in the world as there are now working within the LDS Church. It is easy to show that there are vast overlaps among the ancestors of interest to LDS Church members and the ancestors of interest to everyone else in the world, so cooperation would be of great value to everyone, without regard to religious affiliation. There are many other ways one could make this computation, but it seems valid to begin with the group that has the most ambition for completing the world's basic genealogy research, and thus the greatest interest in overall efficiency.

Alternatively, the genealogist cooperation manager 812 could start with a single researcher, and say that by adding many other researchers, the system 700 increased the efficiency of that one person significantly. Starting with a much larger group who, more or less, have a large common goal also results in a dramatic efficiency gain.

The family organization manager 814, in one embodiment, organizes a family organization, usually of same-surname cousins, to increase the pool of active participants. There may be thousands of same-surname cousins living today, all descendants of a single ancient ancestor. Many of them may have an interest in their ancient common ancestor, and many of them may be willing to help in documenting his descendants. If there are 2000 living descendants, it may often be possible to find 100 who would join in the project.

Note that for pedigree-sequence researchers, only a person and his full-blood siblings share a common pedigree, greatly narrowing the possible pool of assistants. Notice that a 10-generation pedigree requires the tracing of 1024 different surnames. Tracing two or three surname lines back 10 generations may be a lifetime work; tracing 1024 surname lines is virtually impossible to do alone, and it is also virtually impossible to find people who could help you by supplying data on each of those 1024 lines. By managing multiple family organizations and sharing the resulting data, however, the family organization manager 814 may greatly improve the efficiency of the system 700.

In some embodiments, the records stripping manager 816, correlates historical records concerning the individuals referenced in those records, creating an "individual level" national history.

Interest in the data in the database 704 by history and sociology academics may bring more resources into the project, including money and highly skilled manpower, to change and improve it for all concerned.

Genealogy is typically thought of as consisting merely of the finding and listing of names in a mostly clerical process.

This generally makes it of little interest to academics who are interested in the broader sweep of society. However, with the greatly increased ability to collect documents of every sort, and associate them with specific people in specific times and places, the database will begin to contain material of value not only to genealogists who want to understand their ancestors, but also to historians and sociologists who look at broader issues, and this new source of data should gain their support. On a few occasions, sociologists have collected records in the past for historical studies, using a process called "records stripping," but those few efforts were one-of-a-kind, on a small local basis, for a very limited purpose, and probably were relatively expensive.

In embodiments of the system 700, this "records stripping" process can now be done on a grand scale for multiple purposes, including personal genealogy, individual-level history, medical and genetic history, plus the original academic purposes of historical sociology. If whole sections of the nation have most historical records tied to individuals, this may become an attractive resource to these historical sociologists.

The source acquisition manager 818, in one embodiment, can acquire many more of the world's genealogically significant source record images through submissions by individual participants. Previous business models for genealogy data suppliers has been to have a single organization buy up rights to all significant pools of public data, and then charge rent to the disorganized public to gain access to that data. Embodiments of the system 700 will make individual genealogy researchers property owners in the data which they supply. If they supply a lot of data, and do an accurate and thorough job of it, then they are entitled to the royalty returns on their work. Part of this distributed ownership and supplying of data would be to give researchers incentives to supply any data which is not now held in suitable free public online storage, such as the LDS Church is supplying. These users could supply documents held privately by themselves and their family, and they might go on to supply high-quality images of public documents which are not now included in large online collections. There are important documents which are not available to the public for political, privacy, or contractual reasons, but which might be available to individuals whose names appear in those documents. Governments may withhold general public access to records unreasonably, but they are less likely to withhold those documents from those who appear in them. Through this individualized channel, many of these important documents may seep out for limited public use.

Other participants might find documents of use to them in this system, and so would not need to point to other systems or to acquire documents from other systems. This is another opportunity to avoid duplication, in this case, duplicate storage of identical documents. Although a URL may not be an adequate identifier for the document for this purpose, the library reference to these documents might be able to tip off participants of duplications. This duplication might either be prevented, or be removed after the fact, by changing one of the pointers to the common document. If some participant chooses to add a census document to this system, because it contains one name of interest to him, it would be unfortunate if that document appeared 20 times in the database because there were 19 other names on that census document. This situation would be avoided (almost automatically) by everyone using a single image source.

In one embodiment, the lost person acquisition manager 820 operates to reclaim data relating to the 20% to 25% of people lost to pedigree-sequence research. Descendent research includes a way of finding all possible names in the family tree. Notice that if one is doing only pedigree-sequence research on his own family line, that implies that there has been a continuous line of living, reproducing people down to the present. Any children of earlier families who died without producing offspring, of course, will not be in anyone's pedigree today, and so may never be researched. Even for those children who did produce some offspring, if that line of offspring did not continue down to the present time, and include some living people today, then there will probably be no one doing pedigree research which will include them.

Figure 18:
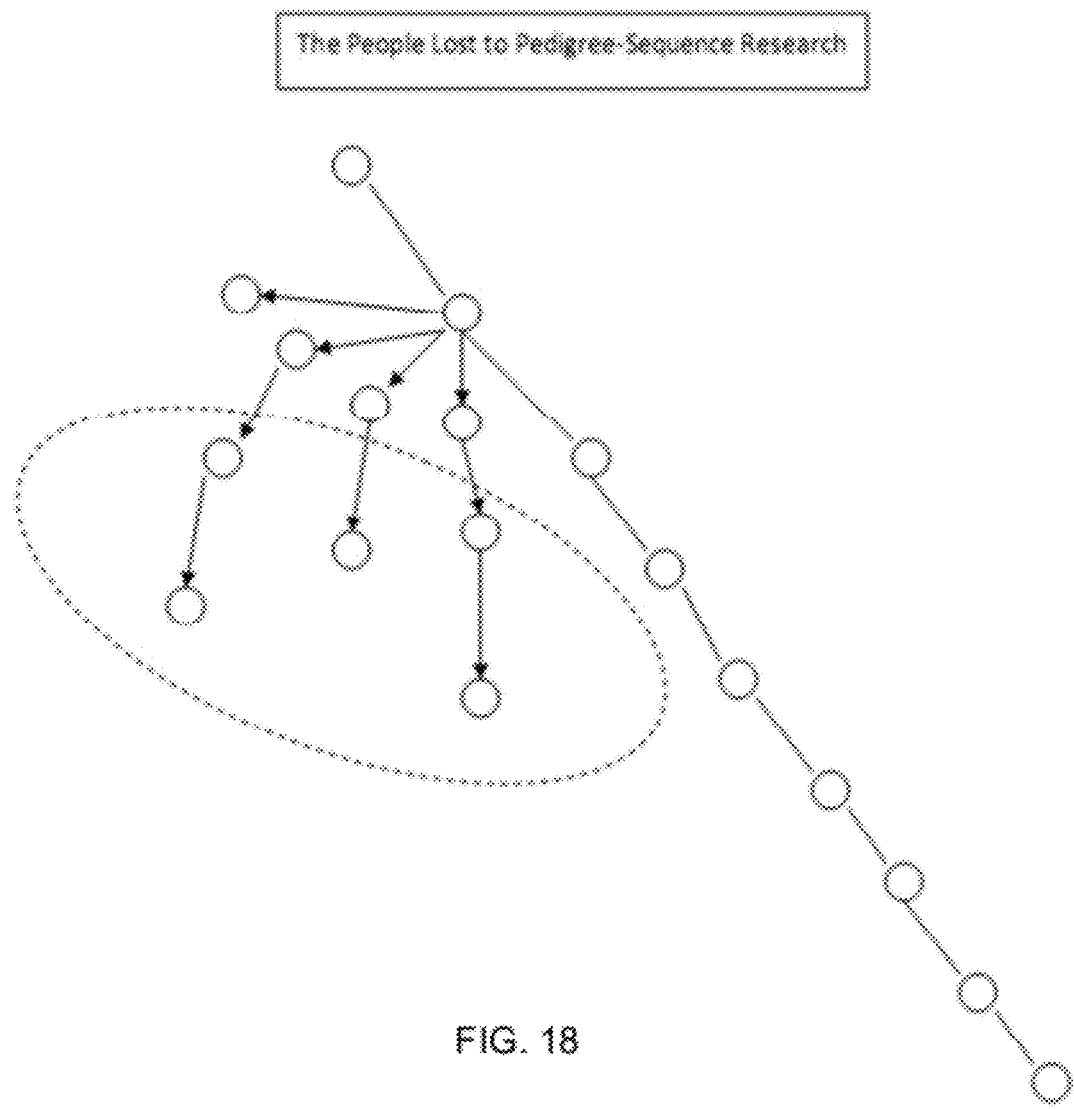
FIG. 18 shows a tree of related people and the individuals that may be recovered by one embodiment of the lost person acquisition manager of FIG. 8.

FIG. 18 shows an example pedigree that goes back several generations to a family which had five children, four of which are not in the descendant's pedigree. Some researchers will include those children in their research results, and some will not—technically, the children are not part of the researcher's pedigree, so they may be left out of that researcher's records. But even if those four children are included in that family and its records, it is possible that many of the descendants of those children will never have a person doing pedigree sequence research that will include them. Notice that in this case, the children themselves have children and grandchildren, but the lines stop before they come down to the present day. So all those "dangling" people will normally be missed by pedigree researchers in general.

This descendent-sequence research methodology greatly improves accuracy of the final database, since it will naturally include every known person. Historians, sociologists, medical researchers, and other non-genealogists may find this (otherwise missing) data of greater value, for different reasons, than many genealogists who seek only their direct ancestors. "Efficiency" computations may be a little more difficult here, since larger societal interests are served, as much as purely genealogical interests, as researchers trace their ancestors.

The indexing system 822, in one embodiment, provides a more accurate method for indexing source records. Today there are various indexing programs for source records which provide a "rough" index. Typically, indexing volunteers are presented essentially random pages of data to transcribe for indexing purposes. These participants find it difficult to develop any expertise in a particular set of records, including the handwriting of a particular person, etc., so the work they do often does not reach the highest professional standards of accuracy. Of course, what they do contribute offers a useful window into public records, even though there may be significant inaccuracies.

The indexing system 822 is a system for producing a high-quality, professional version of these indexes, created by people who become specialists in those records, partly because they have a personal interest in extracting data from those records. This "finished" high-quality index can gradually replace the temporary rough indexes which are being created today. This will gradually increase quality of research, and therefore efficiency, because it will remove many unknowns from the research process.

For example, note that transcribers/indexers on large centralized projects will usually transcribe every line of a document, but the quality of the transcription may be very un-even, since these people tend to not be specialists in the documents they read. In contrast, transcribers/indexers working on private projects of interest to them will usually transcribe only portions of a document, but the quality of the transcription may be very high, since these people are seeking their own people, and may take the time to become specialists in the documents they read. As part of a large cooperative effort, most of these blanks on the documents will be filled in by someone else for their own personal purposes. Periodically, all of these partial indexes can be sorted together so that someone can see what has been missed. At that point the transcribers are just filling in the holes rather than doing the whole document. Hopefully, the people doing this final step will also be the people who did some of the earlier steps of partial transcription.

In some embodiments, the social network manager 824 supports a type of history-based social networking. The social network manager 824 provides links among living people with similar interests or lineages, through historical documents and historical individuals. As an example, a ship's manifest for immigrants might be linked to every historical person on the manifest. Living people could find each other through those historical links and pursue topics of mutual interest, usually related to very specific topics of genealogy and history.

In one embodiment, the catalog linking manager 826, establishes links to an external catalog, such as the LDS Church main Genealogy Library catalog system and other important library systems containing genealogical data. Where feasible, links recorded in the database 704 to external sources are expected to contain formal library call numbers, along with the URL Internet links to online images and other materials. Establishing the official call number will make that a permanent (manual) link, regardless of whether the more volatile Internet URLs remain stable over time.

The first time library materials are located in the Genealogy Library catalog, for use in the system 700, that catalog information will be stored in the system 700 so that repetitive references do not require going back to the Genealogy Library catalog each time.

Other important library cataloguing systems include the BYU library and the Library of Congress. Other important repositories may be added as needed.

The image linking manager 828, in one embodiment, links to online images such as the developing LDS "Record Search" database. This new database will contain about 2.5 billion census and vital record images containing perhaps 40 billion names, and will be accessible for free.

Other private and commercial databases of a similar nature can also be linked to individual names in the database 704. This will greatly raise the quality of the data listed in the database 704 and will allow any interested users to re-examine and reverify the data quickly.

The workgroup networking manager 830, in some embodiments, manages access to multiple data spaces by multiple researchers. The workgroup networking manager 830 is described in greater detail in relation to FIG. 19A.

In addition, embodiments of the system 700 may provide or utilize the following features or improvements.

Researching in Descendent Sequence.

For each public record set examined, participating researchers are expected to extract all entries with the single surname they are researching. (Pedigree-sequence researchers would normally seek one or a few names to fill one node on their pedigree, and move on. These minimal extracts are of little use to any other researchers.) If one researcher does a high-quality job on all entries for a single surname, and records it properly in a central location, then no other researcher need repeat that work. It should easily be possible to extract much more data per unit of researcher time using this method, to the benefit of all participants. The central server 702 is designed to accept this data and make it available in the proper form to all other genealogy researchers participating in this project.

Under traditional methods, there is little point in doing this extra work, one reason being that there is no place to put it so that it benefits other people (so they in turn will have an incentive to do extra work in an efficient manner that will be of value to you). Embodiments of the system 700, which is designed to accept this data and make it available in the proper form to all other genealogy researchers participating in this project, results in this extra data gathering becoming a powerful aid to research.

Avoiding Duplication of Research.

The system 700, in some embodiments, will provide a reliable central location where a researcher can check the complete status of all past research. Currently, there is no such reliable central location where the current status of all past research can be examined. The weak and unreliable alternative is to try to find someone who has done relevant high-quality research and will share that research. It is quite rare for a researcher to find these ideal individual sources. In most cases, the only practical course is for researchers to completely redo all the research themselves. They may waste years of duplicate labor, and then further confuse the research process by flooding public databases with their low-quality, hurriedly-compiled results. This system 700 supplies that central location where researchers can quickly discover what work has already been done and to what quality level. The system 700 will both help them avoid duplication and also point out areas where more work is needed. It is hard to find many statistics on this point, but we have one good reference as to how to quantify the benefits of avoiding duplication. The LDS Church has been encouraging extensive genealogy research for 150 years, while making significant efforts to avoid duplication, and its resulting databases still contain about 30 entries for each actual unique person. United States genealogists spend at least 400 million hours of labor each year, a very large portion of which is spent in duplicating the work of others, which usually means most of it is wasted, or at least unnecessary.

Avoiding Duplication of Names in Database.

Most centralized collections of genealogy data contain massive amounts of duplication of names. This is an inevitable result of using pedigree-sequence methods to collect data. In the most ambitious example of centralized data collection, the LDS church genealogy system, name entries appear an average of about 30 times for each unique person. Attempts to merge these massive numbers of duplicate names through automated means typically gives chaotic results. When data are collected in descendent sequence, and pieced together by one person or a small cooperating group, the amount of duplication of names is normally extremely small. Every person in that same-surname descendent structure is known specifically by the data administrators, and any potential ambiguity or duplication can be resolved. Adoptions or other such unusual situations might produce ambiguities for perhaps only one in 1000 of the people. That compares rather well with the 30 duplications of each person in other situations.

When data are handled in this way there is very little opportunity for duplication to enter in. If another group is entering data on the same surname which overlaps with the data of other suppliers, without being aware of that overlap, that lack of awareness should be very short-lived, since they are both using this same database system. Normally, they should wish to contact each other and cooperate and collaborate to the extent possible for efficiency. In the unusual case where there is competition rather than cooperation, the system operator can intervene to either spark the beneficial cooperation or make one group's work visible and the other group's invisible. That internal duplication may continue to exist, but the searching public will probably never see it.

Reduction of Emails Requesting and Supplying Research Assistance.

Researchers today often spend a great deal of time requesting help from other researchers, and supplying help to those who have asked for it. This is a very inefficient process, since it is extremely difficult to know whom one should communicate with—who has the data, in other words. Those who do have large quantities of data often feel exploited by those who want to get the results of their hard work for free. Embodiments of the system 700 will replace the current blizzard of e-mails with features that are much more efficient and fair. Users will place all of their best data on the central site, and anyone who wishes to access that data can simply look. (There may be some small fees involved.) So there's no need to construct e-mails or go through the laborious process of answering them. Participants may gain a great deal of new data of value to them, plus, in the end, those who publish their materials on the website can receive royalties.

Database entries can be reverified hundreds of times to improve accuracy. Accuracy and thoroughness improves efficiency, simply because if people can trust the data, they won't waste their time repeating the research.

In the current situation, in various databases we may see 1000 versions of a name from 1000 researchers, and they may all be different and may all be wrong, since no one is checking anyone else's work, nor can they. Embodiments of the system 700 may result in a situation where 1000 interested people can each study a single entry for a single person to make sure it is as correct as possible.

A Focus on Original Records.

This is another aspect of the observation that accuracy can equal efficiency. By encouraging and facilitating the use of original records wherever possible, fewer research mistakes will be made in the first place, and any errors that do occur can be quickly corrected. Having high-quality data means being able to finish a research project with confidence that other people can and will use it and save large amounts of time. The slogan here is to "do it once, do it right, for everyone."

General enthusiasm from expecting a quick and satisfying completion of a nation's genealogy.

In embodiments of the system 700, overall efficiency increases simply because there will be more participants. Completing genealogy research is considered an impossible and infinite task, since hundreds of millions of hours have been thrown at the problem with relatively little progress being made each year. The mathematics of the current methodology do essentially make the process an infinite task, since the cost to do research goes up exponentially as the pedigree-sequence researcher pushes back in time. Using descendent-sequence research methods essentially flattens this previously exponential curve and makes it purely linear and arithmetic.

In today's environment where it is hard to see any overall progress from year to year, this can be quite discouraging to many people. However, like the fans of a winning football team, if genealogists can see before their eyes that the task can truly be finished in a relatively short time, which is the way many of them define victory, that should mean that many new people will join with the current hard-core genealogists (who trudge on regardless of current difficulties), to help quickly finish the job. Even "sunshine patriots" can still be pretty good soldiers.

Gifts of Genealogy Data (Genealogy "Gift Cards")

Embodiments of the system 700 will reduce the costs of genealogy research to the point where gifts of genealogical information become practical, even for friends who are not terribly close. If a four generation pedigree can be purchased for a relatively small fee (for example, $32), and a five generation pedigree can be purchased for a slightly higher fee (for example, $64), this puts a very personalized and valuable product within the range of common transactions among friends and family, no more costly than many books, or other such common gift items.

This sale of this product will move royalty money back to the people who supplied the data, encouraging them to do even more. The efficiency of the system creates a virtuous circle where efficiency adds to incentives, and following those incentives adds to efficiency, as the system grows to cover more people and achieve some economies of scale.

Figure 9:
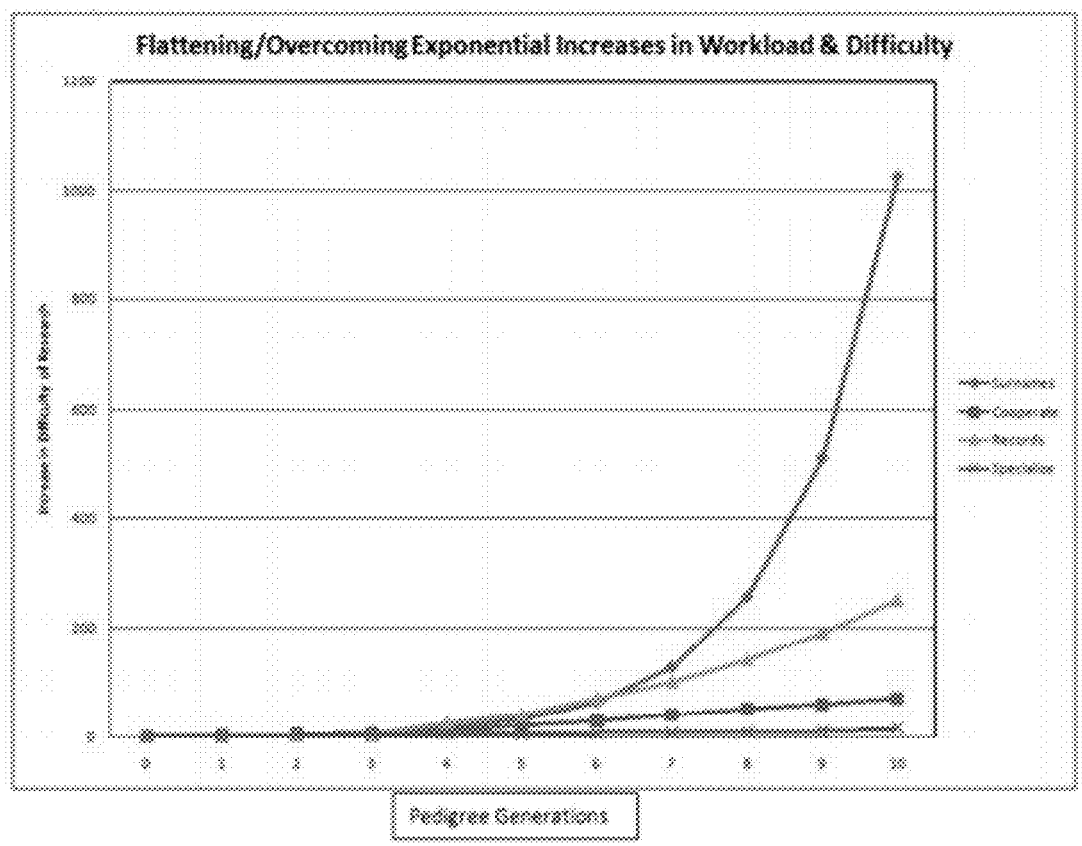
FIG. 9 shows a chart illustrating efficiency improvements attributable to one embodiment of a system for genealogical research.

FIG. 9 shows a chart illustrating efficiency improvements attributable to one embodiment of the system 700 for genealogical research. In the traditional pedigree-sequence method of doing genealogy research, every individual researcher is essentially working alone, with minimal ability to cooperate with others, and is facing a daunting binary increase in the number of surname lines at each step backwards in his pedigree generations. When he reaches 10 generations back, he would theoretically be faced with researching 1024 surname lines which might take him to anywhere on the planet in search of data. This is essentially an impossible task for a single human to complete, and I have yet to find someone who was completed it. Before computers, there really was no practical alternative to this pedigree-sequence method, with all its extreme problems with efficiency and productivity.

At the most general level, embodiments of the system can be viewed as a mathematical transformation of the traditional genealogy research process, from essentially an unsolvable problem, seemingly nearly infinite in size, to one which can be solved within reasonable time and cost constraints through cooperation. It begins by taking a process with an inherently exponentially increasing level of difficulty when done in the traditional, massively labor-intensive pedigree sequence, and ends by flattening that exponential process into a mostly linear process by creating a new kind of database, using a much more efficient descendent-sequence cooperative process, and then computing all the needed pedigrees from that body of work compiled in descendent sequence The chart includes a horizontal axis labeled as "Pedigree Generations" and a vertical axis labeled "Increase in Difficulty of Research." The "Surnames" line in the graph represents actual data, since the points are mathematically determined. The other three lines on the graph are estimates based on limited data. The shape of those lines may be refined as this process is implemented on a larger scale. The "Cooperate" line relates directly to the "Surnames" line, and is intended to illustrate the expected simplification of the genealogy research process. The "Records" line is intended to illustrate the increasing difficulty of dealing with older records, and the "Specialize" line is intended to illustrate the ability of participating researcher specialization and cooperation to flatten out the difficulties inherent in accessing the older genealogical records. The rate of increase of the "Records" line may actually be steeper than it is shown on this graph, but it will require more than limited anecdotal research experience to be more precise. The "Surnames" line and the "Records" line may also be combined into a fifth line to illustrate the cumulative increase in difficulty with an increase in pedigree generations.

Embodiments of the system 700 remove much of the exponential increase in difficulty as we progress back in time. By dividing up the task, with one researcher or family group specializing in one surname, and sharing the results among all participants, the system 700 almost completely flattens out the main problem of an exponential increase in workload as a person's pedigree doubles at each generation going backward.

The problem of the increasing difficulty of using older records is also greatly alleviated by having people specialize in the older records, so that more professional levels of data quality can be achieved more easily. Many of the problems of interpreting older records can be overcome through extensive study of the records and practice in their transcription. This specialization should make it unnecessary for every researcher to spend the enormous time and effort required to reach professional levels of competency concerning language and record content in order to locate just the mere handful of names they would typically be seeking if they were using traditional methods. The almost complete inability to specialize, seen in the ranks of the 4 million nonprofessional genealogy researchers, makes the traditional research methods they typically use extremely slow and costly.

In summary, when people have a robust tool to help them cooperate in doing genealogy research, everyone wins because the group can flatten out both of the exponentially increasing difficulties 1) of an expanding pedigree and 2) of accessing older records. And there is also a third element which cannot easily be quantified. Simply establishing this active user community concerning genealogy research will surely turn up other benefits of close cooperation which one may not be able to anticipate in detail.

Figure 10:
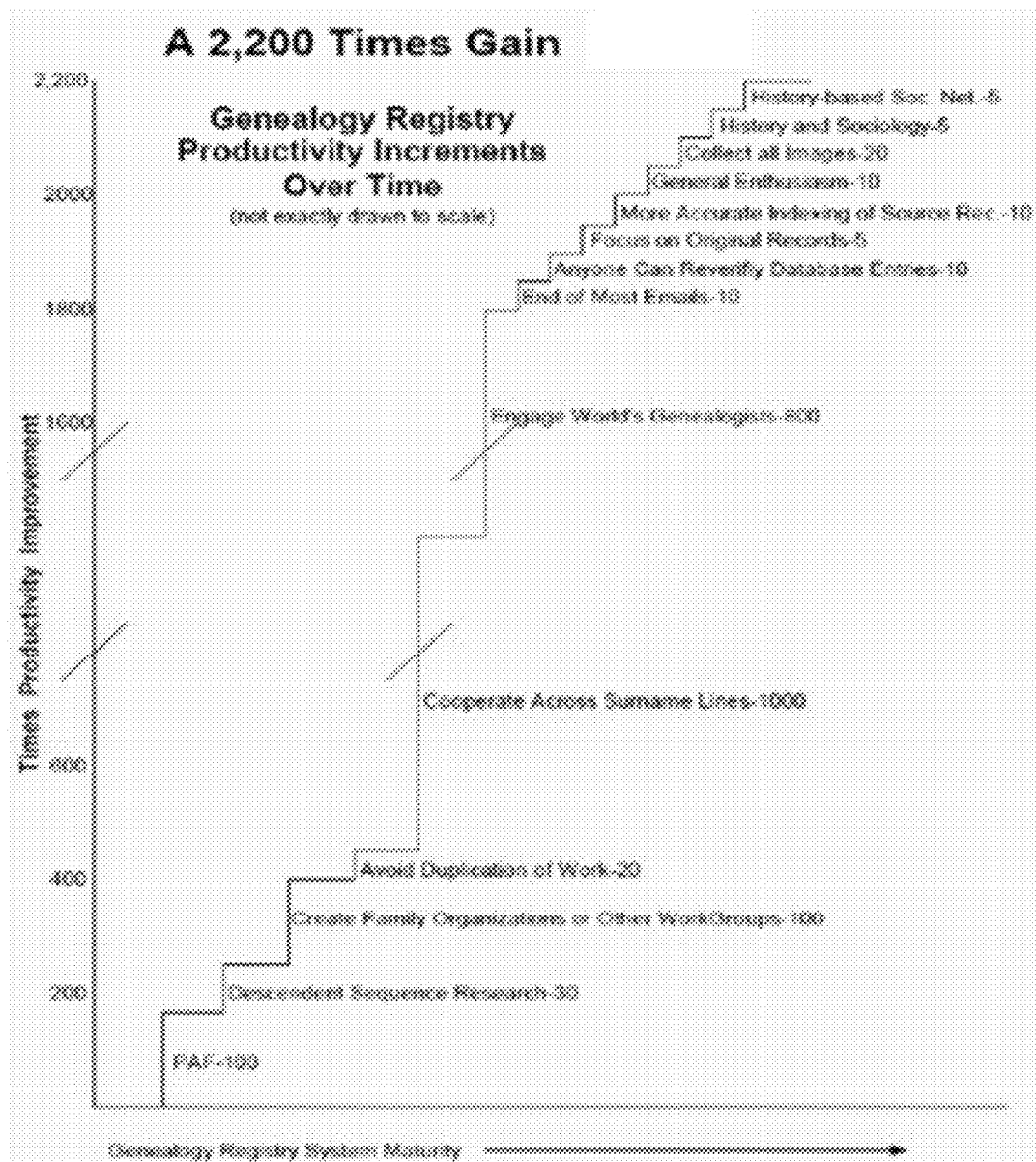
FIG. 10 shows another chart illustrating efficiency improvements attributable to one embodiment of a system for genealogical research.

FIG. 10 shows another chart illustrating efficiency improvements attributable to one embodiment of the system 700 for genealogical research. The chart of FIG. 10 incorporates many of the features described above and provides an estimate for the efficiency improvement for each feature, along with a cumulative improvement. As the chart shows, the system 700 may provide efficiency improvements of as much as 2,200 times. The resulting process may be referred to as "industrial strength cooperation" which emphasizes the benefits of cooperation among large numbers of researchers using an appropriate computer tool.

That cooperation becomes possible when each researcher agrees to collect data for a single surname, starting with an ancient ancestor and coming forward in time to include all descendents. In one embodiment of the system, this methodology, and the supporting computer facilities, has multiple elements, described herein, some of which offers an estimated 1000 times productivity increase.

Some features are very tightly connected mechanically, mathematically, and procedurally to the database structure itself. Other items are slightly less tightly coupled to the mechanics of the database, but can add their unique power and efficiencies to the genealogy research process when operating in conjunction with a computer system which offers them "industrial strength" cooperation features. They might be called second-level or second tier efficiencies.

This industrial-strength cooperation makes possible a complete reengineering of the genealogy industry to bring great success to genealogy hobbyists and professionals. The nation's complete genealogy can be completed within a reasonable time and to a high level of quality.

As a simple example of what is possible with an embodiment of the system 700 used cooperatively by the nation's genealogists, the entire United States could theoretically be finished in two weeks. Here are the assumptions and calculations: There are 4 million genealogists in the United States today. About 300 million people have died in the United States. That means that if each genealogist entered 75 names into the new central database, we would be finished. If each genealogist spent just one hour on each name submitted, they could all be completed within two weeks of work.

This new result can be viewed as applying the general concepts of mass production to the genealogy industry. Specialization and cooperation are some of the underlying principles of efficiency, but applying them in a particular case may take a great deal of ingenuity. In spite of millions of people spending hundreds of millions of hours and hundreds of millions of dollars in genealogy research activities over several decades, including very extensive software and database development, no one else has observed the patterns which make this high productivity possible.

Figure 11:
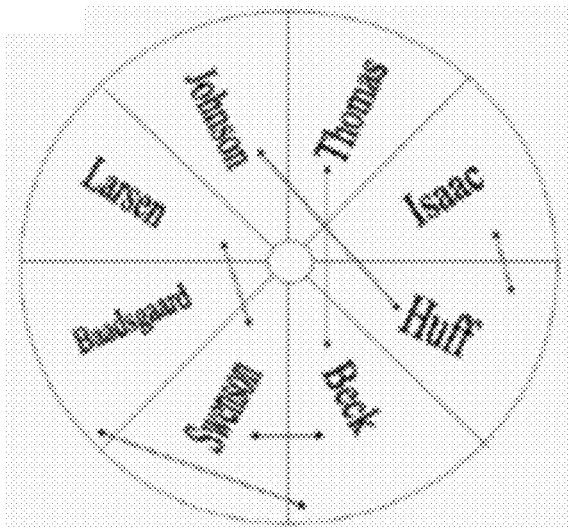
FIG. 11 shows a diagram illustrating cooperation across surname lines in one embodiment of a system for genealogical research.

FIG. 11 shows a diagram illustrating cooperation across surname lines in one embodiment of the system 700 for genealogical research. This feature can be quickly illustrated with a simple diagram. FIG. 11 shows the data for a community or for the entire United States arranged with all the surname lines collected in descendent sequence and placed "adjacent" to each other, at least conceptually. The idea is that each surname line is entered completely and thoroughly to a high degree of quality. Then those surname lines or descendencies, are linked together through the intermarriage process. A woman appears as a daughter in one surname line and as a wife in another surname line. Those connections are represented by the lines drawn between the "pizza pie slices." Simply by arranging data in this fashion, efficiencies can be dramatically improved for each participant, for example, by 1000 times. That 1000 times is based on the fact that one needs 1024 surname lines to be completed if one wishes to have a full 10-generation pedigree. That is unheard of today, and is essentially impossible under traditional methods. It might cost $1 million to have this done professionally, and success in such an undertaking using current methods is extremely unlikely. But using embodiments of the system 700, it is essentially free to someone who enters their portion of the surname structures for a nation or a community. If this process were carried back 11 generations, then the efficiency would be 2048 times, etc. These numbers are limited mostly by the data available, and 10 generations of data is probably as far back as most people can go and hope to include all surname lines.

There are about 1.7 million surnames in use in the United States, and for perfect completeness, we would have to have all of those surname collections covered. If there are 300 million deceased people and 300 million living people in the United States, that means that there are about, on average, (600 million people/2 million surnames=) 300 people with each surname. It is possible that there are large groups of people with the same name and many small groups of people with the more unusual names. The 2000 US census shows that just 1720 surnames cover one-half of the US population. The Smith surname alone covers about 2.5 million people in the census.

Once all of these descendent structures are collected and interconnected, then every conceivable pedigree can be read out from that data. Since almost everyone wants their pedigree, this is by far the most efficient way to get it.

Some researchers might say "I really hate to cooperate with people, and if this process requires cooperation, I want no part of it." That "lone wolf" option always remains open to an individual, but consider this: if the 4 million genealogists in the United States each did 75 names from their own surname line, and placed it all in a single central location, all of the 300 million deceased people United States could be collected and integrated in two-week work period (allowing one hour of work to find and enter each name). If the "lone wolf" person had decided to participate, they would have their full 10-generation pedigree completed in that same two-week period. However, if they decide to stay a genealogy recluse, then they can continue to work alone for another 10 or 20 years while they do their work their way (and most likely never complete it).

Figure 12:
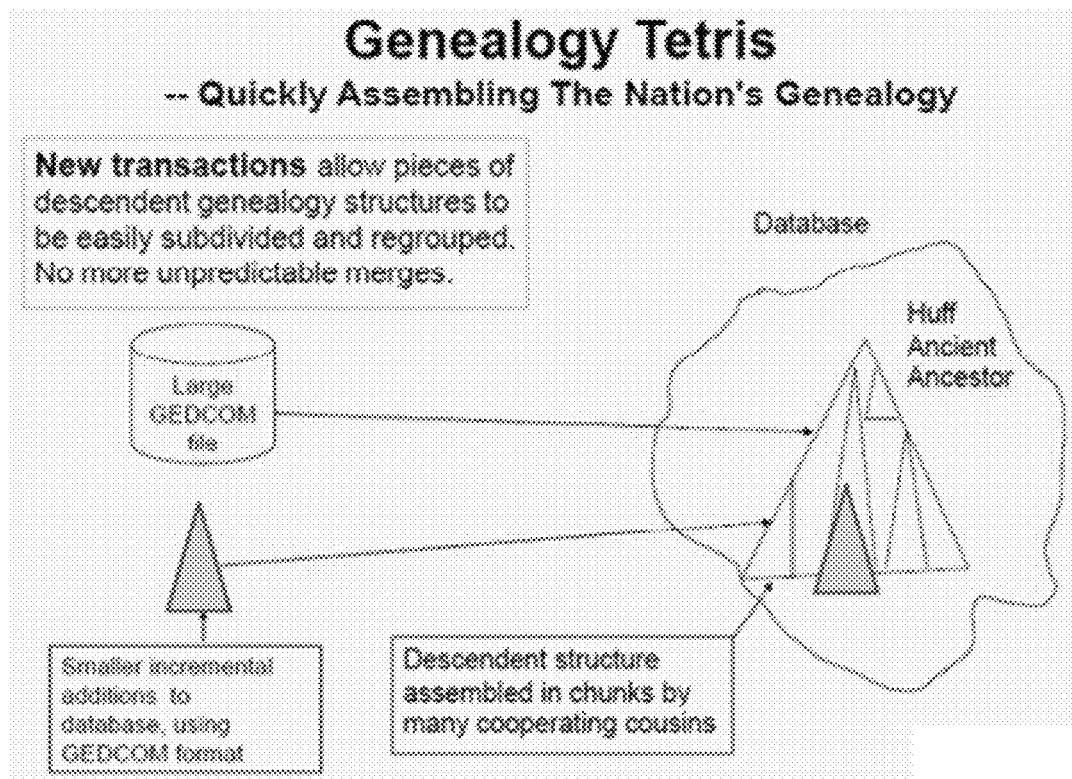
FIG. 12 is a block diagram showing one embodiment of a step-by-step exploration of the concept.

FIG. 12 is a block diagram showing one embodiment of a step-by-step exploration of the concept. If one wanted to do his pedigree, and wanted some help, here is one way he might do it: His father had one surname and his mother had another surname at birth. So he might do the work to follow up his own surname, but try to find someone else who had done his mother's maiden name line. At the next generation back he would still have his surname, and his mother's maiden name, plus 2 more surnames to follow up. Obviously, this goes back in a binary process, doubling the number of surnames at each step backward. So if 1024 other researchers had done the work he seeks, and he could connect up with them, then he could quickly have a full 10 generation pedigree. One of the difficulties today is that the pedigree work which is done is so scattered and unorganized that no one can find it reliably. And even if found, the data may be low-quality and unreliable. Most people conclude that it is usually easier to do the work again rather than try to find and use someone else's work.

Perhaps this will be an adequate background for observing why descendent research is so much more efficient. First of all, if all the people with a certain surname are all gathered together in one place for an entire nation, as in the Genealogy Registry database, then it makes those names very easy to find. Our hypothetical researcher should be quickly able to find data about all the surnames he cares about. In fact, in the ideal case, all of the inter-family connections are already made for him, and all he has to do is make the request for data.

But why would anyone go to the trouble of putting together a complete single surname descendent structure, potentially covering everyone in the nation with that surname? They personally would only benefit from one thin line of pedigree that goes through that large descendent structure. They would probably not do it unless they understood the amazing efficiency of helping a process where a whole nation is involved. Notice that a descendent structure of 5000 names (as for the Huff surname) could have 2500 living descendants of some ancient ancestor about whom all of them would like to know something. Assuming one half of that historical set of 5,000 Huffs were women, who all married into other surname lines, then there are likely people from 2500 other family lines who would like to be able to have pedigree information from the descendent structure under discussion.

In other words, by assembling those 5000 Huff historical names into a descendent structure, there are at least (2500+ 2500=) 5000 living people who will benefit from that information. (The number could be much larger than that since there may be dozens or hundreds of people in each of those other 2500 surname collections who are interested in this Huff surname collection.)

Compared to the traditional pedigree-sequence research methodology, where typically only a handful of people can benefit from that work, if 5 people benefit from one method of collecting data (pedigree), and 5000 people benefit from another method (descendent), and similar amounts of time are spent in each case, this is another illustration of why this new method can be 1000 times more productive. If people can understand this enormous payoff, perhaps they will see the benefit of cooperative genealogy research. Perhaps even the most reclusive genealogists, who now hide their work from the public, can be drawn into helping the larger process if they realize the benefits to themselves.

Doing pedigree-sequence research means trying to overcome two separate exponentially increasing difficulties. One is simply the fact that a person's pedigree doubles in the number of surname lines at every step backward, so that by the time one reaches 10 generations back, there are 1024 surnames to be traced—a humanly impossible task using traditional methods. And, on top of that, is another exponentially increasing difficulty of finding and using the various record sources available during progressively earlier time periods—different languages and recording methods may be used, etc.

Using embodiments of the system 700, those exponential processes are almost completely flattened out to become essentially linear processes. (Specialization by genealogists mostly flattens out that part of the exponential difficulties which relate to finding and interpreting ancient records, and a different kind of specialization, where researchers seek out a single surname among the records available, mostly flattens out the binary increase in surnames experienced in traditional pedigree-sequence research.) That general flattening drops the difficulty by somewhere between 1000 and 2000 times. But then when the element of "industrial strength" cooperation is added, efficiencies may be improved by another 2000 times, making the efficiencies as much as 4000 times greater when these two aspects are combined. These several different processes are somewhat overlapping, so the number of 2000 is used as a compromise estimate.

Figure 13:
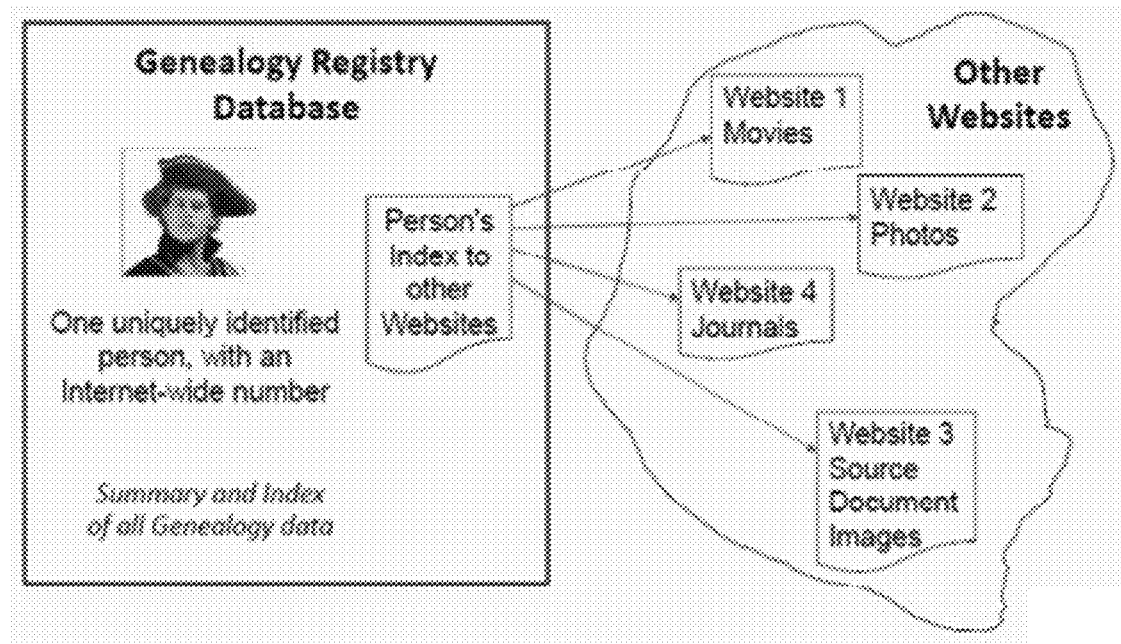
FIG. 13 shows one embodiment of use of a unique ID to turn the Internet into one integrated genealogy database with a unique ID for each possible person living and deceased.

FIG. 13 shows one embodiment of use of a unique ID to turn the Internet into one integrated genealogy database with a unique ID for each possible person living and deceased. This provides another means of widespread cooperation where researchers can compile unlimited amounts of data which then can be linked into a central index where they are attached to specific unique individuals. They do not now have the freedom to act in this cooperative fashion because there is no reliable way to coordinate their efforts.

Through a process for assigning a unique person ID to each living and historical person on the planet, it becomes possible to provide a key that can be used on any number of websites to link data to each unique person. There is a natural desire to link all data about a single person with that person. But even with our great advances in computer technology, it is still impractical to attempt to store every conceivable item of data about one person in a single location. Those items might include home movies, journals, photographs, audio clips, obituaries, court records, census records, birth records, land records, etc., etc. However, it is perfectly feasible today for a central site to contain a brief summary of all the identifying data about people, assign each person a unique ID, and maintain indexes and links to any number of other websites containing voluminous data.

In one embodiment, a 33 character person ID number is made up of four sections: 1) the 12-character submission number which is the data space assigned to a particular data owner (a few ambitious data owners may have more than one submission space which they control), 2) the 7-character tree number, 3) the 7-character descendency number, and 4) the 7-character individual number.

One process for entering the database is through the GED-COM process. When that bulk data are received by the system 700, it goes through several analysis and conversion steps. One step analyzes the data submission to see if all the names are interconnected into a single network. These name-networks are called trees. If there are multiple separate sets of data, where each is internally connected in a name-network, but they are not connected to each other, these separate "trees" are each given a separate number. Within each of these trees there may be one or more same-surname descendent structures, called "descendencies" here. Each of those descendencies is identified and assigned a number. Within each descendency, there is a set of names, each of which is assigned a unique sequential number. These various numerical elements are concatenated together to create a unique number for each person in that submission. If names are later added online to any particular descendency, the next sequential number is used to identify each new person added.

It is possible that a single unique person could be entered as part of several bulk submissions, and so could receive multiple numbers. However, this will not normally cause any confusion, because, in most cases, only one of those numbers will be selected for use worldwide on the Internet. Normally, the particular number chosen to be used worldwide will come from a large descendency consisting of high-quality data, containing at least 200 interconnected same-surname individuals, and in most cases there will only be one such entity in the database. There may be several other incidental appearances of a particular name and number, but most of those will never even be considered as appropriate for worldwide use. There may be rare instances when these original "competitive" methods for choosing a unique number for a person, based mostly on the size and quality of the data it was submitted with, fail to yield a unique number. In those rare instances of apparent duplication, the data suppliers will usually detect that there are other data suppliers with similar interests, and they should usually find it in their mutual interest to spontaneously cooperate together. As a last resort, the system operator can intervene to encourage cooperation or to simply select which version will be shown to the public, and thus which version will become the preferred worldwide Internet number. In most cases, none of these interventions will be necessary, especially when the data-supplying public makes their own examination of the data and decides which they would prefer to use and expand. This "voting with their fingers" will normally lead to additional data being added to those names in question. If multiple online source records are linked to the preferred names, then the quality level of those names will increase, making it all that much more likely that others will agree to accept those names and numbers as the controlling ones. This amounts to a second level of "competitive" choosing of the final number for each person. In another rare situation where it is desirable to retain two or more separate versions of a name, still with only one of them being treated as the main controlling number, "same person" links can be added to the database which will link these two or three occurrences together.

It should be noted that, in the past, other genealogists and system designers have considered this question of supplying a unique number for each person on the planet. However, those efforts mostly come from long ago when only manual systems could be considered. Given enough resources, a centralized "number assignment bureau" might have been set up to operate manually, but no private entity could seriously consider such a major cost. With the advent of computers, the whole process becomes thousands of times quicker and cheaper, and essentially eliminates any need for a central decision-making bureau. The users of the system can take whatever rare steps are necessary to rectify matters, with the system operator intervening in the rarest of cases.

Figure 14:
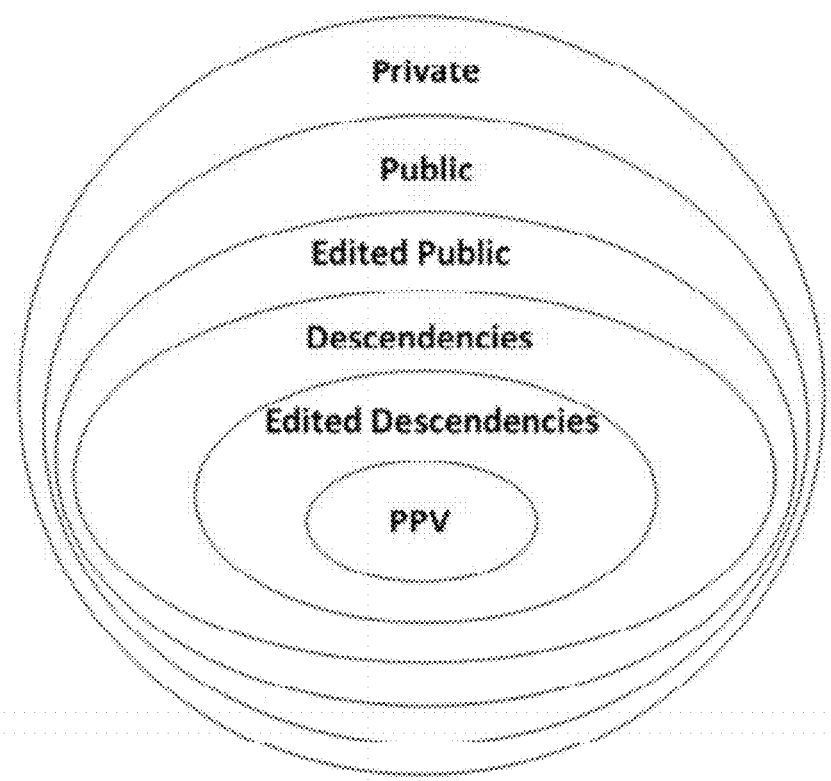
FIG. 14 shows an output of one embodiment of the visible data selector of FIG. 8.

FIG. 14 shows an output of one embodiment of the visible data selector 806. The database 704 may contain many types of data, and the ability to segregate that data by quality level is important. Newly entered data of poor quality may need to be segregated from that which is considered publishable quality. In some cases, poor quality or duplicate data needs to be hidden from public search routines. Again, quality increases efficiency. In this case, it is the efficiency of the searcher that is improved. The system 700 distinguishes between data which should be visible and that which should not be visible. This allows the database 704 to simultaneously contain data of many different quality levels, with the ability, for example, to choose the highest quality level for "pay-per-view" purposes, or choose a lower quality level (with more extensive data) while trying to resolve some research question. Normally, the highest quality data is going to be a smaller portion of the entire database, compared with bigger areas of lower quality. Much of this lower quality data may be in the process of improvement, and may change its status to a higher quality level later on. Managing this constant change of data quality status requires a simple and flexible system that can allow both automated and operator-controlled changes to what data is visible or invisible to public searches.

This ability to have multiple levels of data size and quality (when quality goes up, quantity of accessed data goes down, and vice versa) allows this single database 704 to serve the needs of many different kinds of researchers, and the varying needs of each particular researcher.

The diagram in FIG. 14 shows an embodiment of multiple levels of quality of data that exist in the database at any one time. Data suppliers may mark their data as private, in which case no one can see it except those they specifically authorize, or they can mark it as public, which means anyone can see the deceased people in their data, or they can mark it as public with the option for anyone to update it provisionally, meaning the owner must approve any changes before they become permanent, or they can request that it be placed in pay-per-view (PPV) status, which would bring them royalties when people view their data. In some embodiments, PPV status may be requested for third party data, and the system operator has the authority to approve or disapprove that it is of adequate quality for that treatment.

One version of the user interface has a menu with a set of multiple choices for the person making the search. The searcher, in some embodiments, could choose public, public edited, descendencies, edited descendencies, and PPV. These increasing levels of quality are enforced by table entries created by programs. For the public data, the search control table which is created, simply contains all of the user submission spaces which have been declared public by the owner. The numbers in that table may be of a limited length, for example 12 characters long, to identify the user submission number. For the public edited quality level, those user submission spaces which pass the current edit checks may be included in the search control table. For the descendencies quality level, those portions of a data supplier's submission which are in the form of a descendent structure, and which are separately addressable in that form, may be included in that search control table. Notice that the numbers in that control table may be longer, for example 26 characters, to offer a finer control. For the edited descendencies quality level, those descendencies which pass the current edit checks may be included in the search control table. The pay-per-view quality level is simply the edited descendencies quality level plus the permission of the owner and the concurrence of the system operator.

The edits for this data may start out fairly simple and may be increased as people gain a better understanding of embodiments of the system 700. There may be completion checks that make sure there is at least an estimate of the birthdate, an estimate of a birthplace for a name plus a gender indicator. Those seem like extremely simple edits but, strangely enough, just applying those simple edits would disqualify perhaps three fourths of the data which is floating around on the Internet today.

In some embodiments, the system 700 will encourage, and perhaps require, most users to use the edited descendencies or PPV level of quality. One of the largest activities on the database is connecting the women together, between where they appear as a daughter and where they appear as a wife. It is important that these linking operations use only the highest quality data so that connections are not made to questionable data.

Tables for use by "SELECT . . . WHERE . . . IN" database statements may be created by various automated selection and editing processes, which can be overridden by system operator intervention in special cases. In any particular search, a user can select one of several different qualities of data to search to meet various purposes.

The searches of "public" and "edited public" data may use a 12-character key that identifies the data owner. Other categories may relate to sub-categories of a user's data, and use a 26-character key which identifies the owner, tree, and descendency. Users are expected to choose the highest quality data that can meet their needs. The important task of linking descendencies through the women should only be done using the highest quality data, just as the pay-per-view searching of published data can only be done using the highest quality data. Searches of lower quality data will mostly be done by special operators to seek clues on how to improve the database content. Private data may simply be unavailable for searches by users not specifically authorized by the owner. Data owners may declare whether their data is to be private, public or pay-per-view. The system 700 may determine general quality of data by a series of edits and analytical tests. Sampling tests for human examination may also be used. Data can be entered at any quality level and can gradually be improved until it is suitable for the next level of use.

Figure 15:
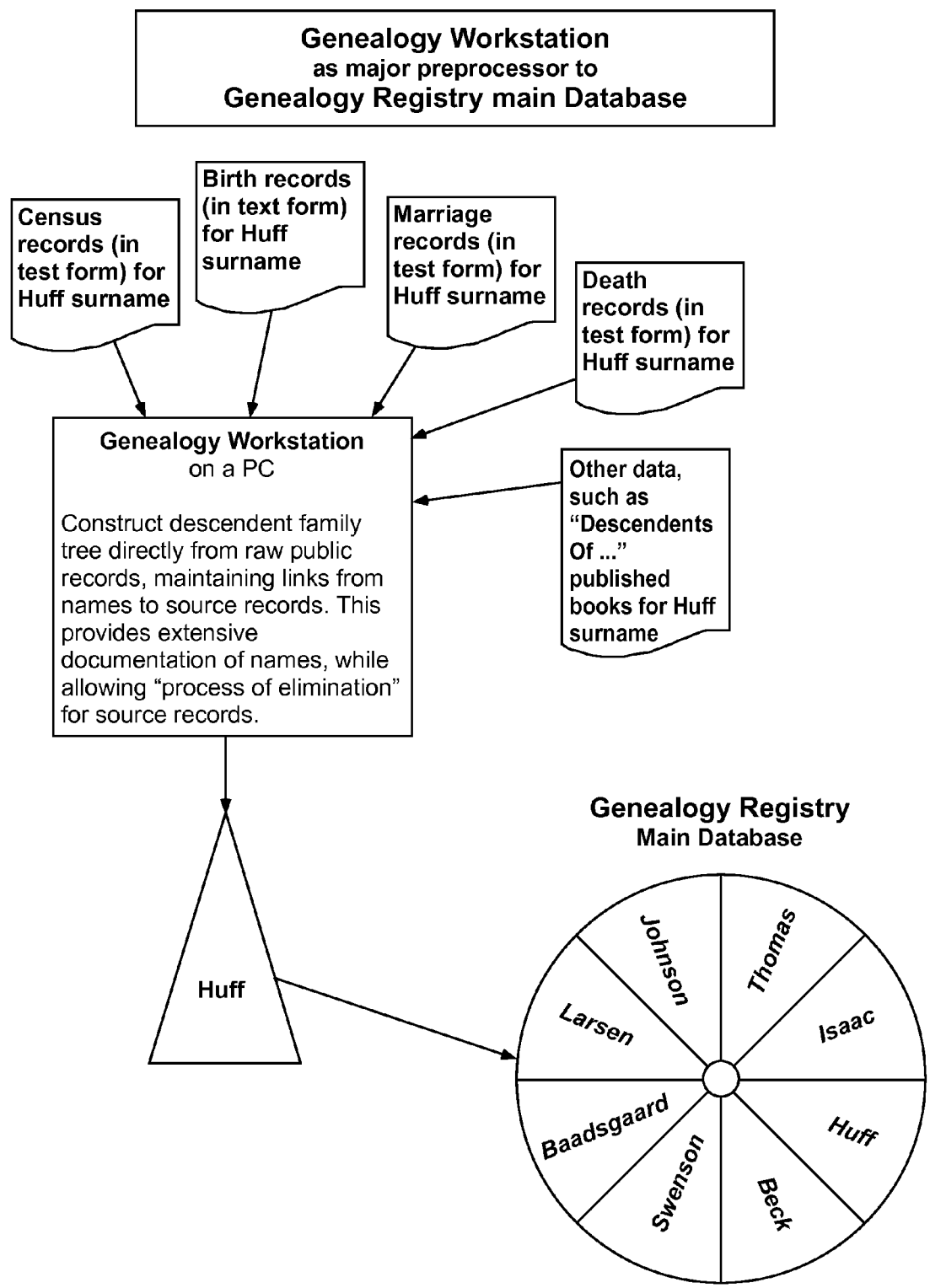
FIG. 15 shows one embodiment of a workstation for assembling descendant structures.

FIG. 15 shows one embodiment of a workstation for assembling descendant structures. A researcher may extract the individual-identifying data from record sources and transmit it to the appropriate part of the Genealogy Registry database using several mechanisms. They can be keyed in directly or they can be keyed into a PC genealogy program which can then create a bulk transfer file called a GEDCOM (GEnealogy Data COMmunications) to be uploaded to the Genealogy Registry system.

As described above, where the volume of data warrants it, a completely different procedure can be used. A workstation may request all entries in all public records to be downloaded to the workstation for a particular surname.

Public data are easily available online, in the form of a few names at a time, or one image at a time, but there is a huge administrative overhead using the Internet to look at only one or two small items at a time, out of a possible 200,000 such items. There are the constant wait times for Internet response for the next item, but even worse is the need to make notes or printouts to record and maintain the current state of the operator's thought, conclusions, and questions while he waits to transition from one list or image to another. The goal of the workstation is to present all available research materials almost instantaneously to the researcher so that the entire operation is working at the "brain bandwidth" of the researcher, not the relatively slow and often unpredictable Internet bandwidth, requiring constant re-specifying of searches, etc. Personal computers may operate 400 times faster internally than the Internet, and the system 700 may fully harness that extra bandwidth to benefit the operator. Downloading this material might take many hours, but it can be done overnight or on the weekend, so that the operator need not oversee these tens of thousands of separate operations. With all of the data stored locally, the operator might have 20 different document pages open on multiple monitors at any particular moment and is able to quickly switch among them. This is a completely different experience than the usual needle-in-the-haystack online methods. Research often consists of comparing many different documents with each other, so the ideal case is to have all of them accessible simultaneously locally, as opposed to having to request them over and over again through an Internet connection. This large collection of data about a particular surname, totaling up to 200 GB for the Huff surname scenario, might be kept on a PC hard drive for continuing reference until a descendent structure is completed, including inserting the marriage links to all other related surname structures. Today's larger personal computers may have hard drive capacities in the 1 TB or 2 TB range, so they can easily run this workstation application.

There are multiple sources, commercial and non-commercial, for most of this public record data, although some reformatting may be needed to put it into the desired workstation format. Other databases will likely be developed for use in this workstation process as its use becomes more widespread. PPV features of embodiments of the system 700 support the development and marketing of these smaller, more specialized databases which would be very useful for this workstation process. One example might be a genealogist who enters and indexes all of the obituaries for a certain area and time period and wishes to place them online for public use, for which he would receive royalties.

The workstation feature not only maximizes the productivity of individual researchers, and conveniently puts the data into the correct form for the central database, but it will also offload massive amounts of computer storage and processing from the central site to local PCs, making the entire operation more streamlined and less expensive to users through lowering the cost of centralized computer requirements.

Some participants may decide to first find their ancient ancestor through some traditional pedigree-sequence research, and then switch to descendent-sequence research to fill out the complete descendent structure. However, notice that with the workstation feature, that preliminary research may not be necessary. For many surnames, the researcher can simply begin with the earliest census and vital records and assemble the descendency from the oldest time period to the present.

If there are contractual difficulties in making this bulk data available to workstation users from outside sources, it would be feasible to acquire this data for use directly by Genealogy Registry participants.

This feature offers another powerful service to the genealogy industry by showing which public documents have been referenced by one or more genealogy researchers, and which public documents have yet to be incorporated into some research results. As part of its normal operation, it will create a new index which will indicate which public documents, and which line entries of each of those public documents, have been linked-to by a researcher's work. With that data available, it is then possible to show, through this "process of elimination" index, the percentage of completion of incorporating all public records into finished research. Conversely, and of even greater importance to the genealogy industry, this process can show which public records have not been referenced in genealogy research. That can help other researchers decide which materials they wish to examine next.

Figure 16:
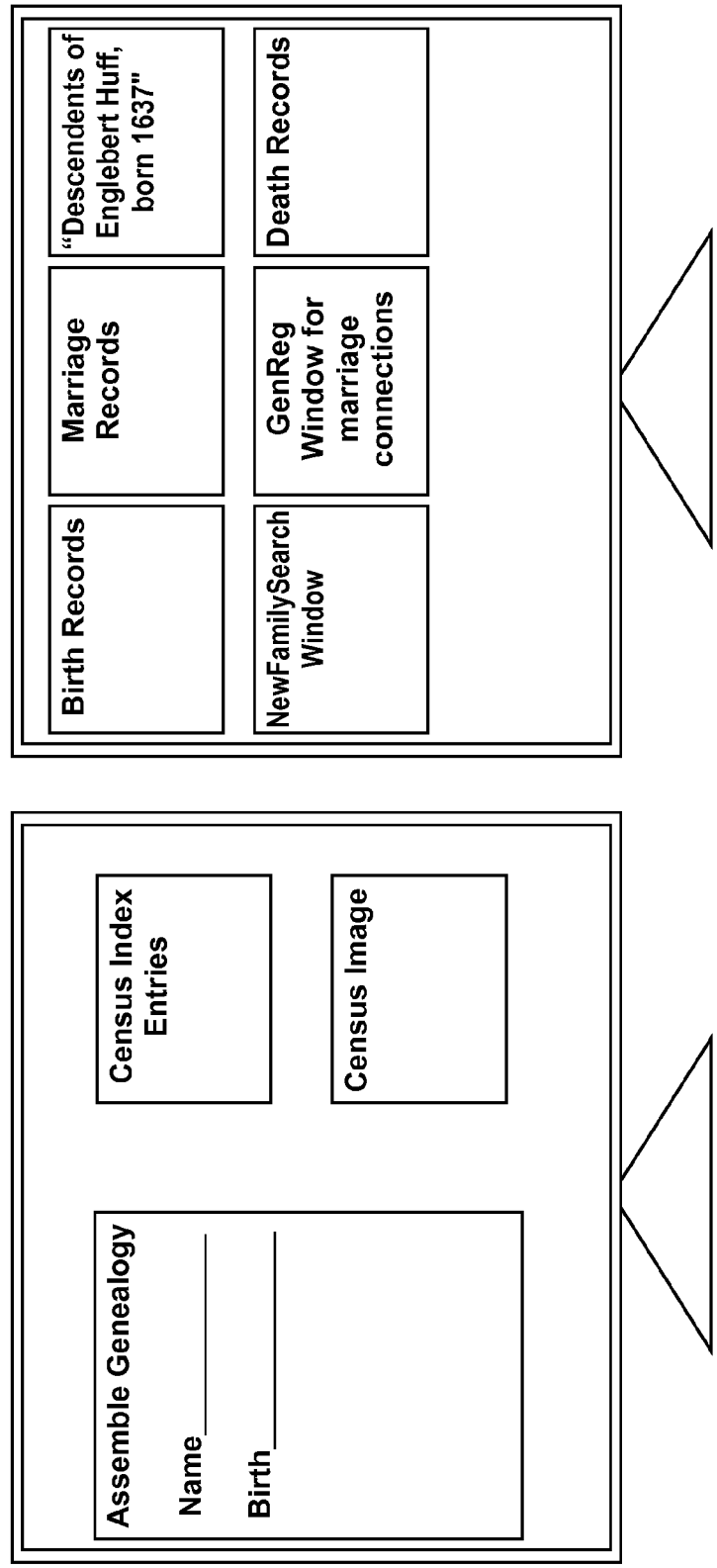
FIG. 16 shows another embodiment of a genealogy registry workstation.

FIG. 16 shows another embodiment of a genealogy registry workstation. The genealogy registration workstation shown in FIG. 16 includes a plurality of displays, for example, two twenty two inch monitors. The displays of the workstation may be able to simultaneously display multiple documents, for example, seven to nine documents.

Figure 17:
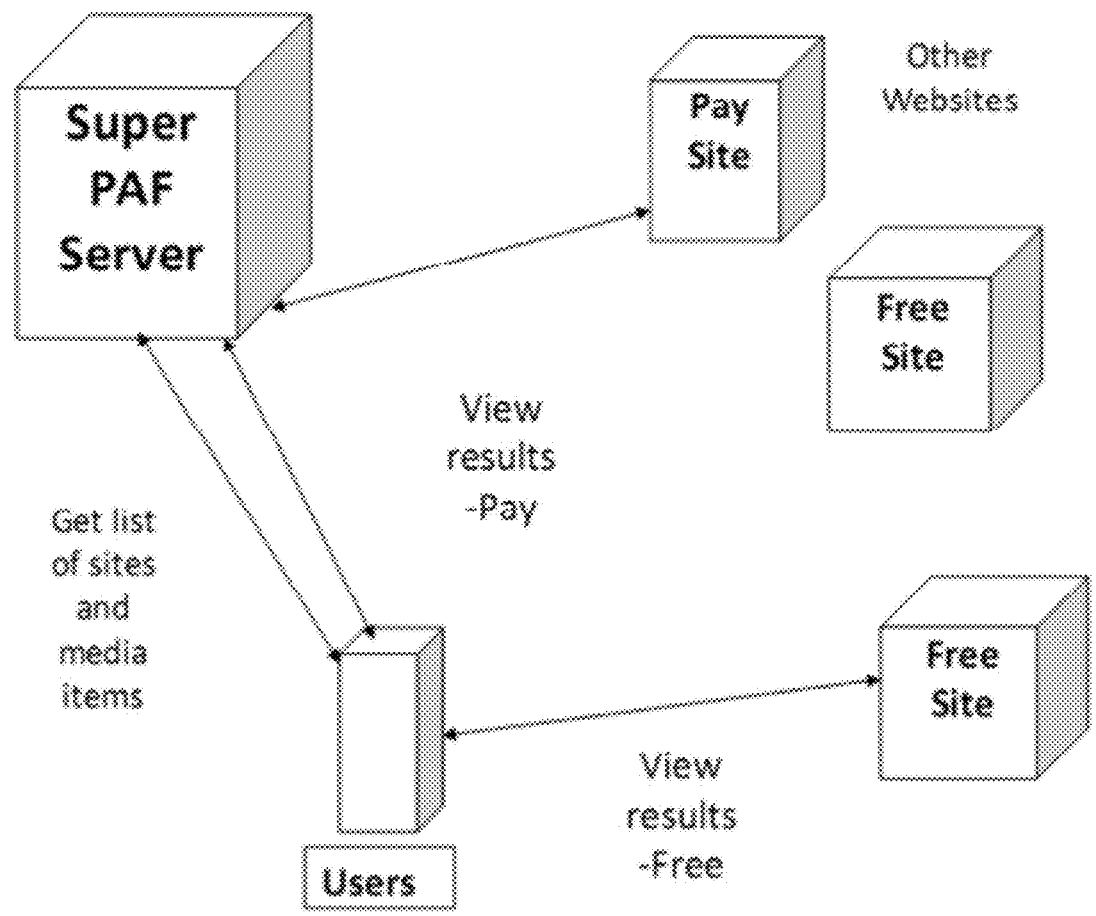
FIG. 17 shows one embodiment of the third party data manager of FIG. 8.

FIG. 17 shows one embodiment of the third party data manager 810. In one embodiment, the third party data manager 810 includes a single data table and related update screens at the central server 702 where a registered participant could enter links from individuals found in the database to specific items of data found at a separate website. Each table entry may include a person ID, a short description of the item to be linked (perhaps explaining the genealogical data point it is expected to establish), and an Internet URL where it can be found. The operator may find the correct version of the name in the central index, and then create one or more data links from that person to materials stored on the outside web site. In the free version, where the data provider is not expecting to receive compensation, any interested data user could see these outside links and follow them. The data user may make the request directly from his browser so that the central site has no more duties or functions beyond presenting the list of links.

If the data supplier wishes to charge on a pay-per-view basis for the data supplied, then the process gets a little more complex. The outside data site may be registered with the central server 702 to establish the terms of use, especially including the rates to be charged and collected, plus associated accounting.

In this pay-per-view situation, the central server 702, in one embodiment, controls the channel through which the data user gets to see the proffered information so that the data at least appears to be coming directly from the central server 702 where the charges are incurred. A minimal level of security, to keep the actual source of the data a secret from the paying data user, may involve creating a short, randomly generated redirect URL for an entry on the outside Internet site. The data user can then go directly to the other website without further communication with the main central website. There are public Internet services to create these short URLs and provide the redirect function, but in some embodiments, the system 700 creates the URLs. More strenuous security measures may be implemented in some embodiments, such as making the outside websites difficult to navigate without addresses supplied by the central server 702, or caching these website pages temporarily at the central server 702 for specific users, or even encrypting the data on these outside sites, with the central server 702 handling the encryption and decryption processes and handling all the traffic between outside websites and users logged into the central server 702.

In some embodiments, an extension for the large-scale users of this remote data function would allow those data providers to create their own index on their website, using a person ID from the central server 702 to point to all the materials they wish to make public for that person. The central server 702 then would periodically access those prepared indexes and upload them, to be included in the consolidated index of all such materials.

For those offering free data, the system can be very simple. There is only the task of matching the seeker with the data which is available.

One data security problem to be overcome on outside pay-per-view sites is that a person who is willing to pay for one valuable item on one of 10,000 outside websites might learn the real name of that website and decide to take anything else of interest for free.

FIG. 18 shows a tree of related people and the individuals that may be recovered by one embodiment of the lost person acquisition manager 820. The lost person acquisition manager 820 may allow the system 700 to identify and recover individuals in the tree that do not have any surviving living descendants, or who are otherwise not captured by traditional pedigree research.

Figure 19:
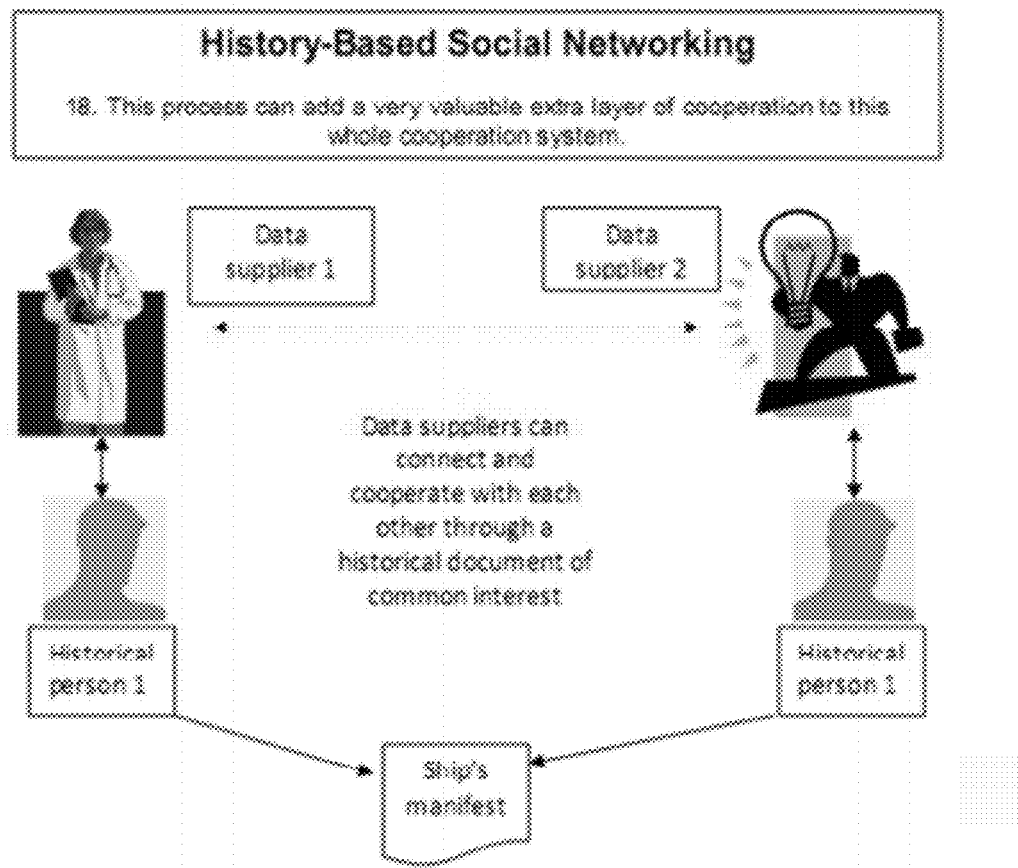
FIG. 19 shows one embodiment of the social network manager of FIG. 8.

FIG. 19 shows one embodiment of the social network manager 824. Where two data suppliers have each established links from one of their historical persons to a specific document, such as ship's manifest or a census record or a land record, where the names of multiple people might appear who might have some family relationship or may have shared an experience, such as a journey by ship, then, upon request, it is easy to establish a link from one data supplier to the other so that they can collaborate on other aspects of the shared history of their relatives (e.g. one historical person might have written a journal which might supply useful information about another person who did not keep a contemporary journal).

In some embodiments, an owner of data which is placed in the database 704 can select whether it should be treated as 1) private data, to be completely under his exclusive access and control, or 2) public data which can be viewed by other users, or 3) public pay-per-view data which can be published and marketed as individualized pedigrees for those who wish to have their genealogical data, but do not have the time or training to do the research themselves. In each of the two cases of public data, access is normally limited to deceased persons only. Access to the private data normally includes all aspects of that data.

Embodiments of the system 700 give data owners the option to invite as many other registered participants as the owner wishes to join in viewing and, optionally, changing and improving the data. A person can be given one of the three levels of access of 1) view, 2) provisional update, or 3) permanent update. Since those users given access to this data are normally members of a family or are members of a closely knit workgroup, they are given access to every name in that owner's workspace, including names of the living. The view option allows people to examine the data but not to make any changes. The provisional update option allows a user to add data and make changes, but all of this new information may be stored in a separate set of database tables, so that it is invisible to all the normal users of the database until the owner of the data has ruled on those provisional updates and made them permanent (or rejected them). For those with permanent update access rights, the changes they make may go directly into the main database tables. However, even then, the data owner may have the option to review all of those changes after the fact, if he wishes, so that any potential quality or accuracy problems can be monitored.

In certain embodiments, there is another option available for users who are sponsoring a different and fairly unusual kind of data collection project. One kind of activity, sometimes known as building "community trees," will have a group of people mine or extract all of the data found in all records for a particular geographical area, and assemble all the data about the people who lived there, with time spans possibly covering several hundred years. The "data owner" or project sponsor might not know in advance who all the potential contributors or beneficiaries might be who would have an interest in this project. One example would be taking a "county"-sized piece of Norway and doing this "community tree" integration of all available records. There might be millions of people in the world who can trace one of their family lines back to this single county, so it is very difficult to know in advance who might be benefited by this work, and who might wish to contribute to this project.

So a special category of "public, everyone can update" may be provided for those unique projects. Anyone with an interest in the project can add or change any data they wish, but all of these improvements are held as provisional updates until the project sponsor has adjudicated those changes and decided which to keep and which to reject. In the process, the project sponsor will also find out who the parties are who wish to contribute, evidenced by their actual (provisional) changes to the database. If necessary, it would be possible to change the parameters of this data space back to a more limited status, so that only specific named people can contribute data or change data. This might be necessary once the main data integration project for the oldest data has been finished, and then there is a desire to keep it current as new people are born into those lines, or living people are otherwise found and added to this database.

A likely corollary to the fairly unusual "public, everyone can update" status, would be the "public, everyone can see both living and deceased" status. On this unique "community tree" kind of project, people may be allowed to view all of the existing data, for both deceased and living, and potentially update it. It would be rather strange to allow someone to add the name of a living person to the bottom of this descendent-sequence database, but then never be able to see that name again in the database because the computer has determined that that person is living and therefore should not be made visible.

The system 700 may include controls to determine which changes may be allowed, as allowing just anyone to make changes could turn the project into a disaster of complete confusion. But as long as none of the changes take effect without the approval of some knowledgeable and responsible person, then there should be a net gain from opening up the update option to many or all registered users of the system.

This discussion might bring to mind the popular "wiki" concept which has been very successful in some areas, such as Wikipedia, the online encyclopedia compiled entirely by free public entries from its millions of users. The system 700, however, may have more structure and restraint than just a general information source. It is extremely important to keep relationships clear among people, and to avoid duplication. The ability to add new names and relationships without restraint to a database has led to the catastrophic duplication problem seen in today's genealogy world. For example, the same name may appear 10,000 times in such places as the well-known public database sponsored by the LDS Church. The idea that many people can update a database, as in the wiki case, is good, but it can also generate an enormous amount of confusion and damage without the proper supervision and built-in structuring mechanisms. Having access to the many possible "rollback" versions of a wiki entry is of little help or consequence in a genealogy database. If the people entering the data are not carefully disciplined through some mechanism, then the most likely result is a highly duplicated, inaccurate, and therefore nearly useless database. In both kinds of databases, wiki and genealogy, the known facts are always preferred over the writer's opinion, but in a carefully structured genealogy database the standards of proof need to be very much higher, relying on specific historical documents and artifacts wherever possible.

It may be useful to illustrate the differences in the kind of relationships between entities that might be found in a wiki, and those that might be found in a genealogy database, There may be certain relationships among various articles in a wiki, such as separately describing all the signers of the U.S. Constitution, as well as the product they created. But this may be a very limited and imprecise set of relationships, compared to the much more precise and in-depth describing and interrelating of the tens of thousands of people who make up 10 generations of a specific family.

There is another important feature of this networking and workgroup cooperation mechanism. Since the largest payoffs from cooperation come from separating names into their same-surname descendent structures, it will often be useful for a system user to have multiple workspaces allotted to them, one for each of the surname sets they wish to supply. For example, there might be a workspace for the Huff surname, one for the Thomas surname, one for the Larson surname, etc. And for each of these separate workspaces, the single user/owner can determine which other registered users can have which levels of access. A very ambitious and industrious user/data owner might therefore have numerous collections of name data to administer, with potentially hundreds of sub-assignments of relatives and other coworkers to these various work areas, using various levels of access. This system supplies an intense professional-level workgroup networking arrangement, with each participant having a fairly well-defined role to play. This same mechanism also provides a specialized social networking facility among the users of this new workgroup mechanism, but it is much more task oriented and thus differs markedly from the casual and amorphous "friend" status people might occupy in most of the other social networking sites such as Facebook, etc.

The data owner, in some embodiments, has a further option to quickly deactivate and activate the rights and privileges of those he has connected to the data spaces he owns and controls. This would allow short-term changes of status without having to delete and add the same people, potentially multiple times.

Figure 19A:
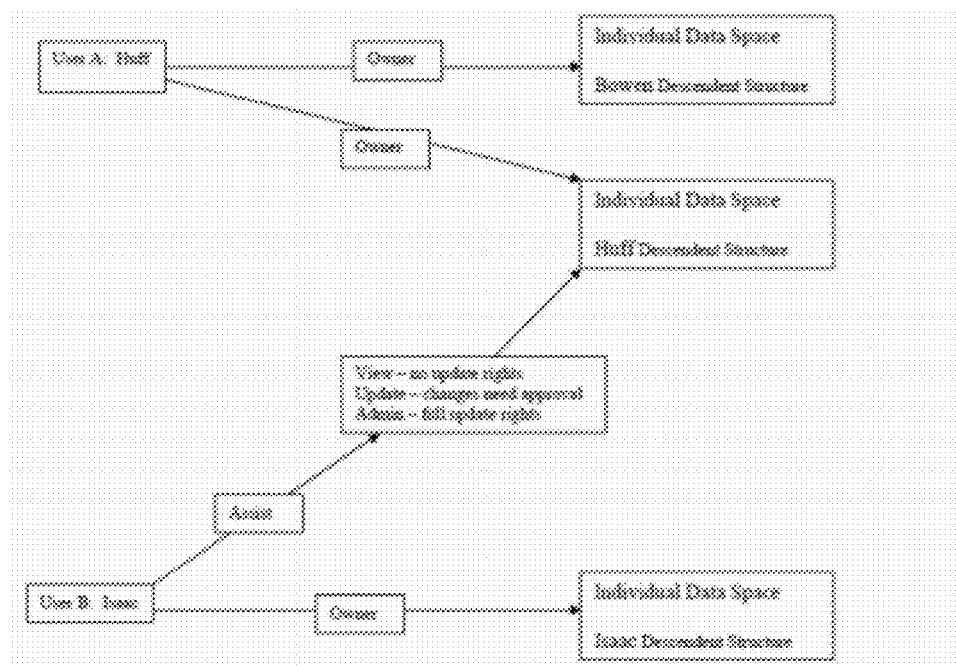
FIG. 19A shows one embodiment of the operation of the workgroup networking manager of FIG. 8.

FIG. 19A shows one embodiment of the operation of the workgroup networking manager 830. The workgroup networking manager 830 provides a mechanism for users to invite another user to assist in research and grant needed access rights for that assistance. A data supplier (for example, User A in FIG. 19A) typically owns and uses just one data space (for example, the "Bowen Descendant Structure" in FIG. 19A) to store the research supplied by and improved by the data supplier. The data supplier may elect to have two or more data spaces, as in the illustrated example where User A has separate spaces for the Huff and Bowen descendant structures. In this example, User A has allowed or requested User B to assist in the work of improving the Huff descendancy.

The workgroup networking manager 830 may allow a user to manage permissions in a shared data space. For example, User A may limit access rights granted to User B within the Huff descendant structure. These access rights may include view, update, and admin rights.

The workgroup networking manager 830, in some embodiments, allows users to maintain multiple data spaces. In addition, the workgroup networking manager 830 may allow users to participate in or improve other data spaces. By allowing multiple participants in data spaces, the workgroup networking manager 830 provides a means for creating a large number of possible workgroup combinations.

Figure 20:
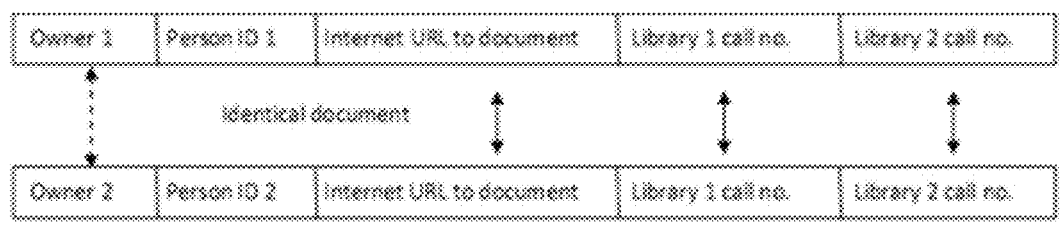
FIG. 20 shows another element of one embodiment of the social network manager of FIG. 8.

FIG. 20 shows another element of one embodiment of the social network manager 824. As shown in FIG. 20, multiple references to the same document can be used to create cross-references among the data owners involved. That allows them to communicate and cooperate.

Figure 21:
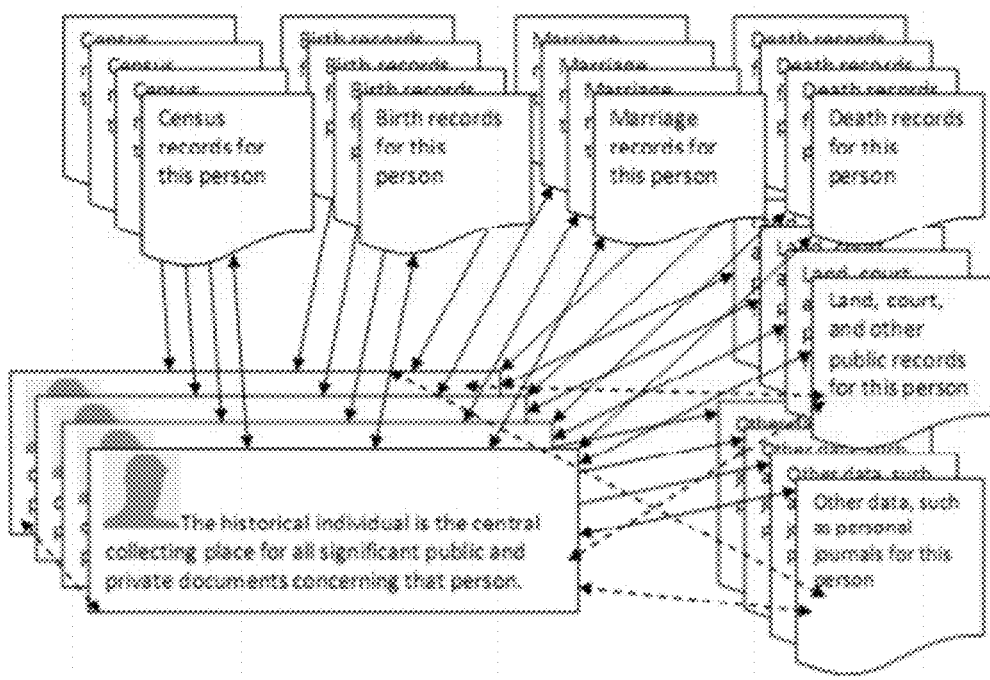
FIG. 21 shows one embodiment of the records stripping manager of FIG. 8.

FIG. 21 shows one embodiment of the records stripping manager 816. The records stripping manager 816 may produce a nationwide accumulation, index, correlation, and cross-references of multiple historical records, wherever they may reside, concerning the individuals referenced in those records, creating a framework for an "individual level" national history. Stories and other personal and family materials can be added to the available public documents to complete the picture of individuals' lives. This valuable accumulation of data can be used for genealogical and academic purposes.

Once this data is gathered and interconnected at the first level, that is, connecting it to individual people mentioned in the documents, it can then be interconnected on many other levels, creating cross-references and sorted versions of the data of numerous types. In general, where the library or Internet references to two documents are the same, the system could provide indexing features to group together all the people who appear on that document.

For example, one might connect business records with court records with census records with land records for a particular person and learn much about that person. One can go the next step and find out who a person's neighbors might be, which town they shared with others, which religious congregation they shared with others, etc. The journals of one person might tell you something about another person who had the same experience, such as traveling on a ship, or traveling with a pioneer group. This potentially very complex network of names, documents, and locations might yield all sorts of interesting things about a person, and the time and place in which they lived. One small-scale study of this sort showed the importance of tobacco in the economy and society of Virginia and Maryland, the role of the Catholic Church in civic organizations, etc.

With one specific person acting as the connection point for multiple documents and document types, there are other kinds of data one might be able to extract from the whole. For example, a testamentary will might mention land records, family members, laborers, military service, etc., so that other records might be located.

The system 700, in some embodiments, could assist in (and later store the results of) special studies using these assembled records. Census records might easily show who the neighbors were to family members. Land records might do the same thing, although a researcher might need to reference county land ownership maps of the time, etc.

We are used to the idea that history can only be recorded and analyzed by focusing on a few important individuals and then compiling a few statistics concerning the "masses." That is one of the consequences of individuals having a very small amount of accessible data about the past, and a very small "bandwidth" in our ability to access and analyze data about the past, even if there is actually a very large amount of data potentially available about the past. In contrast, as we have seen with enormous "social networking" systems such as Facebook.com, it is now feasible to individualize history to an extent never considered before. Even if we have to rely on statistics, they can be much more detailed and differentiated statistics than before. Numerous surveys have been conducted using Facebook data which allows researchers to pose certain sociological questions and answer them, without actually having to interview people. If families retained selected portions of this quickly expanding data, future family members and more serious historians should have a great deal of data to work with.

On a few occasions, and with significant difficulty, using the old card punch and card sorting computing technology, historical sociologists have collected and correlated records of individuals over a small area and used that data to make deductions about the culture of the time. That same process can now be done on a much larger scale.

Figure 22:
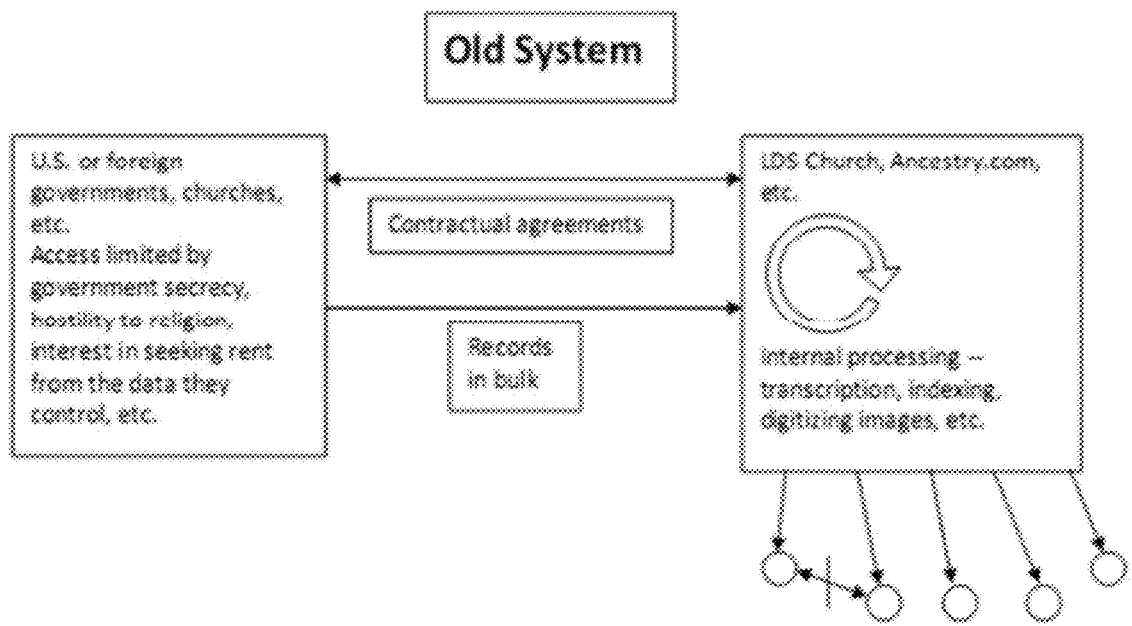
FIG. 22 shows one embodiment of previous systems for collecting genealogical records.

FIG. 22 shows one embodiment of previous systems for collecting genealogical records. In past decades, the main processes of genealogical record collection were conducted by large, well funded institutions such as the LDS Church or Ancestry.com. They made any necessary diplomatic or business agreements to get access to record caches, arranged to have the records filmed or did it themselves, created indexes through centralized industrial processes, and then centralized those processed records and their images in a library or a very large computer system, or both, and then arranged to meter out that data to the public in small doses. In the case of Ancestry, they receive rent through subscriptions on their collections of data, consisting of billions of the "raw" records they have stockpiled.

This old paradigm can be changed very significantly if enough genealogists are willing to rethink these methods and cooperate together. Rather than being appendages to a large institution where all the decisions are made, they, as a group, can take control of a large part of these operations. One of the constraints of the current "large actor" paradigm is that there may be contractual restraints on the use of much of the data. These constraints can keep important portions of this collected data unavailable to people such as genealogists in the United States, including members of the LDS Church. That seems to currently be a problem with Church's "Online Indexing" process and its "Record Search" record image storage project.

Figure 23:
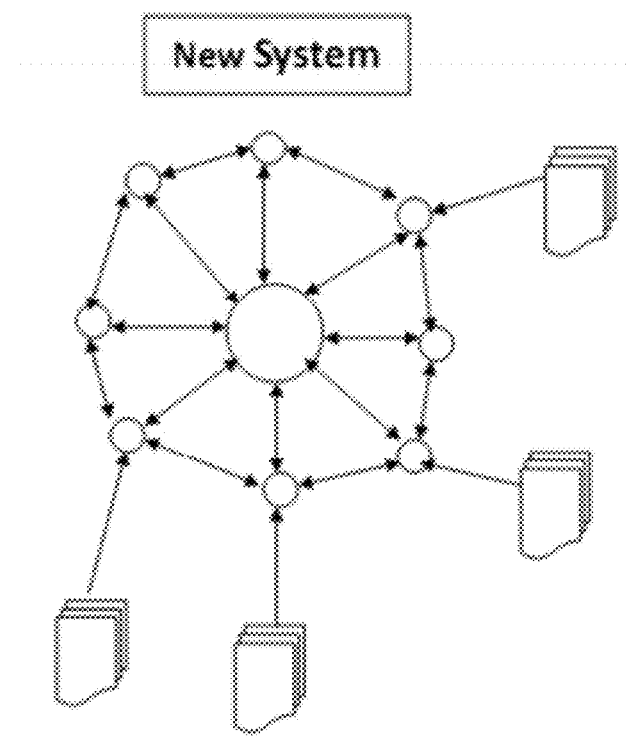
FIG. 23 shows one embodiment of the source acquisition manager of FIG. 8.

These institution-to-institution contractual or diplomatic arrangements, along with industrial copying and indexing processes, have certainly been valuable in the past. But they do have certain restrictions. It is not always possible to make the necessary arrangements with the keepers of large bodies of records, and even if it is, the arrangements made may be quite restrictive as to the use of those records FIG. 23 shows one embodiment of the source acquisition manager 818. In contrast to older methods, individual residents of countries where these uncollected records reside may often have personalized access which would be denied foreign institutions. If those records were not allowed to be used by a nation's own citizens, in most cases the government's would feel continual pressure from their citizens to make those records available to citizens. And if those citizens use the records for their own private purposes, and then decide to transfer those records to a central collection point somewhere else in the world, 1) it seems unlikely that the local government would feel inclined to interfere and irritate their citizens, and 2) such governments would normally have no jurisdiction or means to interfere with that flow of a few records from each of a few citizens.

The source acquisition manager 818, in one embodiment, allows participants to be both data users and data suppliers, part of a very complex networking operation, with the central server 702 designed to foster that cooperation and networking by individual researchers in every way conceivable. They are anything but isolated. They supply not only genealogical names and relationships, but also images and transcriptions of source documents of every description. Adding these documents to the mix can be a huge extension beyond the databases now available online. There is probably an opportunity to quickly triple or quadruple what already resides in central libraries or on central computers, partly because individuals do not have the contractual and political constraints which these large institutional entities might typically have.

Figure 24:
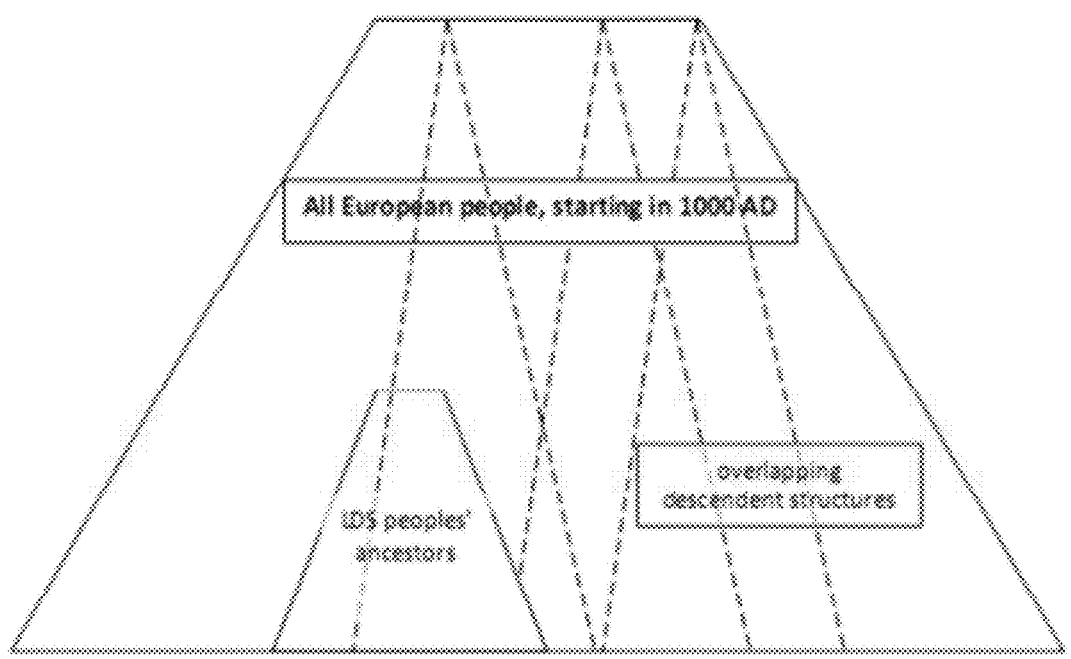
FIG. 24 shows the results of one embodiment of the genealogist cooperation manager of FIG. 8.

FIG. 24 shows the results of one embodiment of the genealogist cooperation manager 812. The efficiencies of embodiments of the system 700 are very large for groups of a few thousand cooperating people, potentially reaching the 1000-times level for each participant, and become even larger and more certain with more participants covering every possible surname, moving the individual efficiency gains up close to the 2000 times mark.

Studies have shown that all Europeans alive today have among their common ancestors the same man or woman who lived around 1400. In addition, 20 percent of the adult Europeans alive in 1000 would turn out to be the ancestors of no one living today (that is, they had no children or all their descendants eventually died childless); each of the remaining 80 percent would turn out to be a direct ancestor of every European living today. (See: Steve Olson, "The Royal We," *The Atlantic Monthly*, May 2002, pp. 62-64.)

FIG. 24 shows how the ancestors which the LDS people are seeking are a small part of the much larger pool of all European families starting from the year 1000 A.D. Obviously, if many millions of genealogists do all the research to establish the larger body of people and sets of family relationships, then, almost by definition, the work of the LDS people will be finished in the process.

Figure 25:
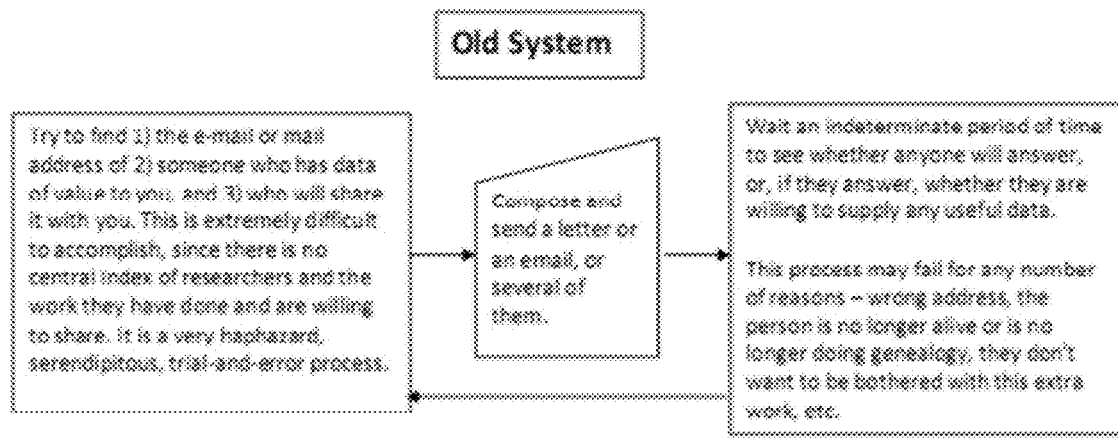
FIG. 25 shows the difficulty associated with pervasive email messages requesting and supplying research assistance.

FIG. 25 shows the difficulty associated with pervasive email messages requesting and supplying research assistance. Under existing systems, researchers may spend a great deal of time determining whom to email, preparing emails, and responding to emails.

Figure 26:
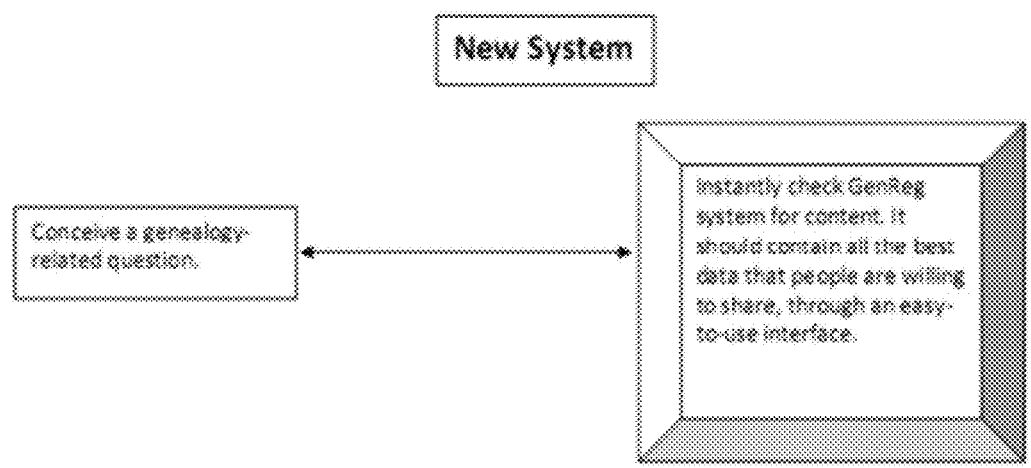
FIG. 26 shows one embodiment of the system of FIG. 7 and the associated efficiency from improved communication.

FIG. 26 shows one embodiment of the system 700 and the associated efficiency from improved communication. The system 700 allows for quick access to answers to genealogy related questions without requiring email messages.

Figure 27:
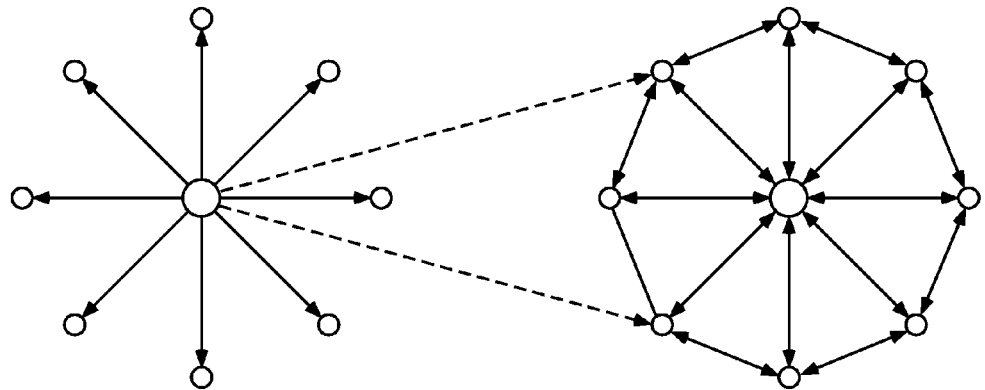
FIG. 27 shows a comparison of traditional genealogy systems to one embodiment of the system for genealogical research.

FIG. 27 shows a comparison of traditional genealogy systems to one embodiment of the system for genealogical research of FIG. 7. Under the traditional approach, depicted on the left, the individual researcher is isolated from other researchers and is mostly dependent on a central source of raw (non-lineage-linked) data to enlarge his or her research results. In embodiments of the new system for genealogical research, shown on the right, the individual researchers are tightly connected with each other and with a central site that is designed to maximize researcher cooperation possibilities. There are still many reasons to interact with sources of raw data, such as the LDS Church or Ancestry.com, but high-quality finished (lineage-linked) data are the main kind of data exchanged by users through the central server 702.

Figure 28:
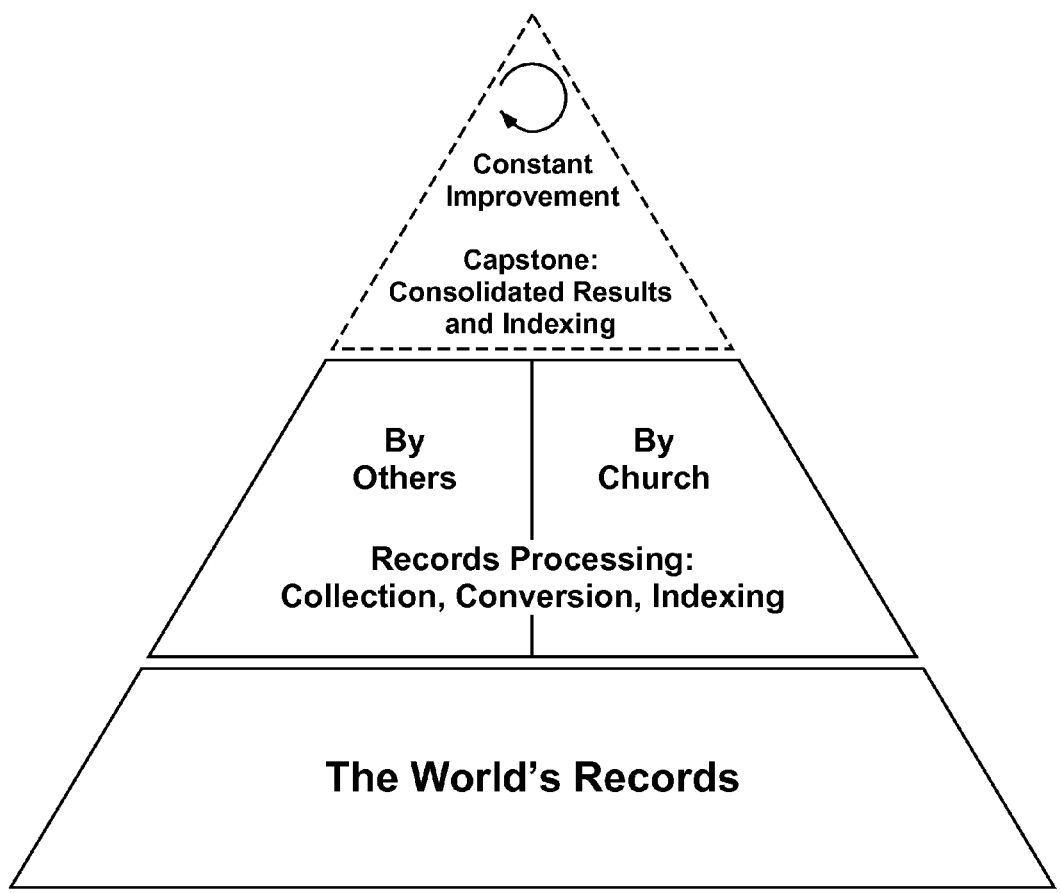
FIG. 28 shows an illustration of genealogical records.

FIG. 28 shows an illustration of genealogical records. The records in FIG. 28 may represent a portion of the world's records or all of the world's records. At the base is an area that represents all the records in whatever form they may be. The middle of that pyramid represents the smaller set of records which have been copied and processed in some way, perhaps indexed. The results of the partial processing are fragmented, making research and consolidation very difficult using today's tools and methods. The top of the pyramid is the capstone, the summary and index of all those records. That summary and index capstone may be created by embodiments of the central server 702.

Figure 29:
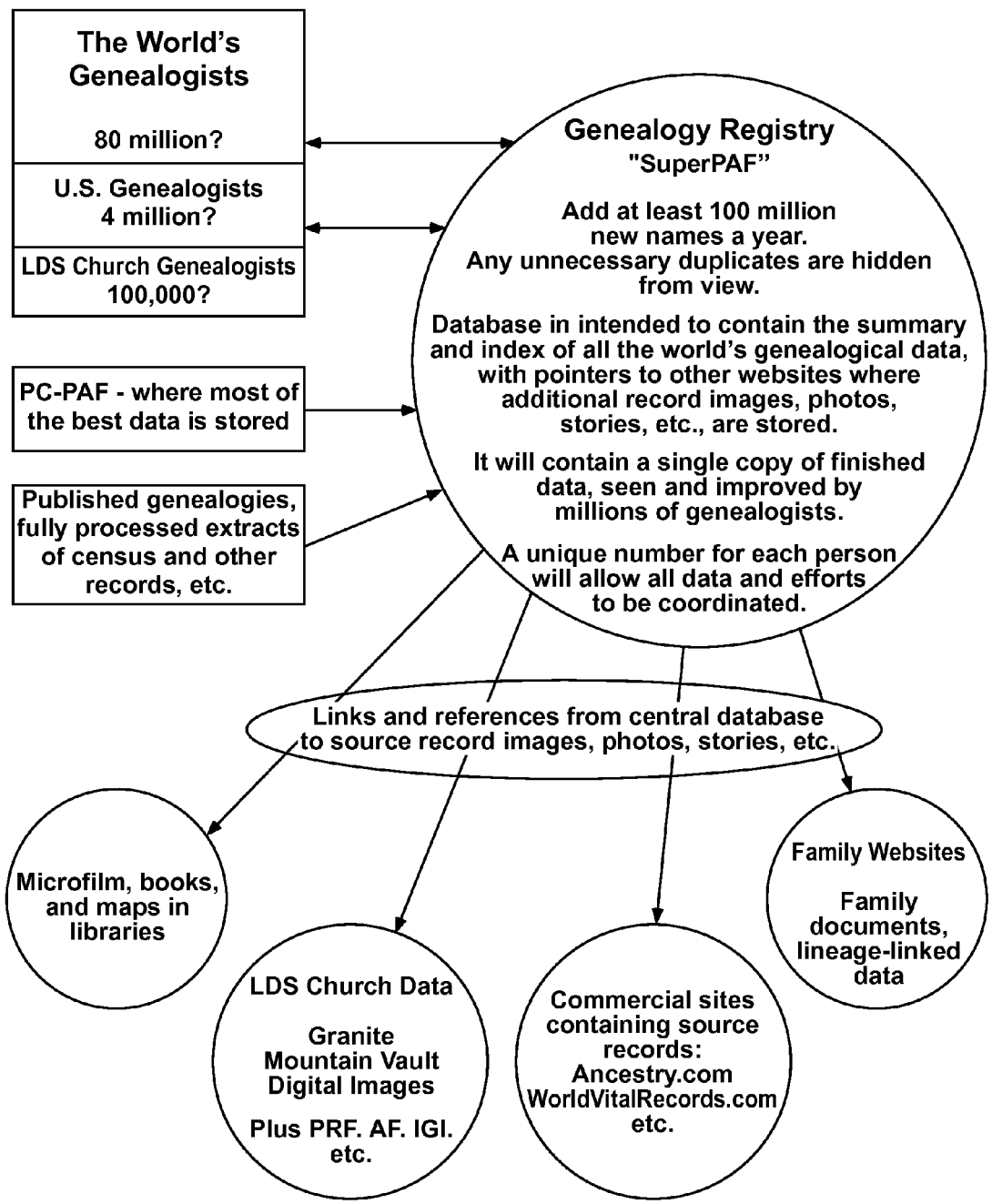
FIG. 29 shows one embodiment of the system for genealogical research of FIG. 7.

FIG. 29 shows one embodiment of the system for genealogical research of FIG. 7. Embodiments of the central server 702 may be the central connecting point of the entire genealogy industry. The central server 702 is designed to contain the summary and index of all the world's records, supplying the piece missing from the top of the pyramid shown in FIG. 28. On the left of FIG. 29, genealogists are illustrated adding their data to this large database. At the bottom, FIG. 29 shows pointers linking the names in that database to source documents, photos, journals, videos, or other materials stored on other websites. That allows embodiments of the central server 702 to remain relatively small to better fulfill their role as the world's summary and index, while leaving the massive volumes of source data to reside elsewhere.

Figure 30:
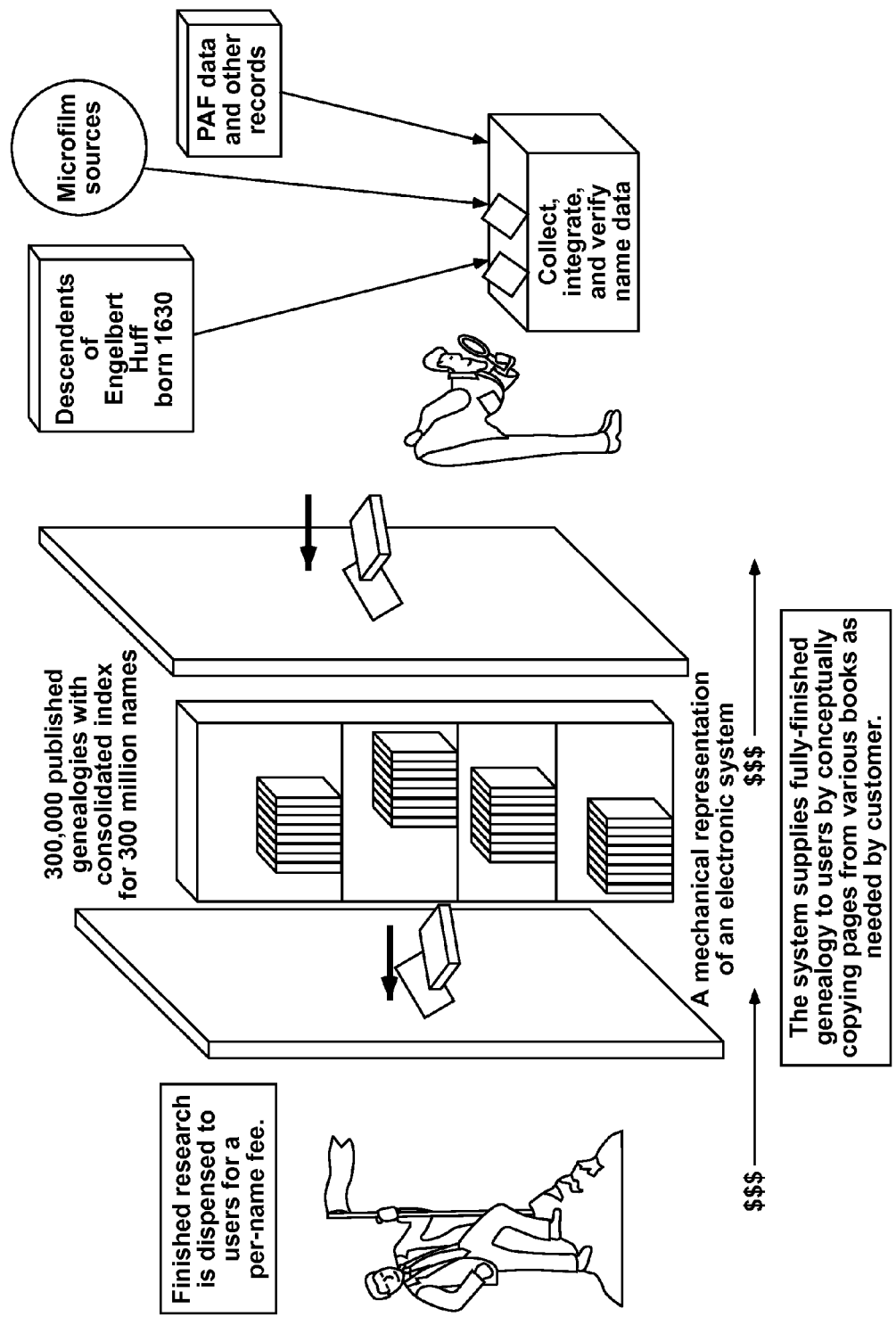
FIG. 30 shows one embodiment of data flows in the system for genealogical research of FIG. 7.
Figure 30:
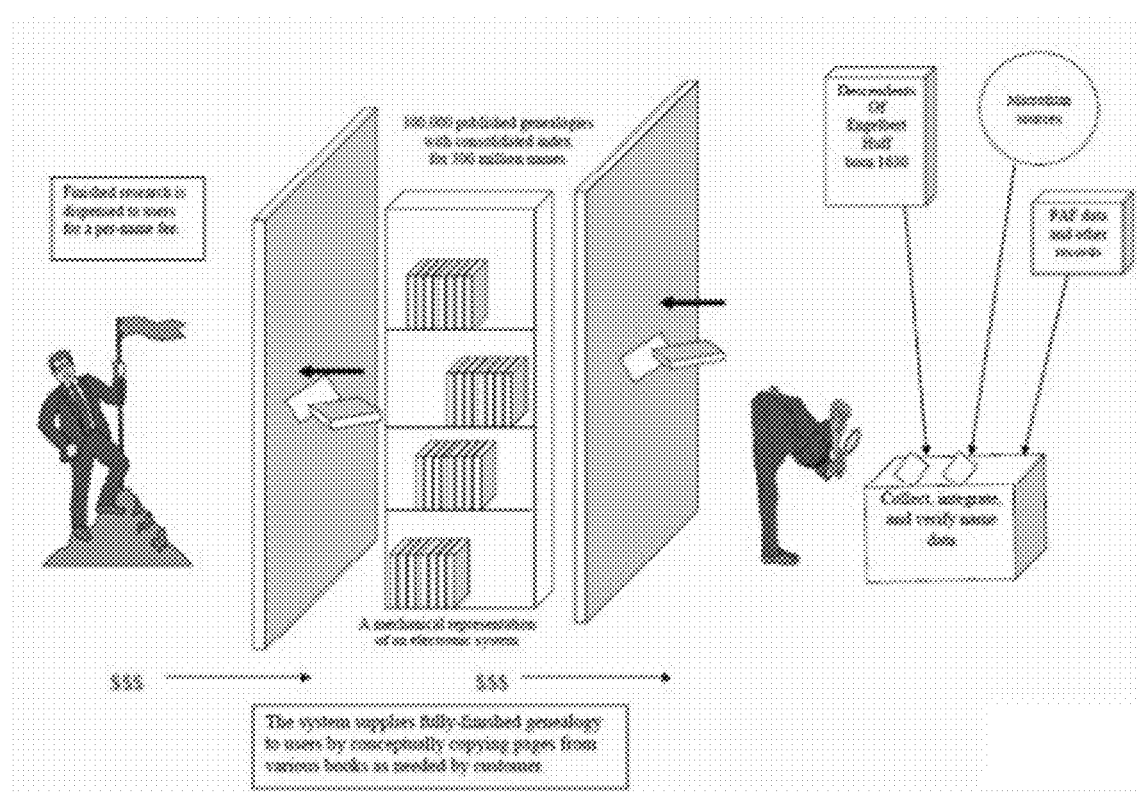

FIG. 30 shows one embodiment of data flows in the system for genealogical research of FIG. 7. On the right of FIG. 30, the illustrated researcher is working to prepare data to put it into descendant sequence and make sure it is accurate and complete, and then add it to the central server 702. The central server 702 is illustrated as a library full of books. On the left side of the image, a person is illustrated who is able to find all the pages of interest to him in that large library. He takes out those few pages, pays a small fee for each page which tells him about his ancestors, and he is very happy. Those fees are then returned to the people who prepared the data and put it in the library in the first place. Those who prepared the data are called "publishers."

Figure 31:
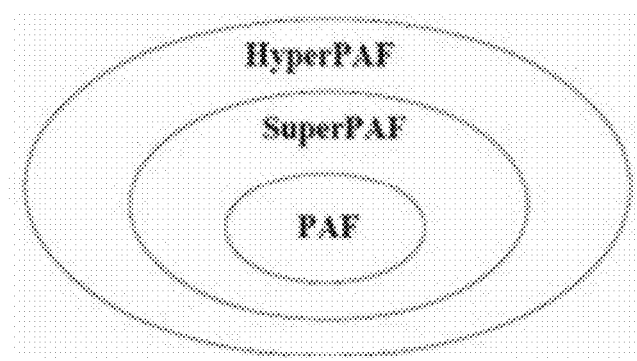
FIG. 31 shows relationships between various embodiments of genealogical research systems.

FIG. 31 shows relationships between various embodiments of genealogical research systems. PAF is a PC product for the home desktop. "SuperPAF" represents the portion of one embodiment of the system of FIG. 7 that allows users to integrate their PAF data with other users online, to create the central summary and index for a nation's genealogical data. "HyperPAF" represents the portion of one embodiment of the system of FIG. 7 that can integrate data from all genealogical sites on the Web, using the Genealogy Registry central summary and index to drive that process. For example, many of the 270,000 sites on Cyndislist.com might eventually be consolidated through this process.

Figure 32A:
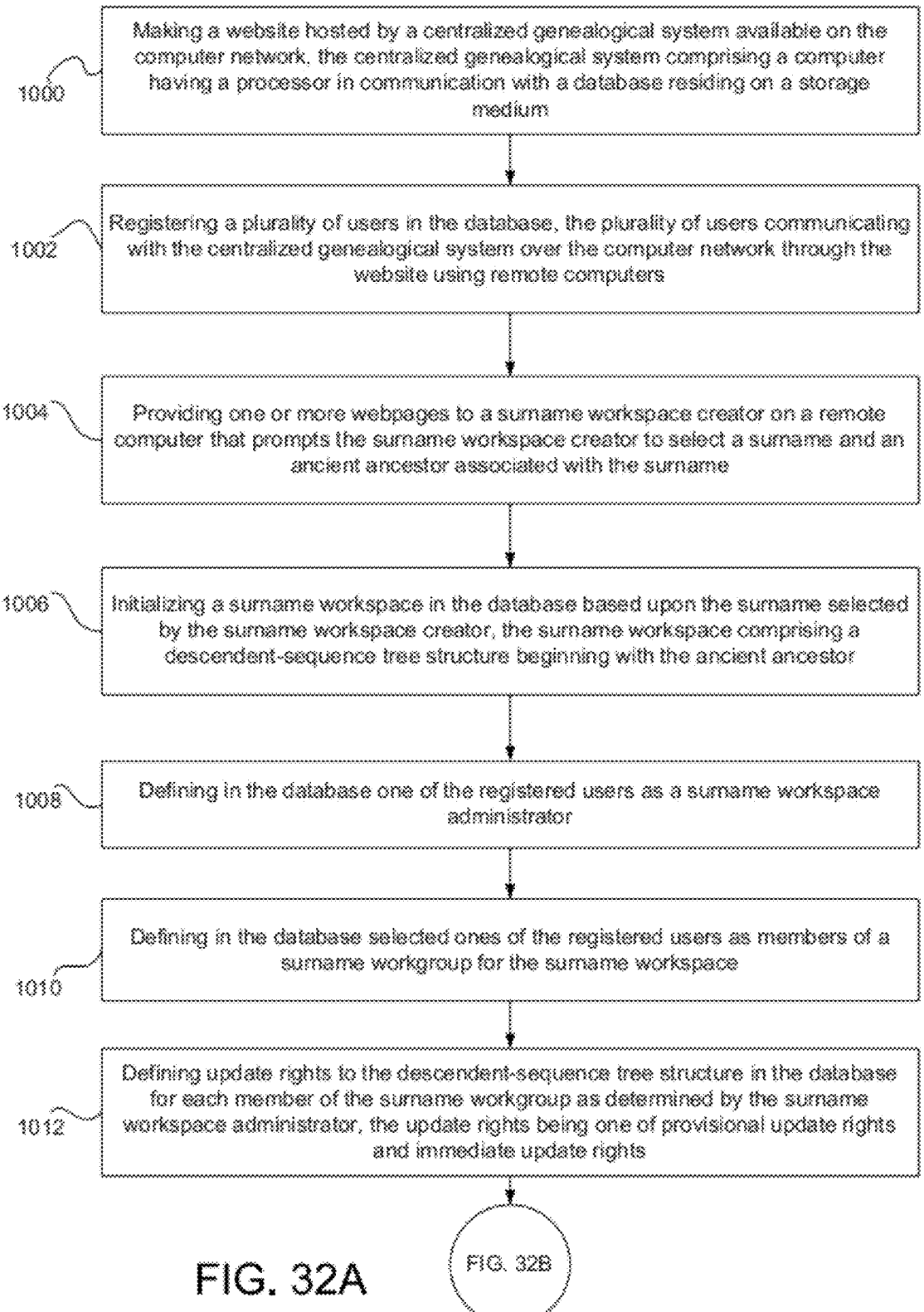
FIGS. 32A and 32B depict a process according to an embodiment of the present invention.
Figure 32B:
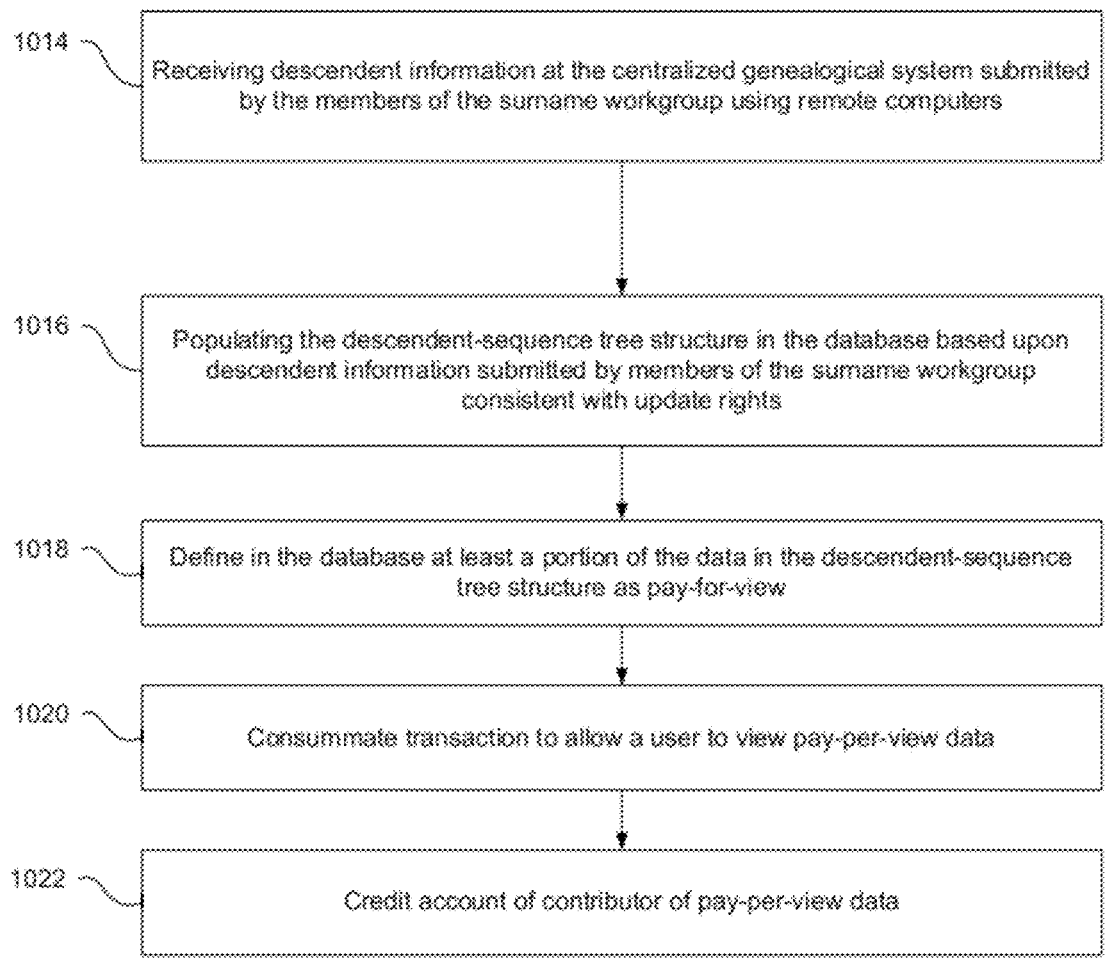

Referring now to FIGS. 32A-32B, there is depicted a process of forming a genealogy registry according to an embodiment of the present disclosure. From time-to-time, reference will be made to the items depicted in FIGS. 7 and 8. At step 1000, the central server 702 may make a website available on a computer network, such as the Internet. The web site may include webpages as is known to one having ordinary skill in the art. The data for the website may be stored in a database on a storage medium, such as the database 704. The central server 702 and the database 704 may form a centralized genealogical system. At step 1002, users at remote computers 706 may register with the centralized genealogical system using the website. In particular, the website may provide a registration webpage on the remote computers 706 to obtain the necessary information to register the users. The users may be charged a fee for accessing the services provided by the centralized genealogical system.

At step 1004, one or more of the registered users may elect to become a surname workspace creator. As a surname workspace creator, the one or more registered users may, when prompted by the centralized genealogical system through the website, provide a surname and a name of an ancient ancestor associated with the surname. At step 1006, the centralized genealogical system may initialize a surname workspace in the database 704 based upon the surname selected by the surname workspace creator. The surname workspace may comprise a descendent-sequence tree structure beginning with the ancient ancestor identified by the surname workspace creator. The descendent-sequence tree structure may include entries for the descendents of the ancient ancestor. Each of the entries may have pertinent information related to each descendent, such as name, place of birth, place of death, spousal information, children, etc. It will be appreciated that the surname workspace may provide a virtual space providing access to all known information associated with the selected surname. For example, a surname workspace may provide links to relevant source documents available on the Internet or other informational pages.

At step 1008, one or more of the registered users may be defined in the database 704 as a surname workspace administrator. A surname workspace administrator may be the same as the surname workspace creator, but not necessarily. The surname workspace administrator may be granted rights to control access rights, update rights, and viewing rights, collectively referred to herein as "workspace rights," to the surname workspace. Ambitious users may be the surname workspace administrator for multiple surname workspaces. At step 1010, one or more registered users may be defined as members of a surname workgroup for the surname workspace in the database. At step 1012, the surname workspace administrator may define, for each member of the surname workgroup, each member's workspace rights. For example, the update rights for the member may be one of immediate update rights and provisional update rights. Members with immediate update rights may make updates to the descendent-sequence tree structure without prior approval. Members with provisional update rights may update the descendent-sequence tree structure, but those updates may not be permanent until an after-the-fact review by the surname workspace administrator. In this manner, the surname workspace administrator can ensure that the descendent-sequence tree structure is not updated with data of inferior quality.

At step 1014, members of the surname workgroup may submit descendent information. The descendent information may be genealogical information related to the descendents of the identified ancient ancestor. At step 1016, the descendent-sequence tree structure may be updated based upon the descendent information submitted by the members of the surname workgroup. The updating of the descendent-sequence tree structure may be consistent with the update rights granted to each member. For example, in the case of a member with immediate update rights, the descendent-sequence tree structure may be immediately updated in the database without review by the surname workspace administrator. In the case of a member with provisional update rights, the descendent-sequence tree structure may be provisionally updated in the database until an after-the-fact review is performed by the surname workspace administrator. In this manner, the quality of the data in the descendent-sequence tree structure may be controlled.

Data in the surname workspace may be made available to other members of the workgroup or other registered users. However, public viewing rights to the data may be controlled by the member who submitted the data to some extent. That is, the centralized genealogical system may allow members to designate the data that they contributed to the surname workspace as having unrestricted or pay-per-view access rights. Data designated as having unrestricted access may be considered as "donated" to the cause and made freely accessible. Data designated as pay-per-view may only be viewed by other registered users upon payment of a fee. The fee may be shared between the operator of the centralized genealogical system, the surname workspace administrator and the member or members of the surname workgroup who submitted the data.

The centralized genealogical system may grant control of viewing rights to the surname workspace administrator, however, such that the administrator may restrict viewing of data designated as pay-per-view by its submitting member until its quality has reached a high level. It will be appreciated that this feature ensures that other registered users do not pay to view data of low quality. In an embodiment of the present disclosure, the centralized genealogical system may allow contributed data to be categorized by data quality. For example, data may be categorized as high, medium and low. The centralized genealogical system may only allow pay-per-view access to data that has a high level of quality, as determined by the surname workspace administrator or another registered user. Typically, data quality will be considered high when there are source documents that support the data.

Consistent with the foregoing, at step 1018, the centralized genealogical system may define in the database 704 at least a portion of the descendent information in the descendent-sequence tree structure as pay-per-view data. Again, this may be based upon the rated quality of the data as well as the desires of the contributing member. At step 1020, the centralized genealogical system may consummate an e-commerce transaction with a user at a remote computer 706 to allow the user to view descendent information in the descendent-sequence tree structure defined as pay-per-view data. For example, the centralized genealogical system may perform a credit card transaction. Once the transaction has been consummated, the paying user will be provided with viewing rights to the desired data on the remote computer 706. The fee collected from the transaction may be shared between the system workspace administrator, the member who submitted the data, and the operator of the centralized genealogical system. A third-party payment service, such as PayPal, may facilitate collection of the fee. At step 1022, an account at the centralized genealogical system of the member of the surname workgroup who submitted the data may be credited with the member's portion of the collected fee.

In an embodiment of the present disclosure, the centralized genealogical system may provide assistance with gathering source data for the surname workspace. In particular, the centralized genealogical system may interface with data in a third-party database 710. The third-party database 710 may contain genealogical records. The descendent-sequence tree structure in the surname workspace may be autopopulated, or semi-autopopulated with the information in the third-party database. The centralized genealogical system may further utilize "screen scraping" and other techniques to find and assemble all index entries and names from numerous online "raw data" databases and related source documents for a specific surname. This process greatly accelerates the manual review and assembly of family structures at local PC document retrieval speeds which may be up to 400 times faster than unpredictable Internet speeds. Users can view dozens of documents simultaneously, while making comparisons among them, where useful. This process can only be done using descendent-sequence (single-surname) method, and puts results in a database in descendent sequence. (There is no practical way to do this with pedigree-sequence research, since new, usually unknown, surnames are introduced at every step backwards in time. For example, there are 1024 surnames needed at 10 generations back in time.)

In an embodiment of the present disclosure, the centralized genealogical system may assign in the database 704 a unique identification number to each individual included in a descendent-sequence tree structure in the database 704 or piece of source data. In an embodiment, the unique identification number comprises a first portion, a second portion, a third portion, and a fourth portion, where the first portion identifies a data contributor/owner, the second portion identifies the specific descendent-sequence tree structure, the third portion identifies a descendency number or the location of the individual in the descendent-sequence tree structure, and the fourth portion identifies an individual number. In an embodiment, every possible individual, whether living or dead, is assigned a unique number as data is entered. It will be appreciated that this may turn the Internet into one integrated genealogy database with a unique ID for each possible person. It will be appreciated that using a unique "tree-level"

number, also allows entry of lists of names which are not connected into family groups. These names can later be assembled into family groups using the "descendency-level" number. This might include such things as the lists of Russian prisoners sent to death camps, where Russian genealogists have preserved those names, but have not yet included them in pedigree structures.

In an embodiment of the present disclosure, the centralized genealogical system may provide specialized workgroup networking features for members of a surname workgroup including multi-level access rights. For example, access rights of view, provisional update, and immediate update may be granted to family and friends and provide numerous workgroup networking features, specifically for genealogists. Same-surname cousins (who all have a common ancestor) should be the first group to invite to assist. The centralized genealogical system may provide special provisional update methods to assure shared responsibility and control to achieve high quality. These provisional update rights may include an option to review all updates after-the-fact, by date and operator. The centralized genealogical system may provide special "shadow database" transition and transformation processing space to support numerous special transactions, including various provisional update transactions. It will be appreciated that the centralized genealogical system may record data ownership and responsibility at the name level and at the individual data element level. The centralized genealogical system may include a unique, carefully controlled "Everyone can update" feature for international "community data" projects.

In an embodiment, the centralized genealogical system may provide a means for continual data improvement such that submitted data can reach a required level of quality. In an embodiment, the centralized genealogical system can improve data quality through a semi-automatic mechanism to find source records to link to previously assembled names, using "screen scraping" and other techniques. For example, the system may include a web crawler that searches third-party websites for names and related information. The system may include a unique document and image upload process. The system may use public online catalogs as input to source-identifying entries. The system may also include a feature to link names in a descendent-sequence tree structure to source documents/records, including source documents in the database 704 and source documents/records on third-party websites. In an embodiment, registered users of the centralized genealogical system can upload to a surname workspace or the database 704 personally acquired documents. Fragmented data may be linked to a single surname workspace.

In an embodiment, males should only appear in a single descendent-sequence tree structure stored in the database 704. Females, on the other hand, may appear in two or more descendent-sequence tree structures since a female may change her surname upon marriage. Multiple marriages may mean that a female will appear in several descendent-sequence tree structures. The centralized genealogical system may allow members of a surname workspace to implement a "same person" link in the database 704 for the same person in two different descendent-sequence tree structures.

In an embodiment, data may be entered into a descendent-sequence tree structure in a variety of ways. First, members of a workgroup may directly and manually enter the data. In an embodiment, the centralized genealogical system may use bulk input. In an embodiment, the centralized genealogical system may employ a specialized semi-automated assembly of all index entries, names, and related documents of potential interest for a single surname. (Only possible using descendent-sequence system). In an embodiment, the centralized genealogical system may use "process of elimination" separate subsidiary database to show which public record images have been used in the main database.

In an embodiment of the present disclosure, the centralized genealogical system may provide a search feature that allows a registered user to search the data in the database 704 using the remote computer 706. The search feature may allow the user to select search parameters, such that the search results can be filtered. In an embodiment, the search parameters may be categorized as public, edited public, descendencies, edited descendencies and pay-per-view.

The searches of "public" and "edited public" data use a 12-character key that identifies the data owner. The other three categories relate to sub-categories of a user's data, and uses a 26-character key which identifies the owner, tree, and descendency. Users are expected to choose the highest quality data that can meet their needs. The important task of linking descendencies through the women should only be done using the highest quality data, just as the pay-per-view searching of published data can only be done using the highest quality data. Searches of lower quality data will mostly be done by special operators to seek clues on how to improve the database content. Private data is simply unavailable for searches by users not specifically authorized by the owner.

Data owners declare whether their data is to be private, public or pay-per-view. The system determines general quality of data by a series of edits and analytical tests. Sampling tests for human examination may also be used. Data can be entered at any quality level and can gradually be improved until it is suitable for the next level of use.

In an embodiment of the present disclosure, where two data suppliers have each established links from one of their historical persons to a specific document, such as ship's manifest or a census record or a land record, where the names of multiple people might appear who might have some family relationship or may have shared an experience, such as a journey by ship, then, upon request, it is easy to establish a link from one data supplier to the other so that they can collaborate on other aspects of the shared history of their relatives (e.g. one historical person might have written a journal which might supply useful information about another person who did not keep a contemporary journal).

In an embodiment of the present disclosure, the centralized genealogical system may provide a private electronic communication network for the members of a surname workgroup. The private network may include a blog, a private e-mail system, or virtual workspace for posting on-line comments. It will be appreciated that the private network may allow for increased collaboration between researchers. The centralized genealogical system may automatically strip records and provide a historical "Facebook" for all historical people. It will be appreciated that this may allow history-based social networking.

In an embodiment of the present disclosure, the invention disclosed herein may include a system for building an online genealogical repository using a computer network, the system comprising: one or more computers each having a processor and a memory coupled to the processor; a database residing on a storage medium in communication with the processor; the memory having computer-readable instructions stored therein, that when executed by the processor, cause the processor to perform one or more operations of: form a surname workspace in the database in response to receipt of a surname over the network selected by a surname workspace creator, the surname workspace comprising a descendent-sequence tree structure beginning with a name of an ancient ancestor identified by the surname workspace creator, define in the database a surname workspace administrator, define in the database members of a surname workgroup for the surname workspace, define update rights to the descendent-sequence tree structure in the database for each member of the surname workgroup as determined by the surname workspace administrator, the update rights being one of provisional update rights and immediate update rights, receive descendent information submitted by the members of the surname workgroup over the computer network, populate the descendent-sequence tree structure in the database without review by the surname workspace administrator based upon descendent information submitted by members of the surname workgroup having immediate update rights, provisionally populate the descendent-sequence tree structure in the database based upon descendent information submitted by members of the surname workgroup having provisional update rights until an after-the-fact review is performed by the surname workspace administrator, define in the database at least a portion of the descendent information in the descendent-sequence tree structure as pay-per-view data, consummate an e-commerce transaction with a user at a remote computer to allow the user to access descendent information in the descendent-sequence tree structure defined as pay-per-view data, credit an account of a member of the surname workgroup when access rights to pay-per-view data contributed by that member are purchased by the user, automatically populate the descendent-sequence tree structure with descendent information extracted from a third-party genealogical database, assign in the database a unique identification number to each name identified in the descendent-sequence tree structure, the unique identification number comprising a first portion, a second portion, a third portion, and a fourth portion, wherein the first portion identifies a data submitter, the second portion identifies the descendent-sequence tree structure, the third portion identifies a descendency number, and the fourth portion identifies an individual number, link in the database a name of a female identified in the descendent-sequence tree structure with a name of a female identified in another descendent-sequence tree structure, define in the database a data quality level to the descendent information submitted by the members of the surname workgroup, restrict search results from a search of the descendent-sequence tree structure conducted by a user at a remote computer, wherein the search results are restricted based upon the data quality level such that descendent information with a low data quality level is not returned in the search results while descendent information with a high data quality level is returned in the search results, store source documents in the database related to the surname and link the source documents to the surname workspace such that the source documents are accessible to members of the surname workgroup at remote computers, provide a private electronic communication network for the members of the surname workgroup, cause the processor to find and index entries and names from source documents for the surname, and provide the indexed entries and names to the remote computers of the members of the surname workgroup upon request.

Those having ordinary skill in the relevant art will appreciate the advantages provided by the features of the present disclosure. For example, it is a feature of the present disclosure to provide an improved genealogical registry system. Another feature of the present disclosure to provide such a genealogical registry system capable of allowing collaboration among genealogists. It is a further feature of the present disclosure, in accordance with one aspect thereof, to provide a computerized system that permits collaborating genealogists to complete a descendent tree structure residing in a database.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

The subject matter claimed is:
1. A method of building an online genealogical repository using a computer network, the method comprising:
    making a website hosted by a centralized genealogical system available on the computer network, the centralized genealogical system comprising a computer having a processor in communication with a database residing on a storage medium;
    registering a plurality of users in the database, the plurality of users communicating with the centralized genealogical system over the computer network through the website using remote computers;
    providing one or more webpages of the website to a surname workspace creator on a remote computer that prompts the surname workspace creator to select a surname and an ancient ancestor associated with the surname;
    initializing a surname workspace in the database based upon the surname selected by the surname workspace creator, the surname workspace comprising a descendent-sequence tree structure beginning with the ancient ancestor;
    defining in the database one of the registered users as a surname workspace administrator;
    defining in the database selected ones of the registered users as members of a surname workgroup for the surname workspace;
    defining update rights to the descendent-sequence tree structure in the database for each member of the surname workgroup as determined by the surname workspace administrator, the update rights being one of provisional update rights and intermediate update rights;
    receiving descendent information at the centralized genealogical system submitted by the members of the surname workgroup using remote computers;
    populating the descendent-sequence tree structure in the database without review by the surname workspace administrator based upon descendent information submitted by members of the surname workgroup having immediate update rights;

provisionally populating the descendent-sequence tree structure in the database based upon descendent information submitted by members of the surname workgroup having provisional update rights such that the provisional updates remain hidden from view from other users of the website hosted by the centralized genealogical system until an after-the-fact review is performed by the surname workspace administrator;

processing the descendent information submitted by the members of the surname workgroup to define data quality levels for the descendent information, the data quality level comprising a high quality level and a low quality level, wherein data in the high quality level are restricted to descendent information supported by source documents;

improving a data quality level of descendent information from a lower one of the data quality levels to a higher one of the data quality levels through a semi-automated process to find source documents, wherein the semi-automated process utilizes a web crawler that searches third-party websites for source documents, the semi-automated process linking descendent information to applicable source documents found on the third-party websites;

improving data quality level of descendent information from a lower one of the data quality levels to higher one of the data quality levels through one of the members of the surname workgroup manually linking descendent information to source documents on third-party websites;

providing a search creation interface to a user on a remote computer that allows the user to define a search request of the descendent information and select one of the data quality levels for restricting search results in accordance with the selected data quality level; and returning search results to the user on the remote computer, wherein the search results are restricted in accordance with the selected data quality level.

2. The method of claim 1, further comprising defining in the database at least a portion of the descendent information in the descendent-sequence tree structure as pay-per-view data.

3. The method of claim 2, further comprising consummating an e-commerce transaction with a user at a remote computer to allow the user to access descendent information in the descendent-sequence tree structure defined as pay-per-view data.

4. The method of claim 2, further comprising crediting an account of a member of the surname workgroup when access rights to pay-per-view data contributed by that member are purchased by another registered user.

5. The method of claim 1, further comprising automatically populating the descendent-sequence tree structure with descendent information extracted from a third-party genealogical database.

6. The method of claim 1, further comprising assigning in the database a unique identification number to each name identified in the descendent-sequence tree structure, the unique identification number comprising a first portion, a second portion, a third portion, and a fourth portion, wherein the first portion identifies a data owner, the second portion identifies the descendent-sequence tree structure, the third portion identifies a descendency number, and the fourth portion identifies an individual number, wherein the descendency number identifies a location of the name in the descendent-sequence tree structure.

7. The method of claim 1, further comprising linking in the database a name of a female identified in the descendent-sequence tree structure with a name of a female identified in another descendent-sequence tree structure.

8. The method of claim 1, wherein the search results are restricted based upon the selected data quality level such that descendent information with a low data quality level is not returned in the search results while descendent information with a high data quality level is returned in the search results.

9. The method of claim 1, further comprising storing source documents in the database related to the surname and linking the source documents to the surname workspace such that the source documents are accessible to members of the surname workgroup using remote computers.

10. The method of claim 1, further comprising providing a private electronic communication network for the members of the surname workgroup.

11. The method of claim 1, further comprising finding and indexing entries and names from source documents for the surname, and providing the indexed entries and names to the remote computers of the members of the surname workgroup upon request.

12. A system for building an online genealogical repository using a computer network, the system comprising:

a computer having a processor and a memory coupled to the processor;

a database residing on a storage medium in communication with the processor;

the memory having computer-readable instructions stored therein, that when executed by the processor, cause the processor to perform the operations of: (I) form a surname workspace in the database in response to receipt of a surname over the network selected by a surname workspace creator, the surname workspace comprising a descendent-sequence tree structure beginning with a name of an ancient ancestor identified by the surname workspace creator, (ii) define in the database a surname workspace administrator, (iii) define in the database members of a surname workgroup for the surname workspace, (iv) define update rights to the descendent-sequence tree structure in the database for each member of the surname workgroup as determined by the surname workspace administrator, the update rights being one of provisional update rights and immediate update rights, (v) receive descendent information submitted by the members of the surname workgroup over the computer network, (vi) populate the descendent-sequence tree structure in the database without review by the surname workspace administrator based upon descendent information submitted by members of the surname workgroup having immediate update rights, (vii) provisionally populate the descendent-sequence tree structure in the database based upon descendent information submitted by members of the surname workgroup having provisional update rights such that the provisional updates remain hidden from view of other users until an after-the-fact review is performed by the surname workspace administrator, (viii) process the descendent information submitted by the members of the surname workgroup to define data quality levels for the descendent information, the data quality levels comprising a high quality level and a low quality level, wherein data in the high quality level is restricted to descendent information supported by source documents, (ix) improve a data quality level of descendent information from a lower one of the data quality levels to a higher one of the data quality levels through a semi-automated process to find source documents, wherein the semi-automated process utilizes a web crawler that searches third-party websites for source documents, the semi-automated process linking descendent information to applicable source documents found on the third-arty websites, (x) improve a data quality level of descendent information from a lower one of the data quality levels to a higher one of the data quality levels through one of the members of the surname workgroup manually linking descendent information to source documents on third-party websites, (xi) provide a search creation interface to a user on a remote computer that allows the user to define a search request of the descendent information and select one of the data quality levels for restricting search results in accordance with the selected data quality level, and (xii) return search results to the user on the remote computer, wherein the search results are restricted in accordance with the selected data quality level.

13. The system of claim 12, further comprising computer-readable instructions, that when executed by the processor, cause the processor to define in the database at least a portion of the descendent information in the descendent-sequence tree structure as pay-per-view data.

14. The system of claim 13, further comprising computer-readable instructions, that when executed by the processor, cause the processor to consummate an e-commerce transaction with a user at a remote computer to allow the user to access descendent information in the descendent-sequence tree structure defined as pay-per-view data.

15. The system of claim 13, further comprising computer-readable instructions, that when executed by the processor, cause the processor to credit an account of a member of the surname workgroup when access rights to pay-per-view data contributed by that member are purchased by the user.

16. The system of claim 12, further comprising computer-readable instructions, that when executed by the processor, cause the processor to automatically populate the descendent-sequence tree structure with descendent information extracted from a third-party genealogical database.

17. The system of claim 12, further comprising computer-readable instructions, that when executed by the processor, cause the processor to assign in the database a unique identification number to each name identified in the descendent-sequence tree structure, the unique identification number comprising a first portion, a second portion, a third portion, and a fourth portion, wherein the first portion identifies a data submitter, the second portion identifies the descendent-sequence tree structure, the third portion identifies a descendency number, and the fourth portion identifies an individual number, wherein the descendency number identifies a location of the name in the descendent-sequence tree structure.

18. The system of claim 12, further comprising computer-readable instructions, that when executed by the processor, cause the processor to link in the database a name of a female identified in the descendent-sequence tree structure with a name of a female identified in another descendent-sequence tree structure.

19. The system of claim 12, wherein the search results are restricted based upon the selected data quality level such that descendent information with a low data quality level is not returned in the search results while descendent information with a high data quality level is returned in the search results.

20. The system of claim 12, further comprising computer-readable instructions, that when executed by the processor, cause the processor to store source documents in the database related to the surname and link the source documents to the surname workspace such that the source documents are accessible to members of the surname workgroup at remote computers.

21. The system of claim 12, further comprising computer-readable instructions, that when executed by the processor, cause the processor to provide a private electronic communication network for the members of the surname workgroup.

22. The system of claim 12, further comprising computer-readable instructions, that when executed by the processor, cause the processor to extract, index, sort and link information from source documents for the surname.

* * * * *